(12) United States Patent
Chang et al.

(10) Patent No.: US 10,393,998 B2
(45) Date of Patent: *Aug. 27, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 4 days.

This patent is subject to a terminal disclaimer.

(21) Appl. No.: 15/490,245

(22) Filed: Apr. 18, 2017

(65) Prior Publication Data
US 2018/0188478 A1 Jul. 5, 2018

(30) Foreign Application Priority Data

Jan. 4, 2017 (TW) .............................. 106100194 A

(51) Int. Cl.
| | | |
|---|---|---|
| G02B 13/18 | (2006.01) | |
| G02B 3/02 | (2006.01) | |
| G02B 13/00 | (2006.01) | |
| G02B 9/34 | (2006.01) | |
| G02B 13/06 | (2006.01) | |
| G02B 13/14 | (2006.01) | |

(52) U.S. Cl.
CPC ............. *G02B 13/004* (2013.01); *G02B 9/34* (2013.01); *G02B 13/008* (2013.01); *G02B 13/06* (2013.01); *G02B 13/14* (2013.01)

(58) Field of Classification Search
CPC ......... G02B 13/004; G02B 9/34; G02B 13/04
USPC ................................ 359/715, 753, 771, 781
See application file for complete search history.

(56) References Cited

U.S. PATENT DOCUMENTS

| | | | |
|---|---|---|---|
| 10,156,699 B2 * | 12/2018 | Chang ................. | G02B 13/004 |
| 2018/0017761 A1 * | 1/2018 | Lai .......................... | G02B 5/005 |
| 2018/0024321 A1 * | 1/2018 | Lai ........................ | G02B 13/146 |
| | | | 359/357 |
| 2018/0052305 A1 * | 2/2018 | Lai .......................... | G02B 5/005 |
| 2018/0059367 A1 * | 3/2018 | Lai .......................... | G02B 5/005 |
| 2018/0059369 A1 * | 3/2018 | Chang ..................... | G02B 5/005 |
| 2018/0074291 A1 * | 3/2018 | Chang ..................... | G02B 5/005 |
| 2018/0106979 A1 * | 4/2018 | Chang ...................... | G02B 7/02 |
| 2018/0188479 A1 * | 7/2018 | Chang ................. | G02B 13/004 |

(Continued)

FOREIGN PATENT DOCUMENTS

CN 206178234 U 5/2017

*Primary Examiner* — William Choi
(74) *Attorney, Agent, or Firm* — Muncy, Geissler, Olds & Lowe, P.C.

(57) ABSTRACT

The invention discloses a four-piece optical lens for capturing image and a four-piece optical module for capturing image. In order from an object side to an image side, the optical lens along the optical axis comprises a first lens with refractive power; a second lens with refractive power; a third lens with refractive power; and a fourth lens with refractive power; and at least one of the image-side surface and object-side surface of each of the four lenses are aspheric. The optical lens may increase aperture value and improve the imagining quality for use in compact cameras.

25 Claims, 30 Drawing Sheets

(56) References Cited

U.S. PATENT DOCUMENTS

2018/0188490 A1* 7/2018 Chang .................... G02B 5/208
2018/0188503 A1* 7/2018 Chang .................... G02B 13/14

* cited by examiner

OPTICAL IMAGE CAPTURING SYSTEM

CROSS-REFERENCE TO RELATED APPLICATION

This application claims the benefit of Taiwan Patent Application No. 106100194, filed on Jan. 4, 2017, in the Taiwan Intellectual Property Office, the disclosure of which is incorporated herein in its entirety by reference.

BACKGROUND OF THE INVENTION

Field of the Invention

The present disclosure relates to an optical image capturing system, and more particularly to a compact optical image capturing system which can be applied to electronic products.

Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high image quality is rapidly raised.

The traditional optical image capturing system of a portable electronic device comes with different designs, including a second-lens or a third-lens design. However, the requirement for the higher pixels and the requirement for a large aperture of an end user, like functionalities of micro filming and night view, or the requirement of wide angle of view of the portable electronic device have been raised. But the optical image capturing system with the large aperture design often produces more aberration resulting in the deterioration of quality in peripheral image formation and difficulties of manufacturing, and the optical image capturing system with wide angle of view design increases distortion rate in image formation, thus the optical image capturing system in prior arts cannot meet the requirement of the higher order camera lens module.

Therefore, how to design an optical image capturing system capable of balancing the requirement for higher total pixel count and quality of the formed image as well as the minimization of camera module by effectively increasing the amount of admitted light and the angle of view the optical image capturing system has become a pressing issue.

SUMMARY OF THE INVENTION

The aspect of embodiment of the present disclosure directs to an optical image capturing system and an optical image capturing lens which use combination of refractive powers, convex and concave surfaces of four-piece optical lenses (the convex or concave surface in the disclosure denotes the geometrical shape of an image-side surface or an object-side surface of each lens on an optical axis) to further increase the quantity of incoming light of the optical image capturing system and the angle of view of the optical lenses, and to improve the total pixels and image quality for image formation while possessing certain amount of relative illumination, so as to be applied to minimized electronic products.

In addition, when it comes to certain application field of optical imaging, there will be a need to capture image with respect to light sources having wavelengths of both visible and infrared ranges, and an example of this kind of application is the IP video surveillance camera, which is equipped with the Day & Night function. The visible light for human vision locates in wavelengths ranging from 400 to 700 nm in the spectrum, but the image formed on the camera sensor includes the infrared light which is invisible to human eyes. Therefore, in order to ensure that the sensor retains only the visible light for human eyes eventually, an IR Cut filter Removable (ICR) may be configured before the lens of the IP video surveillance camera under certain circumstances, so as to enhance the "fidelity" of the image. The ICR of the IP video surveillance camera may completely filter out the infrared light in daytime mode so as to avoid color cast; whereas in night mode, it allows the infrared light to pass through the lens to enhance the image brightness. Nevertheless, the element of the ICR occupies a significant amount of space and is also expensive, so that being disadvantageous to the design and manufacture of the miniaturized surveillance cameras in the future.

The type of embodiment of the present disclosure simultaneously directs to an optical image capturing system and an optical image capturing lens, which utilize the refractive power of four lenses, combination of convex and concave surfaces, as well as the selection of materials thereof, so as to make the image capturing system reduce the difference between the image focal length of visible light and the image focal length of infrared light, that is, to achieve the near effect of "confocal" such that the use of ICR elements is not essential.

The terminologies together with their numerals for the lens parameters related to the embodiment of the present disclosure are provided in the following paragraphs for reference to subsequent descriptions:

The Lens Parameters Related to the Magnification of the Optical Image Capturing System and the Optical Image Capturing Lens The optical image capturing system and the optical image capturing lens of the present disclosure may be simultaneously designed and applied to the biometrics, such as facial recognition. When the embodiment of the present disclosure is used to capture images of the facial recognition, the infrared light may be selected for the operation wavelength. For a face with a width of about 15 centimeters (cm) at a distance of about 25-30 cm, at least 30 horizontal pixels may capture the image thereof in the horizontal direction of an image sensing device (the pixel size thereof is 1.4 micrometers (μm)). The linear magnification of the infrared light on the image plane is LM, which meets the following conditions: LM=(30 horizontal pixels)*(1.4 μm pixel size)/(15 cm of the width of the photographed object); wherein LM≥0.0003. In the meantime, the visible light may also be selected for the operation wavelength. For a face with a width of about 15 cm at a distance of about 25-30 cm, at least 50 horizontal pixels may capture the image thereof in the horizontal direction of an image sensing device (the pixel size thereof is 1.4 micrometers (μm)).

The Lens Parameters Related to the Length or Height of the Lens

Regarding the visible spectrum, the present disclosure may select the wavelength of 555 nm as the primary reference wavelength and the basis for the measurement of focus shift; and regarding the infrared spectrum (700-1000 nm), the present disclosure may select the wavelength of 850 nm as the primary reference wavelength and the basis for the measurement of focus shift.

The optical image capturing system has a first image plane and a second image plane. The first image plane is an image plane particularly for the visible light, which is perpendicular to the optical axis, and the central field of view (FOV) of the first image plane has a maximum value of the through-focus modulation transfer function rate (MTF) at the first spatial frequency; and the second image plane is an image plane particularly for the infrared light, which is perpendicular to the optical axis, and the central field of view of the second image plane has a maximum value of the through-focus modulation transfer function rate (MTF) at the first spatial frequency. Besides, the optical image capturing system also has a first average image plane and a second average image plane. The first average image plane is an image plane particularly for the visible light, which is perpendicular to the optical axis, and configured at the average position of the through-focus positions, where the values of MTF at the central field of view, 0.3 field of view and the 0.7 field of view are at their respective maximums at the first spatial frequency; and the second average image plane is an image plane for the infrared light, which is particularly perpendicular to the optical axis, and configured at the average position of the through-focus positions, where the values of MTF at the central field of view, 0.3 field of view and the 0.7 field of view are at their respective maximums at the first spatial frequency.

The aforementioned first spatial frequency is set to be a half of the spatial frequency (half frequency) of the image sensing device (sensor) used in the present disclosure. For example, for an image sensing device including the pixel size of 1.12 μm or less, the quarter spatial frequency, half spatial frequency (half frequency) and full spatial frequency (full frequency) in the characteristic diagram of modulation transfer function thereof are at least 110 cycles/mm, 220 cycles/mm and 440 cycles/mm, respectively. Lights of any field of view may be further divided into the sagittal ray and the tangential ray.

The focus shift amounts, corresponding to the respective maximum values of through-focus MTF of the sagittal ray at the central field of view, 0.3 field of view and 0.7 field of view for the visible light of the optical image capturing system of the present disclosure, are denoted as VSFS0, VSFS3 and VSFS7 (the unit of measurement: mm), respectively; and the maximum values of through-focus MTF of the sagittal ray at the central field of view, 0.3 field of view and 0.7 field of view for the visible light are denoted as VSMTF0, VSMTF3 and VSMTF7, respectively. On the other hand, the focus shift amounts, corresponding to the respective maximum values of through-focus MTF of the tangential ray at the central field of view, 0.3 field of view and 0.7 field of view for the visible light of the optical image capturing system of the present disclosure, are denoted as VTFS0, VTFS3 and VTFS7 (the unit of measurement: mm), respectively; and the maximum values of through-focus MTF of the tangential ray at the central field of view, 0.3 field of view and 0.7 field of view for the visible light are denoted as VTMTF0, VTMTF3 and VTMTF7, respectively. The average focus shift amount (position) of both focus shift amounts of the aforementioned sagittal ray at three fields of view and tangential ray at three fields of view for the visible light is denoted as AVFS (the unit of measurement: mm), which is equal to the absolute value |(VSFS0+VSFS3+VSFS7+VTFS0+VTFS3+VTFS7)/6|.

The focus shift amounts, corresponding to the respective maximum values of through-focus MTF of the sagittal ray at the central field of view, 0.3 field of view and 0.7 field of view for the infrared light of the optical image capturing system of the present disclosure, are denoted as ISFS0, ISFS3 and ISFS7, respectively. The average focus shift amount (position) of the focus shift amounts of the aforementioned sagittal ray at three fields of view for the infrared light is denoted as AISFS (unit of measurement: mm); and the maximum values of through-focus MTF of the sagittal ray at the central field of view, 0.3 field of view and 0.7 field of view for the infrared light are denoted as ISMTF0, ISMTF3 and ISMTF7, respectively. On the other hand, the focus shift amounts, corresponding to the respective maximum values of through-focus MTF of the tangential ray at the central field of view, 0.3 field of view and 0.7 field of view for the infrared light of the optical image capturing system of the present disclosure, are denoted as ITFS0, ITFS3 and ITFS7 (the unit of measurement: mm), respectively. The average focus shift amount (position) of the focus shift amounts of the aforementioned tangential ray at three fields of view for the infrared light is denoted as AITFS (unit of measurement: mm); and the maximum values of through-focus MTF of the tangential ray at the central field of view, 0.3 field of view and 0.7 field of view for the infrared light are denoted as ITMTF0, ITMTF3 and ITMTF7, respectively. The average focus shift amount (position) of both focus shift amounts of the aforementioned sagittal ray at three fields of view and tangential ray at three fields of view for the infrared light is denoted as AIFS (the unit of measurement: mm), which is equal to the absolute value |(ISFS0+ISFS3+ISFS7+ITFS0+ITFS3+ITFS7)/6|.

The focus shift amount between the focal points of the central fields of view (RGB/IR) for the visible light and the infrared light of the entire optical image capturing system is denoted as FS (i.e. the wavelength of 850 nm versus wavelength of 555 nm, the unit of measurement: mm), which is equal to the absolute value |(VSFS0+VTFS0)/2−(ISFS0+ITFS0)/2|. The difference (focus shift amount) between the average focus shift amounts at three fields of view for the visible light and the infrared light (RGB/IR) of the entire optical image capturing system is denoted as AFS (i.e. the wavelength of 850 nm versus wavelength of 555 nm, the unit of measurement: mm), which is equal to the absolute value of |AIFS−AVFS|.

A maximized height for image formation of the optical image capturing system is denoted as HOI. A height of the optical image capturing system is denoted as HOS. A distance from the object-side surface of the first lens to the image-side surface of the fourth lens is denoted as InTL. A distance from the image-side surface of the fourth lens to the image plane is denoted as InB, wherein InTL+InB=HOS. A distance from an aperture stop (aperture) to an image plane is denoted as InS. A distance from the first lens to the second lens is denoted as IN12 (example). A central thickness of the first lens of the optical image capturing system on the optical axis is denoted as TP1 (example).

The Lens Parameter Related to the Material of the Lens

An Abbe number (dispersion coefficient) of the first lens in the optical image capturing system is denoted as NA1 (example). A refractive index of the first lens is denoted as Nd1 (example).

The Lens Parameter Related to the Angle of View of the Lens

The angle of view is denoted as AF. Half of the angle of view is denoted as HAF. A major light angle is denoted as MRA.

The Lens Parameter Related to Exit/Entrance Pupil in the Lens Element

An entrance pupil diameter of the optical image capturing system is denoted as HEP. The exit pupil of the optical image capturing system is the image formed in the image space after the light passes through the lens assembly behind the aperture stop, and the exit pupil diameter is denoted as HXP. The maximum effective half diameter (EHD) of any surface of single lens refers to a vertical height between the optical axis and an intersection point, where the incident ray with the maximum angle of view of system passes through the outermost edge of the entrance pupil, and intersecting the surface of the lens. For example, the maximum effective half diameter of the object-side surface of the first lens is denoted as EHD 11. The maximum effective half diameter of the image-side surface of the first lens is denoted as EHD 12. The maximum effective half diameter of the object-side surface of the second lens is denoted as EHD 21. The maximum effective half diameter of the image-side surface of the second lens is denoted as EHD 22. The maximum effective half diameters of any surface of the other lenses in the optical image capturing system are denoted according to the regular pattern shown above.

The Lens Parameter Related to a Depth of the Lens Shape

The horizontal shift distance from an intersection point of the object-side surface of the fourth lens and the optical axis to a maximum effective half diameter position of the object-side surface of the fourth lens is denoted as InRS41 (example). The horizontal shift distance from an intersection point of the image-side surface of the fourth lens and the optical axis to a maximum effective half diameter position of the image-side surface of the fourth lens is denoted as InRS42 (example).

The Lens Parameter Related to the Lens Shape

The critical point C is a point on a surface of a specific lens, where the tangent plane to the surface at that point is perpendicular to the optical axis, and the point cannot be the intersection point with the optical axis on that specific surface of the lens. In addition, a perpendicular distance between a critical point C31 on the object-side surface of the third lens and the optical axis is denoted as HVT31 (example). A perpendicular distance between a critical point C32 on the image-side surface of the third lens and the optical axis is denoted as HVT32 (example). A perpendicular distance between a critical point C41 on the object-side surface of the fourth lens and the optical axis is denoted as HVT41 (example). A perpendicular distance between a critical point C42 on the image-side surface of the fourth lens and the optical axis is denoted as HVT42 (example). The perpendicular distances between the critical point on the object-side surface or image-side surface of the other lenses are denoted according to the regular pattern shown above.

The inflection point on the object-side surface of the fourth lens and nearest to the optical axis is denoted as IF411, wherein the sinkage value of the inflection point IF411 is denoted as SGI411 (example). The sinkage value SGI411 is a horizontal shift distance paralleling the optical axis, which is from an intersection point of the optical axis and the object-side surface of the fourth lens to the inflection point nearest to the optical axis on the object-side surface of the fourth lens. The distance perpendicular to the optical axis between the inflection point IF411 and the optical axis is denoted as HIF411 (example). The inflection point on image-side surface of the fourth lens which is nearest to the optical axis is denoted as IF421, and the sinkage value of the inflection point IF421 is denoted as SGI421 (example). The sinkage value SGI421 is a horizontal shift distance paralleling the optical axis, which is from the intersection point of the optical axis and the image-side surface of the fourth lens to the inflection point nearest to the optical axis on the image-side surface of the fourth lens. The distance perpendicular to the optical axis between the inflection point IF421 and the optical axis is denoted as HIF421 (example).

The object-side surface of the fourth lens has an inflection point IF412 which is the second nearest to the optical axis and the sinkage value of the inflection point IF412 is denoted as SGI412 (example). The SGI412 is a horizontal shift distance paralleling the optical axis from an intersection point of the optical axis and the object-side surface of the fourth lens to the inflection point which is the second nearest to the optical axis on the object-side surface of the fourth lens. A distance perpendicular to the optical axis between the inflection point IF412 and the optical axis is denoted as HIF412 (example). The image-side surface of the fourth lens has an inflection point IF422 which is the second nearest to the optical axis and the sinkage value of the inflection point IF422 is denoted as SGI422 (example). The SGI422 is a horizontal shift distance paralleling the optical axis from an intersection point of the optical axis and the image-side surface of the fourth lens to the inflection point which is second nearest to the optical axis on the image-side surface of the fourth lens. A distance perpendicular to the optical axis between the inflection point IF422 and the optical axis is denoted as HIF422 (example).

The object-side surface of the fourth lens has an inflection point IF413 which is the third nearest to the optical axis and the sinkage value of the inflection point IF413 is denoted as SGI413 (example). The SGI413 is a horizontal shift distance paralleling the optical axis from an intersection point of the optical axis and the object-side surface of the fourth lens to the inflection point which is the third nearest to the optical axis on the object-side surface of the fourth lens. A distance perpendicular to the optical axis between the inflection point IF413 and the optical axis is denoted as HIF413 (example). The image-side surface of the fourth lens has an inflection point IF423 which is the third nearest to the optical axis and the sinkage value of the inflection point IF423 is denoted as SGI423 (example). The SGI423 is a horizontal shift distance paralleling the optical axis from an intersection point of the optical axis and the image-side surface of the fourth lens to the inflection point which is the third nearest to the optical axis on the image-side surface of the fourth lens. A distance perpendicular to the optical axis between the inflection point IF423 and the optical axis is denoted as HIF423 (example).

The object-side surface of the fourth lens has an inflection point IF414 which is the fourth nearest to the optical axis and the sinkage value of the inflection point IF414 is denoted as SGI414 (example). The SGI414 is a horizontal shift distance in parallel with the optical axis from an intersection point of the optical axis and the object-side surface of the fourth lens to the inflection point which is the fourth nearest to the optical axis on the object-side surface of the fourth lens. A distance perpendicular to the optical axis between the inflection point IF414 and the optical axis is denoted as HIF414 (example). The image-side surface of the fourth lens has an inflection point IF424 which is the fourth nearest to the optical axis and the sinkage value of the inflection point IF424 is denoted as SGI424 (example). The SGI424 is a horizontal shift distance in parallel with the optical axis from an intersection point of the optical axis and the image-side surface of the fourth lens to the inflection point which is the fourth nearest to the optical axis on the image-side surface of the fourth lens. A distance perpendicular to the optical axis between the inflection point IF424 and the optical axis is denoted as HIF424 (example).

The inflection points on the object-side surface or the image-side surface of the other lenses and the perpendicular distances between them and the optical axis, or the sinkage values thereof are denoted according to the regular patterns shown above.

The Lens Parameter Related to the Aberration

Optical distortion for image formation in the optical image capturing system is denoted as ODT. TV distortion for image formation in the optical image capturing system is denoted as TDT. Additionally, the degree of aberration offset within the range of 50% to 100% field of view of the formed image may be further illustrated. The offset of the spherical aberration is denoted as DFS. The offset of the coma aberration is denoted as DFC.

The characteristic diagram of Modulation Transfer Function (MTF) of the optical image capturing system is utilized to test and assess the contrast and sharpness of the image formation by the system. The vertical coordinate axis of the characteristic diagram of modulation transfer function represents a contrast transfer rate (values are from 0 to 1). The horizontal coordinate axis represents a spatial frequency (cycles/mm; 1 p/mm; line pairs per mm). Theoretically, an ideal optical image capturing system may present 100% of the line contrast of a photographed object. However, the values of the contrast transfer rate at the vertical coordinate axis are less than 1 in actual image capturing systems. In addition, in comparison with the central region, it is generally more difficult to achieve a fine recovery in the peripheral region of image formation. The contrast transfer rates (values of MTF) of spatial frequency of 55 cycles/mm at positions of the optical axis, 0.3 field of view and 0.7 field of view of a visible light spectrum on the image plane are respectively denoted as MTFE0, MTFE3 and MTFE7. The contrast transfer rates (values of MTF) of spatial frequency of 110 cycles/mm at the optical axis, 0.3 field of view and 0.7 field of view on the image plane are respectively denoted as MTFQ0, MTFQ3 and MTFQ7. The contrast transfer rates (values of MTF) of spatial frequency of 220 cycles/mm at the optical axis, 0.3 field of view and 0.7 field of view on the image plane are respectively denoted as MTFH0, MTFH3 and MTFH7. The contrast transfer rates (values of MTF) of spatial frequency of 440 cycles/mm at the optical axis, 0.3 field of view and 0.7 field of view on the image plane are respectively denoted as MTF0, MTF3 and MTF7. The three fields of view described above represent the center, the inner field of view and the outer field of view of the lenses. Thus, they may be utilized to evaluate whether the performance of a specific optical image capturing system is excellent. If the design of the optical image capturing system of the present disclosure comprises the sensing device below 1.12 micrometers inclusive in correspondence with the pixel size, thus, the quarter spatial frequency, the half spatial frequency (half frequency) and the full spatial frequency (full frequency) of the characteristic diagram of modulation transfer function are respectively at least 110 cycles/mm, 220 cycles/mm and 440 cycles/mm.

If an optical image capturing system is simultaneously required to capture image with infrared spectrum, such as for the purpose of night vision in the low light source condition, the operation wavelength thereof may be 850 nm or 800 nm. Since the main function of night vision is to recognize silhouette of an object formed in monochrome and shade, the high resolution is not essential, and thus, a spatial frequency which is less than 110 cycles/mm may be merely selected for evaluating whether the performance of a specific optical image capturing system is excellent when the optical image capturing system is applied to the infrared spectrum. When the aforementioned wavelength of 850 nm is focused on the image plane, the contrast transfer rates (values of MTF) with a spatial frequency of 55 cycles/mm at positions of the optical axis, 0.3 field of view and 0.7 field of view on the image plane are denoted as MTFI0, MTFI3 and MTFI7, respectively. However, since the difference between infrared wavelength as 850 nm or 800 nm and general wavelength of visible light is huge, it is pretty hard to design an optical image capturing system which is capable of focusing on the visible light and the infrared light (dual-mode) simultaneously while achieving certain performance respectively.

The disclosure provides an optical image capturing system, wherein the object-side surface or the image-side surface of the fourth lens thereof is configured with inflection points, such that the angle of incidence from each field of view to the fourth lens may be adjusted effectively, and in particular, the optical distortion as well as the TV distortion may also be corrected. Besides, the surfaces of the fourth lens may possess a better capability for adjusting the optical path, so as to enhance the image quality.

An optical image capturing system is provided in accordance with the present disclosure. In an sequence from an object side to an image side, a first lens, a second lens, a third lens, a fourth lens, a first image plane, and a second image plane are included. The first image plane is an image plane specifically for the visible light, which is perpendicular to the optical axis, wherein the central field of view of the first image plane has a maximum value of the through-focus modulation transfer rate (MTF) at the first spatial frequency; the second image plane is an image plane specifically for the infrared light, which is perpendicular to the optical axis, wherein the central field of view of the second image plane has a maximum value of the through-focus modulation transfer rate (MTF) at the first spatial frequency. The first to fourth lenses all have the refractive power. The focal lengths of the first to fourth lenses are f1, f2, f3 and f4, respectively. The focal length of the optical image capturing system is f. The entrance pupil diameter of the optical image capturing system is HEP. The distance on the optical axis from an object-side surface of the first lens to the first image plane is HOS. Half of the maximum angle of view of the optical image capturing system is denoted as HAF. The maximum image height on the first image plane and perpendicular to the optical axis of the optical image capturing system is HOI. The distance on the optical axis between the first image plane and the second image plane is denoted as FS. The thicknesses at ½ HEP height and parallel to the optical axis of the first lens, the second lens, the third lens and the fourth lens are ETP1, ETP2, ETP3 and ETP4 respectively, wherein the sum of aforementioned ETP1 to ETP4 is SETP. The thicknesses on the optical axis of the first lens, the second lens, the third lens and the fourth lens are TP1, TP2, TP3 and TP4 respectively, wherein the sum of aforementioned TP1 to TP4 is STP. Conditions as follows are satisfied: $1 \leq f/HEP \leq 10$, $0.5 \leq HOS/f \leq 20$, $|FS| \leq 30$ μm and $0.5 \leq SETP/STP < 1$.

Another optical image capturing system is further provided in accordance with the present disclosure. In the sequence from an object side to an image side, a first lens element, a second lens element, a third lens element, a fourth lens element, a first image plane, and a second image plane are included. The first image plane is an image plane specifically for the visible light, which is perpendicular to the optical axis, wherein the central field of view on the first image plane has a maximum value of the through-focus modulation transfer rate (MTF) at the first spatial frequency;

the second image plane is an image plane specifically for the infrared light, which is perpendicular to the optical axis, wherein the central field of view on the second image plane has a maximum value of the through-focus modulation transfer rate (MTF) at the first spatial frequency. The first lens has the positive refractive power. The second lens has the refractive power and has a convex image-side surface on the optical axis. The third lens has the refractive power and has a convex image-side surface on the optical axis. The focal lengths of the first to fourth lens are f1, f2, f3 and f4, respectively. The focal length of the optical image capturing system is f. The entrance pupil diameter of the optical image capturing system is denoted as HEP. The distance on the optical axis from an object-side surface of the first lens to the first image plane is denoted as HOS. Half of the maximum angle of view of the optical image capturing system is denoted as HAF. The maximum height of image on the first image plane perpendicular to the optical axis of the optical image capturing system is denoted as HOI. The distance on the optical axis between the first image plane and the second image plane is denoted as FS. A horizontal distance parallel to the optical axis between a coordinate point at ½ HEP height on the object-side surface of the first lens to the image plane is ETL. A horizontal distance parallel to the optical axis between a coordinate point at ½ HEP height on the object-side surface of the first lens to a coordinate point at ½ HEP height on the image-side surface of the fourth lens is EIN. Conditions as follows are satisfied: $1 \leq f/HEP \leq 10$, $0.5 \leq HOS/f \leq 20$, $|FS| \leq 30$ μm and $0.2 \leq EIN/ETL < 1$.

In addition, another optical image capturing system is further provided in accordance with the present disclosure. In the sequence from an object side to an image side, a first lens, a second lens, a third lens, a fourth lens, a first average image plane and a second average image plane are included. The first average image plane is an image plane specifically for the visible light, which is perpendicular to the optical axis, and configured at the average position of the through-focus positions, where the values of MTF for the visible light at the central field of view, 0.3 field of view and the 0.7 field of view are at their respective maximum at the first spatial frequency. The second average image plane is an image plane specifically for the infrared light, which is perpendicular to the optical axis, and configured at the average position of the through-focus positions, where the values of MTF for the infrared light at the central field of view, 0.3 field of view and the 0.7 field of view are at their respective maximum at the first spatial frequency. The first lens has the positive refractive power. The second lens has the refractive power and has a convex image-side surface on the optical axis. The third lens has the positive refractive power and has a convex image-side surface on the optical axis. The focal lengths of the first to fourth lenses are f1, f2, f3 and f4, respectively. The focal length of the optical image capturing system is denoted as f. The entrance pupil diameter of the optical image capturing system is denoted as HEP. The distance on the optical axis from an object-side surface of the first lens to the first average image plane is denoted as HOS. Half of the maximum angle of view of the optical image capturing system is denoted as HAF. The maximum height of image on the first average image plane perpendicular to the optical axis of the optical image capturing system is HOI. A horizontal distance parallel to the optical axis between a coordinate point at ½ HEP height on the object-side surface of the first lens to the image plane is ETL. A horizontal distance parallel to the optical axis between a coordinate point at ½ HEP height on the object-side surface of the first lens to a coordinate point at ½ HEP height on the image-side surface of the fourth lens is EIN. Conditions as follows are satisfied: $1 \leq f/HEP \leq 10$, $0.5 \leq HOS/f \leq 15$, $0.4 \leq |\tan(HAF)| \leq 6.0$, $0 < PhiA4/InTL \leq 1.5$, $PhiC < PhiD$, $0 \text{ mm} < PhiD \leq 3.3 \text{ mm}$ and $0.2 \leq EIN/ETL < 1$.

The thickness of a single lens at height of ½ entrance pupil diameter (HEP) particularly affects the performance in correcting the optical path difference between the rays in each field of view and in correcting aberration for the shared region among the fields of view within the range of ½ entrance pupil diameter (HEP). The capability of aberration correction is enhanced when the thickness is greater, but the difficulty in manufacturing such lenses also increases at the same time. Therefore, it is necessary to control the thickness of a single lens at height of ½ entrance pupil diameter (HEP), in particular, to control the proportional relationship (ETP/TP) of the thickness (ETP) of the lens at height of ½ entrance pupil diameter (HEP) to the thickness (TP) of the lens corresponding to the surface on the optical axis. For example, the thickness of the first lens at height of ½ entrance pupil diameter (HEP) is denoted as ETP1. The thickness of the second lens at height of ½ entrance pupil diameter (HEP) is denoted as ETP2. The thicknesses of other lenses are denoted according to a similar pattern. The sum of aforementioned ETP1 to ETP4 is denoted as SETP. The embodiments of present disclosure may satisfy the following formula: $0.3 \leq SETP/EIN \leq 0.8$.

In order to balance the enhancement of the capability of aberration correction and the reduction of the difficulty in manufacturing at the same time, it is particularly necessary to control the proportional relationship (ETP/TP) of the thickness (ETP) of the lens at height of ½ entrance pupil diameter (HEP) to the thickness (TP) of the lens on the optical axis. For example, the thickness of the first lens at height of ½ entrance pupil diameter (HEP) is denoted as ETP1. The thickness of the first lens on the optical axis is denoted as TP1. Thus, the ratio between both of them is ETP1/TP1. The thickness of the second lens at height of ½ entrance pupil diameter (HEP) is denoted as ETP2. The thickness of the second lens on the optical axis is denoted as TP2. Thus, the ratio between both of them is ETP2/TP2. The proportional relationships of the thicknesses of other lenses in the optical image capturing system at height of ½ entrance pupil diameter (HEP) to the thicknesses (TP) of the lenses on the optical axis are denoted according to a similar pattern. The embodiments of the present disclosure may satisfy the following formula: $0.5 \leq ETP/TP \leq 3$.

A horizontal distance between two adjacent lenses at height of ½ entrance pupil diameter (HEP) is denoted as ED. The horizontal distance (ED) described above is parallel with the optical axis of the optical image capturing system and particularly affects the performance in correcting the optical path difference between the rays in each field of view and in correcting aberration for the shared region among the fields of view within the range of ½ entrance pupil diameter (HEP). The capability of aberration correction may be enhanced when the horizontal distance becomes greater, but the difficulty in manufacturing the lenses is also increased and the degree of 'minimization' to the length of the optical image capturing system is also restricted at the same time. Thus, it is essential to control the horizontal distance (ED) between two specific adjacent lenses at height of ½ entrance pupil diameter (HEP).

In order to balance the enhancement of the capability of aberration correction and the reduction of the difficulty for 'minimization' to the length of the optical image capturing system at the same time, it is particularly necessary to control the proportional relationship (ED/IN) of the horizontal distance (ED) between the two adjacent lenses at height of ½ entrance pupil diameter (HEP) to the horizontal distance (IN) between the two adjacent lenses on the optical axis. For example, the horizontal distance between the first lens and the second lens at height of ½ entrance pupil diameter (HEP) is denoted as ED12. The horizontal distance between the first lens and the second lens on the optical axis is denoted as IN12. The ratio between both of them is ED12/IN12. The horizontal distance between the second lens and the third lens at height of ½ entrance pupil diameter (HEP) is denoted as ED23. The horizontal distance between the second lens and the third lens on the optical axis is denoted as IN23. The ratio between both of them is ED23/IN23. The proportional relationships of the horizontal distances between the other two adjacent lenses in the optical image capturing system at height of ½ entrance pupil diameter (HEP) to the horizontal distances between the two adjacent lenses on the optical axis are denoted according to a similar pattern.

The horizontal distance in parallel with the optical axis from a coordinate point on the image-side surface of the fourth lens at the height of ½ HEP to the image plane is denoted as EBL. The horizontal distance in parallel with the optical axis from the intersection point of the optical axis and the image-side surface of the fourth lens to the image plane is denoted as BL. In order to balance the enhancement of the capability of aberration correction and the reservation of accommodation space for other optical elements, the embodiment of the present disclosure may satisfy the following formula: $0.2 \leq EBL/BL \leq 1.1$. The optical image capturing system may further include a light filtering element, which is located between the fourth lens and the image plane. A distance in parallel with the optical axis from a coordinate point on the image-side surface of the fourth lens at height of ½ HEP to the light filtering element is denoted as EIR. A distance in parallel with the optical axis from an intersection point of the optical axis and the image-side surface of the fourth lens to the light filtering element is denoted as PIR. The embodiments of the present disclosure may satisfy the following formula: $0.2 \leq EIR/PIR \leq 0.8$.

The optical image capturing system described above may be configured to form the image on the image sensing device which is shorter than 1/1.2 inch in diagonal length. Preferably, the size of the image sensing device is 1/2.3 inch. The pixel size of the image sensing device is smaller than 1.4 micrometers (μm). Preferably, the pixel size thereof is smaller than 1.12 micrometers (μm). The best pixel size thereof is smaller than 0.9 micrometers (μm). Furthermore, the optical image capturing system is applicable to the image sensing device with an aspect ratio of 16:9.

The optical image capturing system described above is applicable to the demands of video recording with above millions or ten-millions pixels (e.g. 4K and 2K videos or the so-called UHD and QHD) and simultaneously possess a good image quality.

The height of optical system (HOS) may be appropriately reduced so as to achieve the minimization of the optical image capturing system, when $|f1|>f4$.

When the relationship $|f2|+|f3|>|f1|+|f4|$ is met, at least one of the second to third lenses may have the weak positive refractive power or weak negative refractive power. The aforementioned weak refractive power indicates that an absolute value of the focal length of a specific lens is greater than 10. When at least one of the second to third lenses has the weak positive refractive power, the positive refractive power of the first lens may be shared, such that preventing the unnecessary aberration from appearing too early. On the contrary, when at least one of the second to third lenses has the weak negative refractive power, the aberration of the optical image capturing system may be corrected and fine-tuned.

The fourth lens may have the positive refractive power. Besides, at least one surface of the fourth lens may possess at least one inflection point, which is capable of effective reducing the incident angle of the off-axis FOV rays, thereby further correcting the off-axis FOV aberration.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
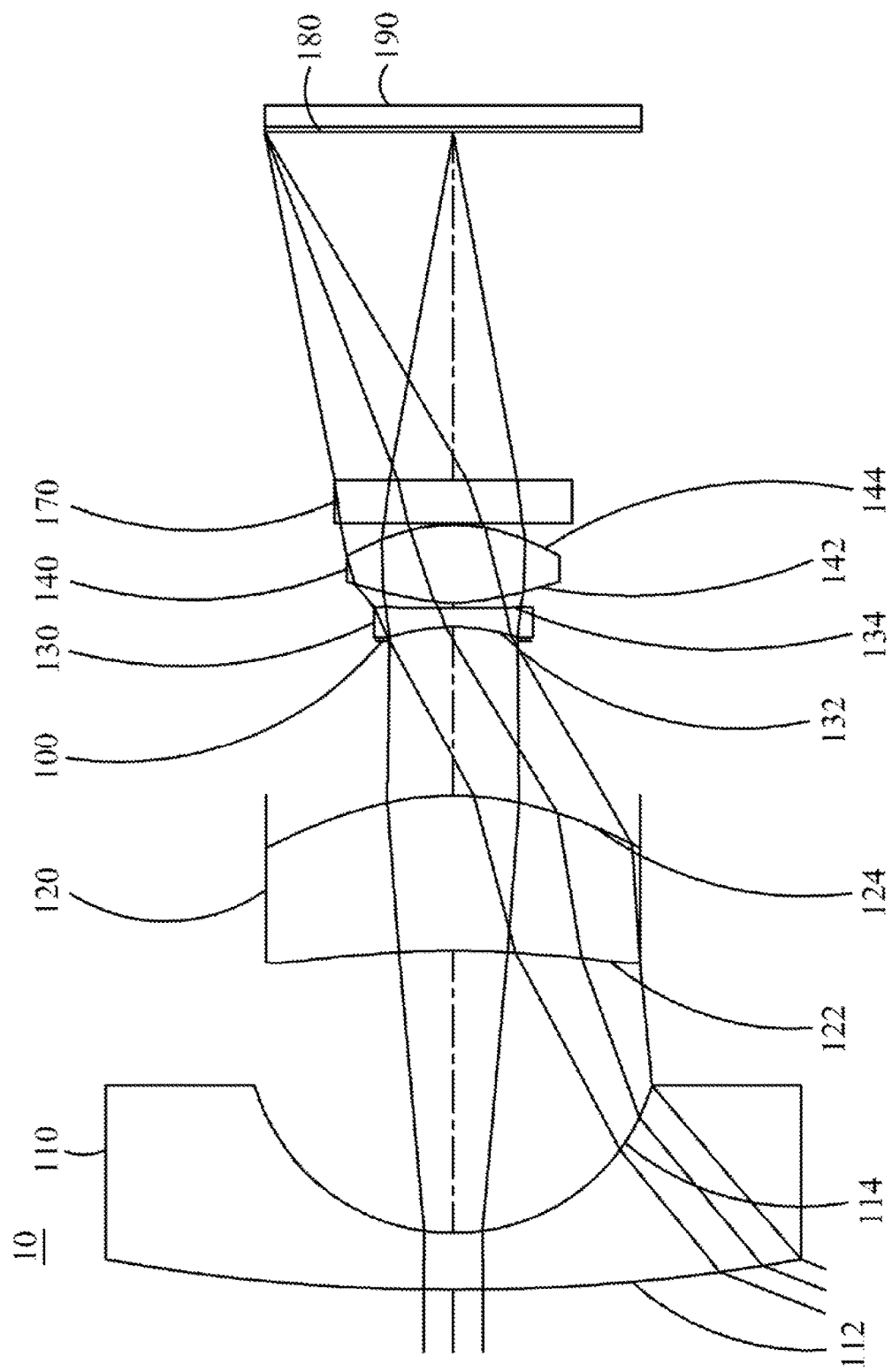
FIG. 1A is a schematic view of the optical image capturing system according to the first embodiment of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in the sequence from an object side to an image side, includes a first, second, third and fourth lenses with refractive power. The optical image capturing system may further include an image sensing device, which is configured on an image plane.

The optical image capturing system may utilize three sets of wavelengths which are 486.1 nm, 587.5 nm and 656.2 nm respectively, wherein the 587.5 nm wavelength is served as the primary reference wavelength and the reference wavelength for obtaining technical features. The optical image capturing system may also utilize five sets of wavelengths which are 470 nm, 510 nm, 555 nm, 610 nm and 650 nm respectively, wherein the 555 nm wavelength is served as the primary reference wavelength and the reference wavelength for obtaining technical features.

A ratio of the focal length f of the optical image capturing system to the focal length fp of each lens with positive refractive power is denoted as PPR. A ratio of the focal length f of the optical image capturing system to the focal length fn of each lens with negative refractive power is denoted as NPR. A sum of the PPR of all lenses with positive refractive powers is denoted as ΣPPR, and a sum of the NPR of all lenses with negative refractive powers is denoted as ΣNPR. The total refractive power and the total length of the optical image capturing system may be easier to control when the following conditions are met: $0.5 \leq \Sigma PPR/|\Sigma NPR| \leq 4.5$; preferably, the following condition may be met: $0.9 \leq \Sigma PPR/|\Sigma NPR| \leq 3.5$.

The height of the optical image capturing system is denoted as HOS. When the value of the ratio, i.e. HOS/f, approaches 1, it would be easier to manufacture the miniaturized optical image capturing system which is capable of forming the ultra-high pixel image.

The sum of the focal length fp of each lens with positive refractive power is denoted as ΣPP. A sum of the focal length fn of each lens with negative refractive power is denoted as ΣNP. In one embodiment of the optical image capturing system of the present disclosure, the following conditions are met: $0 < \Sigma PP \leq 200$ and $f4/\Sigma PP \leq 0.85$. Preferably, the following conditions may be met: $0 < \Sigma PP \leq 150$ and $0.01 \leq f4/\Sigma PP \leq 0.7$. As a result, the optical image capturing system will have a better control over the focusing ability, and the positive refractive power of the optical image capturing system may be distributed appropriately, so as to suppress the premature formation of noticeable aberration.

The optical image capturing system may further include an image sensing device, which is configured on an image plane. Half of a diagonal of an effective sensing field of the image sensing device (i.e. the image height or the so-called maximum image height of the optical image capturing system) is denoted as HOI. A distance on the optical axis from the object-side surface of the first lens to the image plane is denoted as HOS, which meets the following conditions: HOS/HOI≤15 and 0.5≤HOS/f≤20.0. Preferably, the following conditions may be met: 1≤HOS/HOI≤10 and 1≤HOS/f≤15. As a result, the optical image capturing system may remain minimized, such that being applicable to a lightweight and portable electronic product.

In addition, in the optical image capturing system of the disclosure, according to a variety of requirements, at least one aperture may be configured so as to reduce the stray light and improve the image quality.

In the optical image capturing system of the disclosure, the aperture may be configured as a front-set aperture or middle-set aperture, wherein the front-set aperture means that the aperture is disposed between a photographed object and the first lens, and the middle-set aperture means that the aperture is disposed between the first lens and the image plane. If the aperture is the front-set aperture, a longer distance between the exit pupil and the image plane of the optical image capturing system may be provided, such that more optical elements may be accommodated in the optical image capturing system, and the efficiency of the image sensing device in receiving images may be improved. If the aperture is the middle-set aperture, the angle of field of view (FOV) of the optical image capturing system may be expanded, such that the optical image capturing system has the same advantage as wide-angle cameras. A distance from the aforementioned apertures to the image plane is denoted as InS, which meets the following conditions: 0.2≤InS/HOS≤1.1. Preferably, the following condition may be met: 0.4≤InS/HOS≤1. Hence, keeping the optical image capturing system minimized and being equipped with the wide-angle feature may be simultaneously achieved.

In the optical image capturing system of the present disclosure, a distance from the object-side surface of the first lens to the image-side surface of the fourth lens is denoted as InTL. The sum of central thicknesses of all lenses with refractive power on the optical axis is denoted as ΣTP. The following condition is met: 0.2≤ΣTP/InTL≤0.95. Preferably, the following condition may be met: 0.2≤ΣTP/InTL≤0.9. Hence, the contrast ratio for the image formation in the optical image capturing system and the yield rate of manufacturing the lenses may be simultaneously achieved well, and an appropriate back focal length may be provided so as to accommodate other optical elements in the optical image capturing system.

The curvature radius of the object-side surface of the first lens is denoted as R1. The curvature radius of the image-side surface of the first lens is denoted as R2. The following condition is met: 0.01≤|R1/R2|≤100. Preferably, the following condition may be met: 0.01≤|R1/R2|≤60.

The curvature radius of the object-side surface of the fourth lens is denoted as R9. The curvature radius of the image-side surface of the fourth lens is denoted as R10. The following condition is met: −200<(R7−R8)/(R7+R8)<30.

Hence, the configuration is beneficial for correcting the astigmatism generated by the optical image capturing system.

The distance between the first lens and the second lens on the optical axis is denoted as IN12. The following condition is met: 0<IN12/f≤5.0. Preferably, the following condition may be met: 0.01≤IN12/f≤4.0. Hence, the chromatic aberration of the lens may be mitigated, such that the performance thereof is improved.

The distance between the second lens and the third lens on the optical axis is denoted as IN23. The following condition is met: 0<IN23/f≤5.0. Preferably, the following condition may be met: 0.01≤IN23/f≤3.0. Hence, the performance of the lens may be improved.

The distance between the third lens and the fourth lens on the optical axis is denoted as IN34. The following condition is met: 0<IN34/≤f5.0. Preferably, the following condition may be met: 0.001≤IN34/≤f3.0. Hence, the performance of the lens may be improved.

The central thicknesses of the first lens and the second lens on the optical axis are denoted as TP1 and TP2, respectively, which meets the following condition: 1≤(TP1+IN12)/TP2≤20. Hence, the sensitivity formed via the optical image capturing system may be easier to control, and the performance of the optical image capturing system may be improved.

The central thicknesses of the third lens and the fourth lens on the optical axis are denoted as TP3 and TP4, respectively, and the distance between the aforementioned two lenses on the optical axis is denoted as IN34. The following condition is met: 0.2≤(TP4+IN34)/TP4≤20. Hence, the sensitivity formed via the optical image capturing system may be easier to control, and the total height of the optical image capturing system may be reduced.

The distance between the second lens and the third lens on the optical axis is denoted as IN23. The sum of distances from the first lens to the fourth lens on the optical axis is denoted as ΣTP. The following condition is met: 0.01≤IN23/(TP2+IN23+TP3)≤0.9. Preferably, the following condition may be met: 0.05≤IN23/(TP2+IN23+TP3)≤0.7. Hence, the aberration generated in the process of the incident light travelling inwardly into the optical image capturing system may be easier to be corrected slightly layer upon layer, and the total height of the optical image capturing system may be reduced.

In the optical image capturing system of the present disclosure, a horizontal shift distance in parallel with the optical axis from a position of maximum effective half diameter to an intersection point on the optical axis of the object-side surface 142 of the fourth lens is denoted as InRS41 (if the horizontal shift is towards the image-side surface, the InRS41 is a positive value; if the horizontal shift is towards the object-side surface, the InRS41 is a negative value). A distance in parallel with the optical axis from a position of maximum effective half diameter to an intersection point on the optical axis of the image-side surface 144 of the fourth lens is denoted as InRS42. A central thickness of the fourth lens 140 on the optical axis is denoted as TP4. The following conditions are met: −1 mm≤InRS41≤1 mm, −1 mm≤InRS42≤1 mm, 1 mm≤|InRS41|+|InRS42|≤2 mm, 0.01≤|InRS41|/TP4≤10 and 0.01≤|InRS42|/TP4≤10. Hence, the position of maximum effective half diameter between both surfaces of the fourth lens may be controlled, so as to facilitate the aberration correction of the peripheral field of view of the optical image capturing system and effectively remain the miniaturization thereof.

In the optical image capturing system of the present disclosure, a horizontal shift distance in parallel with the optical axis from an inflection point which is nearest to the optical axis on the object-side surface of the fourth lens to an intersection point on the optical axis of the object-side surface of the fourth lens is denoted as SGI411. A horizontal shift distance in parallel with the optical axis from an inflection point which is nearest to the optical axis on the image-side surface of the fourth lens to an intersection point on the optical axis of the image-side surface of the fourth lens is denoted as SGI421. The following conditions are met: 0<SGI411/(SGI411+TP4)≤0.9 and 0<SGI421/(SGI421+TP4)≤0.9. Preferably, the following conditions may be met: 0.01<SGI411/(SGI411+TP4)≤0.7 and 0.01<SGI421/(SGI421+TP4)≤0.7.

A horizontal shift distance in parallel with the optical axis from the inflection point which is the second nearest to the optical axis on the object-side surface of the fourth lens to an intersection point on the optical axis of the object-side surface of the fourth lens is denoted as SGI412. A horizontal shift distance in parallel with the optical axis from the inflection point which is the second nearest to the optical axis on the image-side surface of the fourth lens to an intersection point on the optical axis of the image-side surface of the fourth lens is denoted as SGI422. The following conditions are met: 0<SGI412/(SGI412+TP4)≤0.9 and 0<SGI422/(SGI422+TP4)≤0.9. Preferably, the following conditions may be met: 0.1≤SGI412/(SGI412+TP4)≤0.8 and 0.1≤SGI422/(SGI422+TP4)≤0.8.

A perpendicular distance to the optical axis between the inflection point which is nearest to the optical axis on the object-side surface of the fourth lens and the optical axis is denoted as HIF411. A perpendicular distance to the optical axis between the inflection point which is nearest to the optical axis on the image-side surface of the fourth lens and an intersection point on the optical axis of the image-side surface of the fourth lens is denoted as HIF421. The following conditions are met: 0.01≤HIF411/HOI≤0.9 and 0.01≤HIF421/HOI≤0.9. Preferably, the following conditions may be met: 0.09≤HIF411/HOI≤0.5 and 0.09≤HIF421/HOI≤0.5.

A perpendicular distance to the optical axis between the inflection point which is the second nearest to the optical axis on the object-side surface of the fourth lens and the optical axis is denoted as HIF412. A perpendicular distance to the optical axis between an intersection point on the optical axis of the image-side surface of the fourth lens and the inflection point which is the second nearest to the optical axis on the image-side surface of the fourth lens is denoted as HIF422. The following conditions are met: 0.01≤HIF412/HOI≤0.9 and 0.01≤HIF422/HOI≤0.9. Preferably, the following conditions may be met: 0.09≤HIF412/HOI≤0.8 and 0.09≤HIF422/HOI≤0.8.

A perpendicular distance to the optical axis between the inflection point which is the third nearest to the optical axis on the object-side surface of the fourth lens and the optical axis is denoted as HIF413. A perpendicular distance to the optical axis between an intersection point on the optical axis of the image-side surface of the fourth lens and the inflection point which is the third nearest to the optical axis on the image-side surface of the fourth lens is denoted as HIF423. The following conditions are met: 0.001 mm≤|HIF413|≤5 mm and 0.001 mm≤|HIF423|≤5 mm; preferably, the following conditions may be met: 0.1 mm≤|HIF423|≤3.5 mm and 0.1 mm≤|HIF413|≤3.5 mm.

A perpendicular distance to the optical axis between the inflection point which is the fourth nearest to the optical axis on the object-side surface of the fourth lens and the optical axis is denoted as HIF414. A perpendicular distance to the optical axis between an intersection point on the optical axis of the image-side surface of the fourth lens and the inflection point which is the fourth nearest to the optical axis on the image-side surface of the fourth lens is denoted as HIF424. The following conditions are met: 0.001 mm≤|HIF414|≤5 mm and 0.001 mm≤|HIF424|≤5 mm; preferably, the following conditions may be met: 0.1 mm≤|HIF424|≤3.5 mm and 0.1 mm≤|HIF414|≤3.5 mm.

In one embodiment of the optical image capturing system of the present disclosure, the chromatic aberration of the optical image capturing system may be easier to correct via alternately arranging the lenses with large Abbe number and small Abbe number.

The equation of the aforementioned aspheric surface is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \qquad (1),$$

wherein z is a position value of the position at the height h along the optical axis which refers to the surface apex, k is the conic coefficient, c is the reciprocal of curvature radius, and A4, A6, A8, A10, A12, A14, A16, A18 as well as A20 are high-order aspheric coefficients.

In the optical image capturing system provided by the present disclosure, the material of lens may be glass or plastic. If a plastic material is adopted, the manufacture cost as well as the weight of the lens may be reduced effectively. If a glass material is adopted, the heat effect may be controlled, and the design space for configuring the lenses with the refractive power of the optical image capturing system may also be increased. Besides, the object-side surface and the image-side surface of the first to fourth lenses in the optical image capturing system may be aspheric surfaces, which provide more control variables, such that the number of lenses used may be less than that of traditional glass lens, and in addition, the aberration may be mitigated as well. Hence, the total height of the optical image capturing system may be reduced effectively.

In addition, in the optical image capturing system provided by the present disclosure, if the surface of lens is a convex surface, it means that the surface of lens adjacent to the optical axis is a convex surface. If the surface of lens is a concave surface, it means that the surface of lens adjacent to the optical axis is a concave surface.

Besides, in the optical image capturing system of the present disclosure, according to a variety of requirements, at least one aperture stop may be configured so as to reduce the stray light and facilitate the improvement of image quality.

The optical image capturing system of the present disclosure may be further applied to the optical system with automatic-focus feature according to requirements. With the features of both correcting aberrations well and forming high-quality images, the optical image capturing system may be applied to even more applications.

The optical image capturing system of the present disclosure may include a driving module according to requirements, wherein the driving module may be coupled to the lenses and enables movements of the lenses. The aforementioned driving module may be the voice coil motor (VCM) which is used to drive the lenses to focus, or may be the optical image stabilization (OIS) which is used to reduce the frequency of through-focus occurrence resulted from the vibration of lenses in the process of photo or video shooting.

At least one lens among the first, second, third and fourth lenses of the optical image capturing system of the present disclosure may be set as a light filtering element which has a wavelength less than 500 nm according to requirements. The light filtering element may be made by coating film on at least one surface of the lens specifically having a filtering function, or by forming the lens itself with a material which may filter out the light with short wavelengths.

According to the above embodiments, the specific embodiments in coordination with figures are presented in detail as below.

The First Embodiment

Figure 1B:
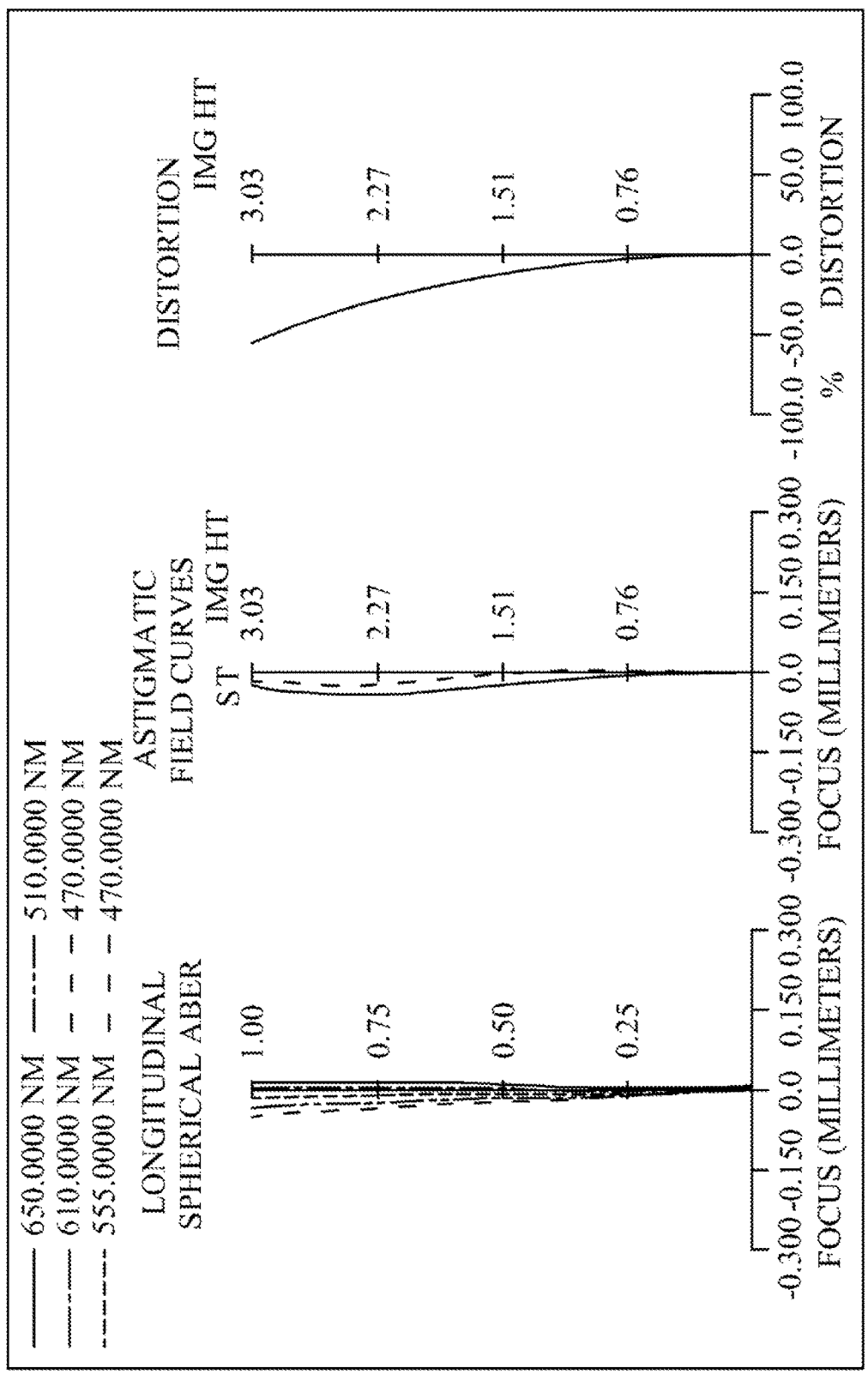
FIG. 1B is a curve diagram illustrating the spherical aberration, astigmatism and optical distortion of the optical image capturing system in the sequence from left to right according to the first embodiment of the present disclosure.
Figure 1C:
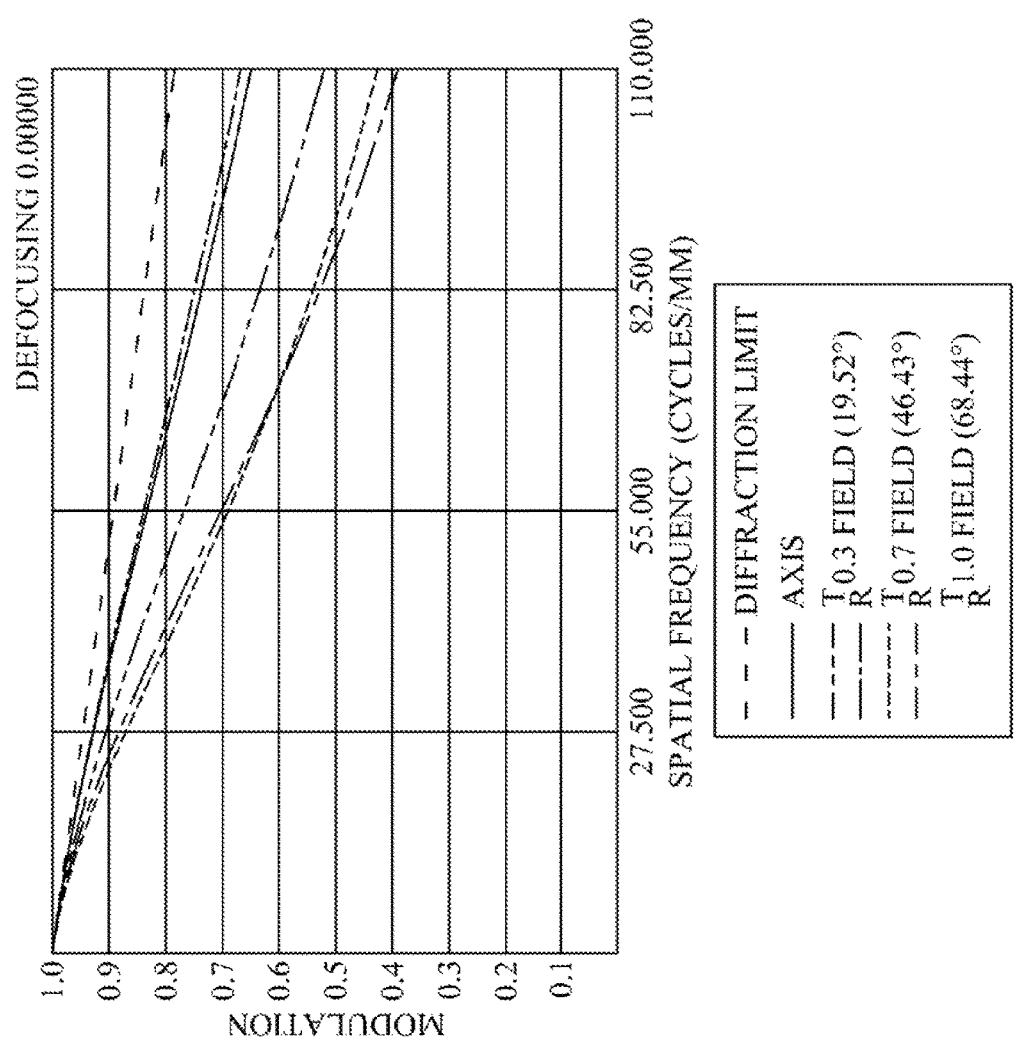
FIG. 1C is a characteristic diagram of modulation transfer of visible light spectrum according to the first embodiment of the present disclosure.
Figure 1D:
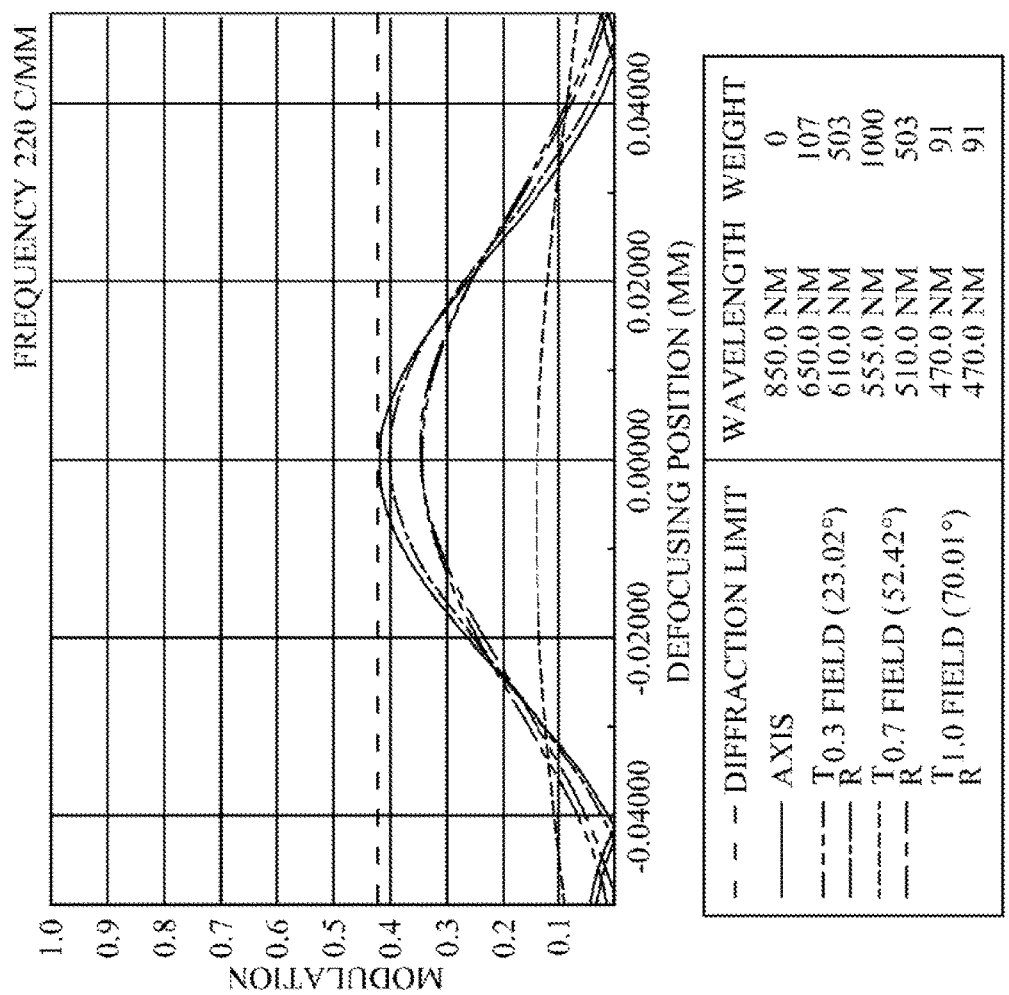
FIG. 1D is a diagram illustrating the through-focus MTF values for the visible light spectrum at the central field of view, 0.3 field of view and 0.7 field of view according to the first embodiment of the present disclosure.
Figure 1E:
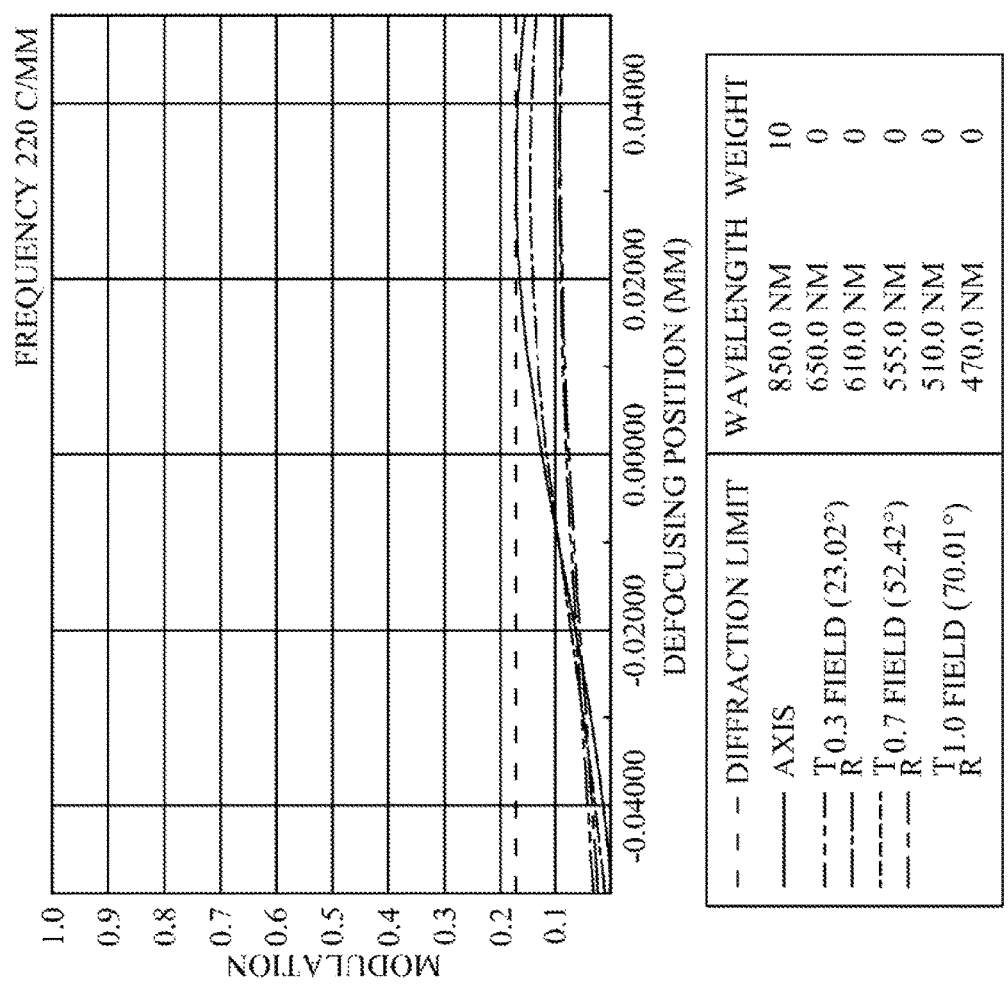
FIG. 1E is a diagram illustrating the through-focus MTF values for the infrared light spectrum at the central field of view, 0.3 field of view and 0.7 field of view according to the first embodiment of the present disclosure.

Please refer to FIGS. 1A and 1B, wherein FIG. 1A is a schematic view of the optical image capturing system according to the first embodiment of the present disclosure; FIG. 1B is a curve diagram illustrating the spherical aberration, astigmatism and optical distortion of the optical image capturing system in the sequence from left to right according to the first embodiment of the present disclosure; FIG. 1C is a characteristic diagram of modulation transfer of visible light spectrum according to the first embodiment of the present disclosure; FIG. 1D is a diagram illustrating the through-focus MTF values for the visible light spectrum at the central field of view, 0.3 field of view and 0.7 field of view of the first embodiment of the present disclosure. FIG. 1E is a diagram illustrating the through-focus MTF values for the infrared light spectrum at the central field of view, 0.3 field of view and 0.7 field of view of the first embodiment of the present disclosure. As shown in FIG. 1A, it may be known that, in the order from an object side to an image side, the optical image capturing system 10 includes a first lens 110, a second lens 120, an aperture 100, a third lens 130, a fourth lens 140, an infrared filter 170, an image plane 180 and an image sensing device 190.

The first lens 110 has the negative refractive power and is made of glass materials. The first lens 110 has a convex object-side surface 112 and a concave image-side surface 114, wherein both of them are aspheric. The central thickness of the first lens on the optical axis is denoted as TP1. The thickness of the first lens at height of ½ entrance pupil diameter (HEP) is denoted as ETP1.

A horizontal shift distance in parallel with the optical axis from an inflection point which is nearest to the optical axis on the object-side surface of the first lens to an intersection point on the optical axis of the object-side surface of the first lens is denoted as SGI111. A horizontal shift distance in parallel with the optical axis from an inflection point which is nearest to the optical axis on the image-side surface of the first lens to an intersection point on the optical axis of the image-side surface of the first lens is denoted as SGI121. The following conditions are met: SGI111=0 mm, SGI121=0 mm, |SGI111|/(|SGI111|+TP1)=0 and |SGI121|/(|SGI121|+TP1)=0.

A perpendicular distance to the optical axis from the inflection point which is nearest to the optical axis on the object-side surface of the first lens to an intersection point on the optical axis of the object-side surface of the first lens is denoted as HIF111. A perpendicular distance to the optical axis from the inflection point which is nearest to the optical axis on the image-side surface of the first lens to an intersection point on the optical axis of the image-side surface of the first lens is denoted as HIF121. The following conditions are met: HIF111=0 mm, HIF121=0 mm, HIF111/HOI=0 and HIF121/HOI=0.

The second lens 120 has the positive refractive power and is made of plastic materials. The second lens 120 has a concave object-side surface 122 and a convex image-side surface 124, wherein both of them are aspheric, and the object-side surface 122 thereof has an inflection point. The central thickness of the second lens on the optical axis is denoted as TP2. The thickness of the second lens at height of ½ entrance pupil diameter (HEP) is denoted as ETP2.

A horizontal shift distance in parallel with the optical axis from an inflection point which is nearest to the optical axis on the object-side surface of the second lens to an intersection point on the optical axis of the object-side surface of the second lens is denoted as SGI211. A horizontal shift distance in parallel with the optical axis from an inflection point which is nearest to the optical axis on the image-side surface of the second lens to an intersection point on the optical axis of the image-side surface of the second lens is denoted as SGI221. The following conditions are met: SGI211=−0.13283 mm and |SGI211|/(|SGI211|+TP2)=0.05045.

A perpendicular distance to the optical axis from the inflection point which is nearest to the optical axis on the object-side surface of the second lens to an intersection point on the optical axis of the object-side surface of the second lens is denoted as HIF211. A perpendicular distance to the optical axis from the inflection point which is nearest to the optical axis on the image-side surface of the second lens to an intersection point on the optical axis of the image-side surface of the second lens is denoted as HIF221. The following conditions are met: HIF211=2.10379 mm and HIF211/HOI=0.69478.

The third lens 130 has the negative refractive power and is made of plastic materials. The third lens 130 has a concave object-side surface 132 and a concave image-side surface 134, wherein both of them are aspheric, and the image-side surface 134 thereof has an inflection point. The central thickness of the third lens on the optical axis is denoted as TP3. The thickness of the third lens at height of ½ entrance pupil diameter (HEP) is denoted as ETP3.

A horizontal shift distance in parallel with the optical axis from an inflection point which is nearest to the optical axis on the object-side surface of the third lens to an intersection point on the optical axis of the object-side surface of the third lens is denoted as SGI311. A horizontal shift distance in parallel with the optical axis from an inflection point which is nearest to the optical axis on the image-side surface of the third lens to an intersection point on the optical axis of the image-side surface of the third lens is denoted as SGI321. The following conditions are met: SGI321=0.01218 mm, and |SGI321|/(|SGI321|+TP3)=0.03902.

A perpendicular distance to the optical axis from the inflection point which is nearest to the optical axis on the object-side surface of the third lens to the optical axis is denoted as HIF311. A perpendicular distance to the optical axis from the inflection point which is nearest to the optical axis on the image-side surface of the third lens to an intersection point on the optical axis of the image-side surface of the third lens is denoted as HIF321. The following conditions are met: HIF321=0.84373 mm and HIF321/HOI=0.27864.

The fourth lens 140 has the positive refractive power and is made of plastic materials. The fourth lens 140 has a convex object-side surface 142 and a convex image-side surface 144, wherein both of them are aspheric, and the image-side surface 144 thereof has an inflection point. The central thickness of the fourth lens on the optical axis is denoted as TP4. The thickness of the fourth lens at height of ½ entrance pupil diameter (HEP) is denoted as ETP4.

A horizontal shift distance in parallel with the optical axis from an inflection point which is nearest to the optical axis on the object-side surface of the fourth lens to an intersection point on the optical axis of the object-side surface of the fourth lens is denoted as SGI411. A horizontal shift distance in parallel with the optical axis from an inflection point which is nearest to the optical axis on the image-side surface of the fourth lens to an intersection point on the optical axis of the image-side surface of the fourth lens is denoted as SGI421. The following conditions are met: SGI411=0 mm, SGI421=−0.41627 mm, |SGI411|/(|SGI411|+TP4)=0 and |SGI421|/(|SGI421|+TP4)=0.25015.

A horizontal shift distance in parallel with the optical axis from an inflection point which is second nearest to the optical axis on the object-side surface of the fourth lens to an intersection point on the optical axis of the object-side surface of the fourth lens is denoted as SGI412. The following conditions are met: SGI412=0 mm and |SGI412|/(|SGI412|+TP4)=0.

A perpendicular distance to the optical axis from the inflection point which is nearest to the optical axis on the object-side surface of the fourth lens to the optical axis is denoted as HIF411. A perpendicular distance to the optical axis from the inflection point which is nearest to the optical axis on the image-side surface of the fourth lens to the optical axis is denoted as HIF421. The following conditions are met: HIF411=0 mm, HIF421=1.55079 mm, HIF411/HOI=0 and HIF421/HOI=0.51215.

A perpendicular distance to the optical axis from the inflection point which is second nearest to the optical axis on the object-side surface of the fourth lens to the optical axis is denoted as HIF412. The following conditions are met: HIF412=0 mm and HIF412/HOI=0.

The distance in parallel with the optical axis from a coordinate point on the object-side surface of the first lens at the height of ½ HEP to the image plane is denoted as ETL. The distance in parallel with the optical axis from a coordinate point on the object-side surface of the first lens at the height of ½ HEP to a coordinate point on the image-side surface of the fourth lens at the height of ½ HEP is denoted as EIN. The following conditions are satisfied: ETL=18.744 mm, EIN=12.339 mm, and EIN/ETL=0.658.

The present embodiment satisfies the following conditions: ETP1=0.949 mm, ETP2=2.483 mm, ETP3=0.345 mm, and ETP4=1.168 mm. The sum of the aforementioned ETP1 to ETP4 is denoted as SETP, and SETP=4.945 mm. The following conditions are also satisfied: TP1=0.918 mm, TP2=2.500 mm, TP3=0.300 mm, and TP4=1.248 mm. The sum of the aforementioned TP1 to TP4 is denoted as STP, and STP=4.966 mm, wherein SETP/STP=0.996.

In the present embodiment, the proportional relationship (ETP/TP) of the thickness (ETP) of each lens at the height of ½ entrance pupil diameter (HEP) to the central thickness (TP) of the lens corresponding to the surface on the optical axis is specifically manipulated, in order to achieve a balance between the ease of manufacturing the lenses and their ability to correct aberration. The following conditions are satisfied: ETP1/TP1=1.034, ETP2/TP2=0.993, ETP3/TP3=1.148, and ETP4/TP4=0.936.

In the present embodiment, the horizontal distance between two adjacent lenses at the height of ½ entrance pupil diameter (HEP) is manipulated, in order to achieve a balance among the degree of "miniaturization" for the length HOS of the optical image capturing system, the ease of manufacturing the lenses and their capability of aberration correction. In particular, the proportional relationship (ED/IN) of the horizontal distance (ED) between the two adjacent lenses at the height of ½ entrance pupil diameter (HEP) to the horizontal distance (IN) between the two adjacent lenses on the optical axis is controlled. The following conditions are satisfied: the horizontal distance in parallel with the optical axis between the first and second lenses at the height of ½ HEP is denoted as ED12, and ED12=4.529 mm; the horizontal distance in parallel with the optical axis between the second and third lenses at the height of ½ HEP is denoted as ED23, and ED23=2.735 mm; the horizontal distance in parallel with the optical axis between the third and fourth lenses at the height of ½ HEP is denoted as ED34, and ED34=0.131 mm.

The horizontal distance between the first and second lenses on the optical axis is denoted as IN12, wherein IN12=4.571 mm and the ratio ED12/IN12=0.991. The horizontal distance between the second and third lenses on the optical axis is denoted as IN23, wherein IN23=2.752 mm and the ratio ED23/IN23=0.994. The horizontal distance between the third and fourth lenses on the optical axis is denoted as IN34, where IN34=0.094 mm and ED34/IN34=1.387.

The horizontal distance in parallel with the optical axis from a coordinate point on the image-side surface of the fourth lens at the height of ½ HEP to the image plane is denoted as EBL, and EBL=6.405 mm. The horizontal distance in parallel with the optical axis from the intersection point on the optical axis of the image-side surface of the fourth lens to the image plane is denoted as BL, and BL=6.3642 mm. The embodiment of the present disclosure may satisfy the following condition: EBL/BL=1.00641. In the present embodiment, the distance in parallel with the optical axis from a coordinate point on the image-side surface of the fourth lens at the height of ½ HEP to the infrared filter is denoted as EIR, and EIR=0.065 mm. The distance in parallel with the optical axis from the intersection point on the optical axis of the image-side surface of the fourth lens to the infrared filter is denoted as PIR, and PIR=0.025 mm. The following condition is satisfied: EIR/PIR=2.631.

The infrared filter 170 is made of glass materials and configured between the fourth lens 140 and the image plane 180. Besides, the infrared filter 170 does not affect the focal length of the optical image capturing system.

In the optical image capturing system of the first embodiment, the focal length of the optical image capturing system is f, the entrance pupil diameter of the optical image capturing system is HEP, and half of the maximum angle of view of the optical image capturing system is HAF. The detailed parameters are shown as follows: f=2.6841 mm, f/HEP=2.7959, HAF=70 deg. and tan(HAF)=2.7475.

In the optical image capturing system of the first embodiment, the focal length of the first lens 110 is f1, and the focal length of the fourth lens 140 is f4. The following conditions are met: f1=−5.4534 mm, |f/f1|=0.4922, f4=2.7595 mm and |f1/f4|=1.9762.

In the optical image capturing system of the first embodiment, the focal length of the second lens 120 is f2, and the focal length of the third lens 130 is f3. The following conditions are met: |f2|+|f3|=13.2561 mm, |f1|+|f4|=8.2129 mm and |f2|+|f3|>|f1|+|f4|.

The ratio of the focal length f of the optical image capturing system to a focal length fp of each of lenses with positive refractive powers is denoted as PPR. The ratio of the focal length f of the optical image capturing system to a focal length fn of each of lenses with negative refractive powers is denoted as NPR. In the optical image capturing system of the first embodiment, a sum of the PPR of all lenses with positive refractive power is ΣPPR=|f/f2|+|f/f4|=1.25394, and a sum of the NPR of all lenses with negative refractive power is $\Sigma NPR=|f/f1|+|f/f2|=1.21490$, wherein $\Sigma PPR/\Sigma NPR|=1.03213$. The following conditions are also met: $|f/f1|=0.49218$, $|f/f2|=0.28128$, $|f/f3|=0.72273$ and $|f/f4|=0.97267$.

In the optical image capturing system of the first embodiment, a distance from the object-side surface 112 of the first lens to the image-side surface 144 of the fourth lens is denoted as InTL. A distance from the object-side surface 112 of the first lens to the image plane 180 is denoted as HOS. A distance from the aperture 100 to the image plane 180 is denoted as InS. Half of a diagonal length of an effective sensing field of the image sensing device 190 is denoted as HOI. A distance from the image-side surface 144 of the fourth lens to the image plane 180 is denoted as InB. The following conditions are met: InTL+InB=HOS, HOS=18.74760 mm, HOI=3.088 mm, HOS/HOI=6.19141, HOS/f=6.9848, InTL/HOS=0.6605, InS=8.2310 mm and InS/HOS=0.4390.

In the optical image capturing system of the first embodiment, the sum of central thicknesses of all lenses with refractive power on the optical axis is denoted as $\Sigma TP$. The following conditions are met: $\Sigma TP=4.9656$ mm and $\Sigma TP/InTL=0.4010$. Therefore, both contrast ratio of the image formation in the optical image capturing system and the yield rate of manufacturing the lenses may be simultaneously achieved well, and an appropriate back focal length may be provided so as to accommodate other optical elements in the optical image capturing system.

In the optical image capturing system of the first embodiment, the curvature radius of the object-side surface 112 of the first lens is denoted as R1. The curvature radius of the image-side surface 114 of the first lens is denoted as R2. The following condition is met: $|R1/R2|=9.6100$. Hence, the first lens element has a suitable magnitude of the positive refractive power, so as to prevent the spherical aberration from increasing too fast.

In the optical image capturing system of the first embodiment, the curvature radius of the object-side surface 142 of the fourth lens is denoted as R7. The curvature radius of the image-side surface 144 of the fourth lens is denoted as R8. The following condition is satisfied: $(R7-R8)/(R7+R8)=-35.5932$. Hence, the astigmatism generated by the optical image capturing system may be easier to correct.

In the optical image capturing system of the first embodiment, the sum of the focal lengths of all lenses with positive refractive power is denoted as $\Sigma PP$, which meets the following conditions: $\Sigma PP=12.30183$ mm, and $f4/\Sigma PP=0.22432$. Therefore, the positive refractive power of the fourth lens 140 may be distributed to other lenses with positive refractive power appropriately, so as to suppress noticeable aberrations generated in the process of the incident light travelling inwardly into the optical image capturing system.

In the optical image capturing system of the first embodiment, the sum of the focal lengths of all lenses with negative refractive power is denoted as $\Sigma NP$, which meets the following conditions: $\Sigma NP=-14.6405$ mm, and $f1/\Sigma NP=0.59488$. Therefore, the negative refractive power of the first lens 110 may be distributed to other lenses with negative refractive power appropriately, so as to suppress noticeable aberrations generated in the process of the incident light travelling inwardly into the optical image capturing system.

In the optical image capturing system of the first embodiment, the distance between the first lens 110 and the second lens 120 on the optical axis is denoted as IN12. The following conditions are satisfied: IN12=4.5709 mm, and IN12/f=1.70299. Hence, the chromatic aberration of the lenses may be mitigated, so as to improve the performance thereof.

In the optical image capturing system of the first embodiment, the distance between the second lens 120 and the third lens 130 on the optical axis is denoted as IN23. The following conditions are satisfied: IN23=2.7524 mm, IN23/f=1.02548. Hence, the chromatic aberration of the lenses may be mitigated, so as to improve the performance thereof.

In the optical image capturing system of the first embodiment, the distance between the third lens 130 and the fourth lens 140 on the optical axis is denoted as IN34. The following conditions are satisfied: IN34=0.0944 mm and IN34/f=0.03517. Hence, the chromatic aberration of the lenses may be mitigated, so as to improve the performance thereof.

In the optical image capturing system of the first embodiment, central thicknesses of the first lens 110 and the second lens 120 on the optical axis are denoted as TP1 and TP2, respectively. The following conditions are satisfied: TP1=0.9179 mm, TP2=2.5000 mm, TP1/TP2=0.36715 and (TP1+IN12)/TP2=2.19552. Hence, the sensitivity formed via the optical image capturing system may be easier to control, and the performance thereof may be improved.

In the optical image capturing system of the first embodiment, central thicknesses of the third lens 130 and the fourth lens 140 on the optical axis are denoted as TP3 and TP4, respectively. The distance between the aforementioned two lenses on the optical axis is denoted as IN34. The following conditions are satisfied: TP3=0.3 mm, TP4=1.2478 mm, TP3/TP4=0.24043 and (TP4+IN34)/TP3=4.47393. Hence, the sensitivity formed via the optical image capturing system may be easier to control, and the total height of the optical image capturing system may be reduced.

In the optical image capturing system of the first embodiment, the following condition is satisfied: IN23/(TP2+IN23+TP3)=0.49572. Hence, the aberration generated in the process of the incident light travelling inwardly into the optical image capturing system may be corrected slightly layer upon layer, and the total height of the optical image capturing system may be reduced.

In the optical image capturing system of the first embodiment, a horizontal shift distance in parallel with the optical axis from a maximum effective half diameter position to an intersection point of the optical axis and the object-side surface 142 of the fourth lens is denoted as InRS41. A horizontal shift distance in parallel with the optical axis from a maximum effective half diameter position to an intersection point of the optical axis and the image-side surface 144 of the fourth lens is denoted as InRS42. A central thickness of the fourth lens 140 is denoted as TP4. The following conditions are satisfied: InRS41=0.2955 mm, InRS42=-0.4940 mm, |InRS41|+|InRS42|=0.7894 mm, |InRS41|/TP4=0.23679 and |InRS42|/TP4=0.39590. Hence, the configuration is beneficial to manufacture and form the lenses, and to effectively keep the miniaturization of the optical image capturing system.

In the optical image capturing system of the first embodiment, a perpendicular distance to the optical axis between a critical point C41 on the object-side surface 142 of the fourth lens and the optical axis is denoted as HVT41. A perpendicular distance to the optical axis between a critical point C42 on the image-side surface 144 of the fourth lens and the optical axis is denoted as HVT42. The following conditions are satisfied: HVT41=0 mm and HVT42=0 mm.

In the optical image capturing system of the present embodiment, the following condition is satisfied: HVT42/HOI=0.

In the optical image capturing system of the present embodiment, the following condition is satisfied: HVT42/HOS=0.

In the optical image capturing system of the first embodiment, the Abbe number of the first lens is denoted as NA1. The Abbe number of the second lens is denoted as NA2. The Abbe number of the third lens is denoted as NA3. The Abbe number of the fourth lens is denoted as NA4. The following condition is satisfied: |NA1−NA2|=0.0351. Hence, the chromatic aberration of the optical image capturing system may be easier to correct.

In the optical image capturing system of the first embodiment, the TV distortion and optical distortion when images are formed in the optical image capturing system are TDT and ODT, respectively. The following conditions are satisfied: TDT=37.4846% and ODT=−55.3331%.

In the present embodiment of the disclosure, the light of any field of view may be further divided into the sagittal ray and tangential ray, and the spatial frequency of 220 cycles/mm serves as the benchmark for assessing the focus shifts and the values of MTF. The focus shifts where the through-focus MTF values of the visible sagittal ray at the central field of view, 0.3 field of view and 0.7 field of view of the optical image capturing system are at their respective maximums are denoted as VSFS0, VSFS3 and VSFS7 (the unit of measurement: mm), respectively, wherein the values of VSFS0, VSFS3 and VSFS7 equal to 0.00000 mm, 0.00000 mm and 0.00000 mm, respectively. The maximum values of the through-focus MTF of the visible sagittal ray at the central field of view, 0.3 field of view and 0.7 field of view are denoted as VSMTF0, VSMTF3 and VSMTF7, respectively, wherein the values of VSMTF0, VSMTF3 and VSMTF7 equal to 0.416, 0.397 and 0.342, respectively. The focus shifts where the through-focus MTF values of the visible tangential ray at the central field of view, 0.3 field of view and 0.7 field of view of the optical image capturing system are at their respective maximums are denoted as VTFS0, VTFS3 and VTFS7 (the unit of measurement: mm), respectively, wherein the values of VTFS0, VTFS3 and VTFS7 equal to 0.00000 mm, 0.00000 mm, and −0.01000 mm, respectively. The maximum values of the through-focus MTF of the visible tangential ray at the central field of view, 0.3 field of view and 0.7 field of view are denoted as VTMTF0, VTMTF3 and VTMTF7, respectively, wherein the values of VTMTF0, VTMTF3 and VTMTF7 equal to 0.416, 0.34 and 0.139, respectively. The average focus shift (position) of the aforementioned focus shifts of the visible sagittal ray at three fields of view and the visible tangential ray at three fields of view is denoted as AVFS (the unit of measurement: mm), which meets the absolute value |(VSFS0+VSFS3+VSFS7+VTFS0+VTFS3+VTFS7)/6|=|−0.00200 mm|.

The focus shifts where the through-focus MTF values of the infrared sagittal ray at the central field of view, 0.3 field of view and 0.7 field of view of the optical image capturing system are at their respective maximums are denoted as ISFS0, ISFS3 and ISFS7 (the unit of measurement: mm), respectively, wherein the values of ISFS0, ISFS3 and ISFS7 equal to 0.03000 mm, 0.03300 mm, and 0.03300 mm, respectively. The average focus shift (position) of the aforementioned focus shifts of the infrared sagittal ray at three fields of view is denoted as AISFS. The maximum values of the through-focus MTF of the infrared sagittal ray at the central field of view, 0.3 field of view and 0.7 field of view are denoted as ISMTF0, ISMTF3, and ISMTF7, respectively, wherein the values of ISMTF0, ISMTF3 and ISMTF7 equal to 0.169, 0.148 and 0.089, respectively. The focus shifts where the through-focus MTF values of the infrared tangential ray at the central field of view, 0.3 field of view and 0.7 field of view of the optical image capturing system are at their respective maximums are denoted as ITFS0, ITFS3 and ITFS7 (the unit of measurement: mm), respectively, wherein the values of ITFS0, ITFS3 and ITFS7 equal to 0.03, 0.028 and 0.005, respectively. The average focus shift (position) of the aforementioned focus shifts of the infrared tangential ray at three fields of view is denoted as AITFS (the unit of measurement: mm). The maximum values of the through-focus MTF of the infrared tangential ray at the central field of view, 0.3 field of view and 0.7 field of view are denoted as ITMTF0, ITMTF3 and ITMTF7, respectively, wherein the values of ITMTF0, ITMTF3 and ITMTF7 equal to 0.169, 0.093 and 0.00000, respectively. The average focus shift (position) of the aforementioned focus shifts of the infrared sagittal ray at the three fields of view and of the infrared tangential ray at the three fields of view is denoted as AIFS (the unit of measurement: mm), which meets the absolute value of |(ISFS0+ISFS3+ISFS7+ITFS0+ITFS3+ITFS7)/6|=|0.02600 mm|.

The focus shift between the focal points for the visible light and the infrared light at their central fields of view (RGB/IR) of the entire optical image capturing system (i.e. the wavelength of 850 nm versus the wavelength of 555 nm, the unit of measurement: mm) is denoted as FS (the distance between the first and second image planes on the optical axis), which meets the absolute value of |(VSFS0+VTFS0)/2−(ISFS0+ITFS0)/2|=|0.03000 mm|. The difference (focus shift) between the average focus shift of the visible light at the three fields of view and the average focus shift of the infrared light at the three fields of view (RGB/IR) of the entire optical image capturing system is denoted as AFS (i.e. the wavelength of 850 nm versus the wavelength of 555 nm, the unit of measurement: mm), which meets the absolute value of |AIFS−AVFS|=|0.02800 mm|.

In the optical image capturing system of the present embodiment, the modulation transfer rates (values of MTF) for the visible light at the quarter spatial frequency (110 cycles/mm) at positions of the optical axis, 0.3 HOI and 0.7 HOI on the image plane are denoted as MTFQ0, MTFQ3 and MTFQ7 respectively. The following conditions are satisfied: MTFQ0 is about 0.65, MTFQ3 is about 0.52 and MTFQ7 is about 0.42. The modulation transfer rates (values of MTF) for the visible light at the spatial frequency of 55 cycles/mm at positions of the optical axis, 0.3 HOI and 0.7 HOT on the image plane are denoted as MTFE0, MTFE3 and MTFE7 respectively. The following conditions are satisfied: MTFE0 is about 0.84, MTFE3 is about 0.76 and MTFE7 is about 0.69.

Table 1 and Table 2 below should be incorporated into the reference of the present embodiment.

TABLE 1

Lens Parameters for the First Embodiment
f(focal length) = 2.6841 mm; f/HEP = 2.7959; HAF(half angle of view) = 70 deg.; tan(HAF) = 2.7475

| Surface No. | | Curvature Radius | Thickness (mm) | Material | Refractive Index | Abbe No. | Focal Distance |
|---|---|---|---|---|---|---|---|
| 0 | Object | Plane | At infinity | | | | |
| 1 | Lens 1 | 31.98102785 | 0.918 | Glass | 1.688 | 50.26 | −5.453 |
| 2 | | 3.327880578 | 4.571 | | | | |
| 3 | Lens 2 | −15.2556818 | 2.500 | Plastic | 1.642 | 22.46 | 9.542 |
| 4 | | −4.681543531 | 2.528 | | | | |
| 5 | Aperture | Plane | 0.225 | | | | |
| 6 | Lens 3 | −2.453543123 | 0.300 | Plastic | 1.642 | 22.46 | −3.714 |
| 7 | | 127.8664454 | 0.094 | | | | |
| 8 | Lens 4 | 2.697747363 | 1.248 | Plastic | 1.544 | 56.09 | 2.759 |
| 9 | | −2.853715061 | 0.725 | | | | |
| 10 | Infrared Filter | Plane | 2.000 | BK7_SCHOTT | 1.517 | 64.13 | |
| 11 | | Plane | 3.640 | | | | |
| 12 | Image Plane | Plane | | | | | |

Reference Wavelength = 555 nm; Shield Position: The $3^{rd}$ surface with clear aperture of 3.0 mm

TABLE 2

Aspheric Coefficients of the First Embodiment
Table 2: Aspheric Coefficients

| | Surface No. | | | | | |
|---|---|---|---|---|---|---|
| | 3 | 4 | 6 | 7 | 8 | 9 |
| k = | −2.918829E+01 | −3.214789E+00 | −1.504539E+01 | −2.970417E+01 | −1.613370E+01 | −1.145951E+00 |
| $A_4$ = | −9.004096E−04 | −9.725260E−06 | 8.890018E−05 | 3.634454E−02 | 9.587367E−03 | −4.742020E−03 |
| $A_6$ = | 2.391364E−04 | −8.096303E−05 | −1.166688E−02 | −3.060142E−02 | −3.693991E−03 | 1.232422E−03 |
| $A_8$ = | −2.421089E−05 | 7.787465E−07 | −5.720942E−04 | 8.833265E−03 | 8.653836E−04 | 3.333400E−04 |
| $A_{10}$ = | 1.716292E−06 | 3.517517E−07 | 8.305770E−04 | −1.362695E−03 | −7.093620E−05 | −2.583094E−06 |
| $A_{12}$ = | 0.000000E+00 | 0.000000E+00 | 0.000000E+00 | 0.000000E+00 | 0.000000E+00 | 0.000000E+00 |

Table 1 is the detailed structural data for the first embodiment in FIG. 1, wherein the unit of the curvature radius, the central thickness, the distance and the focal length is millimeters (mm), and surfaces 0-14 illustrate the surfaces in the order from the object side to the image plane of the optical image capturing system. Table 2 shows the aspheric coefficients of the first embodiment, wherein k is the conic coefficient in the aspheric surface curve equation, and $A_1$-$A_{20}$ are the first to the twentieth order aspheric surface coefficients respectively. Besides, the tables of following embodiments exactly correspond to their respective schematic views and the diagrams of aberration curves, and the definitions of parameters therein are identical to those in the Table 1 and the Table 2 of the first embodiment, so that the repetitive details are not stated here.

Second Embodiment

Figure 2A:
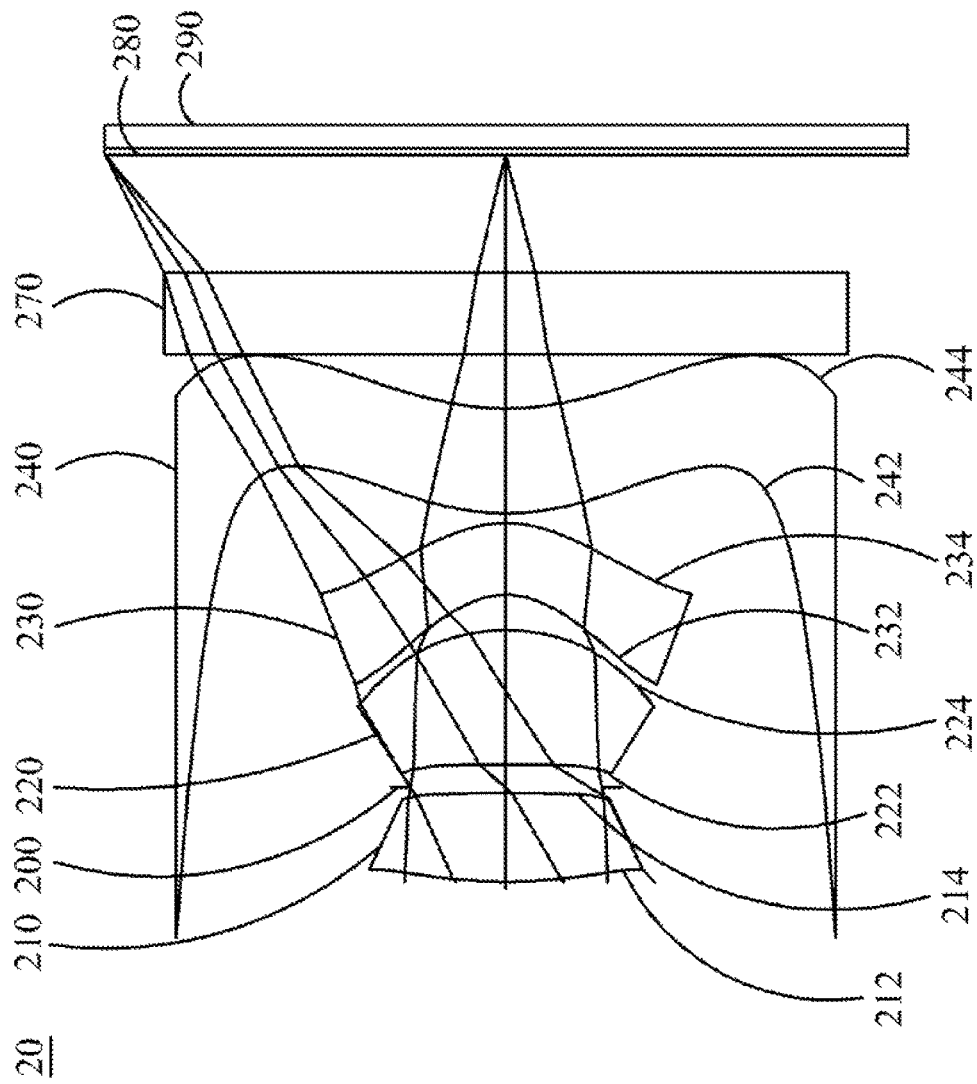
FIG. 2A is a schematic view of the optical image capturing system according to the second embodiment of the present disclosure.
Figure 2B:
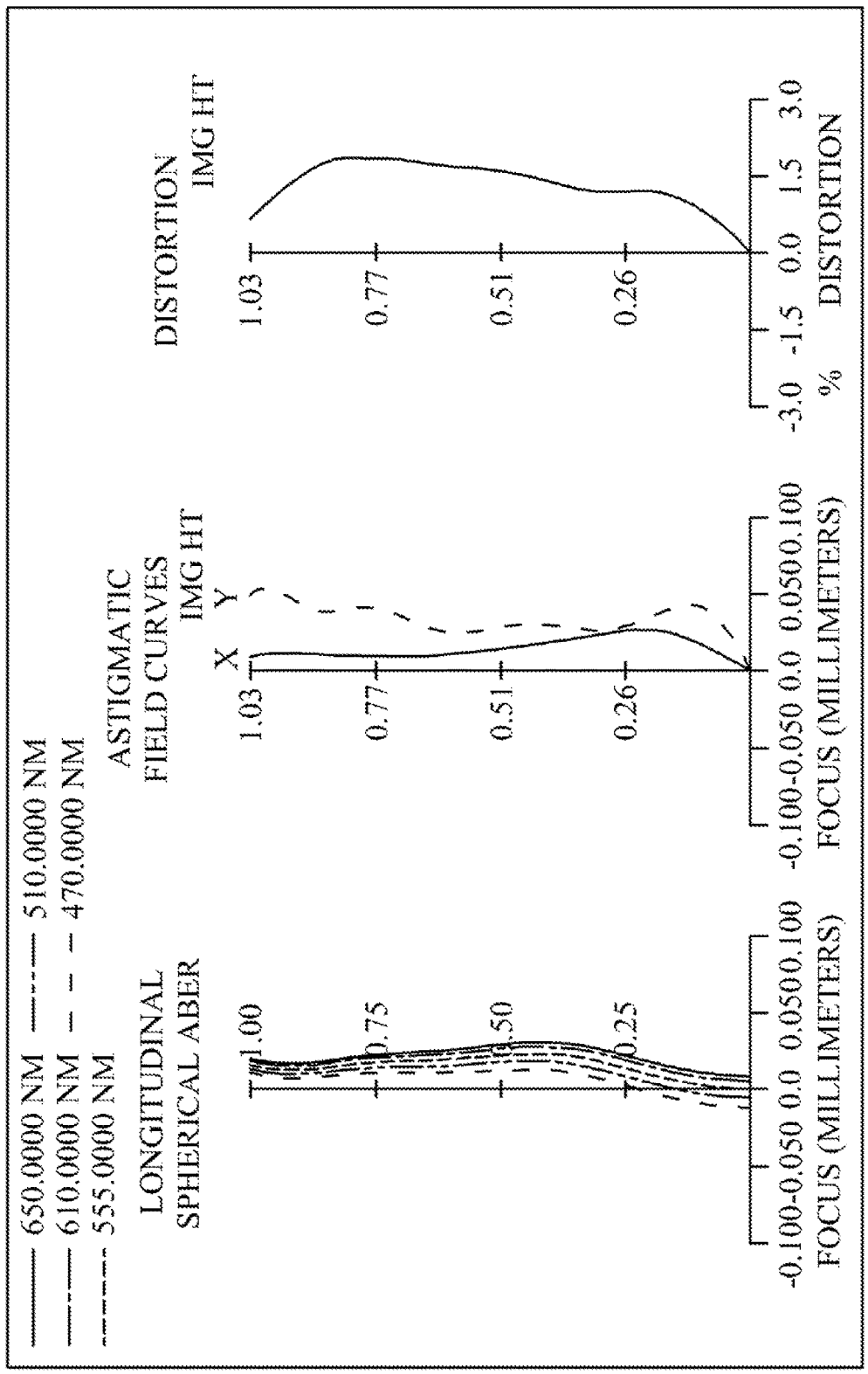
FIG. 2B is a curve diagram illustrating the spherical aberration, astigmatism and optical distortion of the optical image capturing system in the sequence from left to right according to the second embodiment of the present disclosure.
Figure 2C:
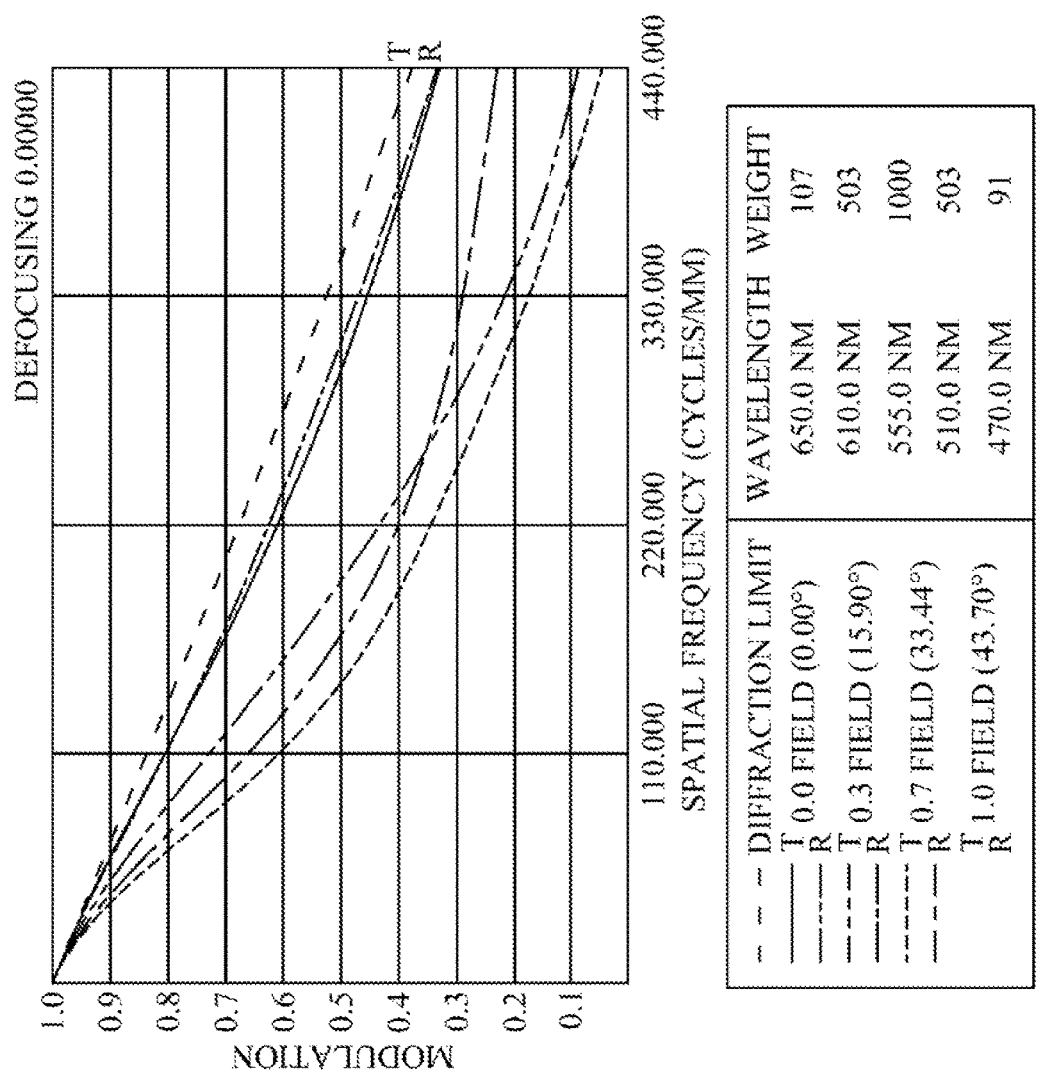
FIG. 2C is a characteristic diagram of modulation transfer of visible light spectrum according to the second embodiment of the present disclosure.
Figure 2D:
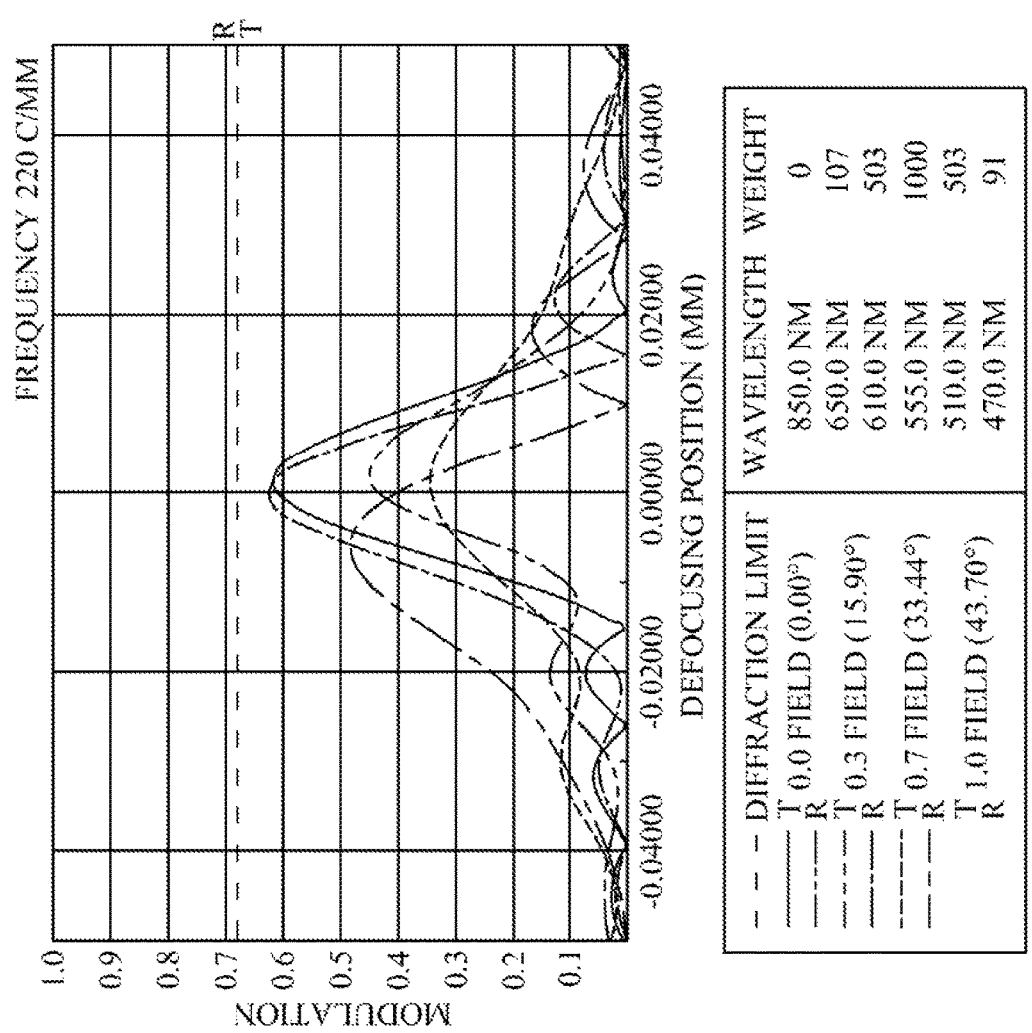
FIG. 2D is a diagram illustrating the through-focus MTF values for the visible light spectrum at the central field of view, 0.3 field of view and 0.7 field of view according to the second embodiment of the present disclosure.
Figure 2E:
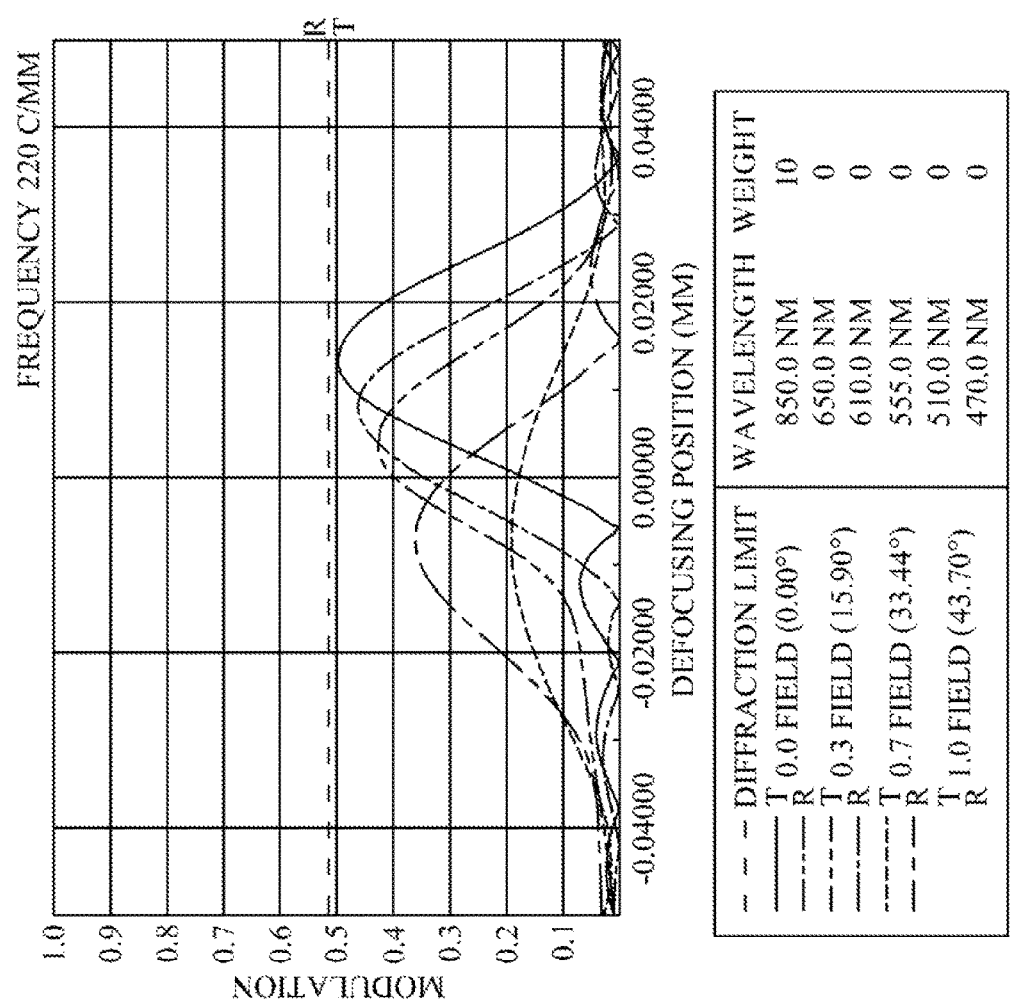
FIG. 2E is a diagram illustrating the through-focus MTF values for the infrared light spectrum at the central field of view, 0.3 field of view and 0.7 field of view according to the second embodiment of the present disclosure.

Please refer to FIGS. 2A and 2B, wherein FIG. 2A is a schematic view of the optical image capturing system according to the second embodiment of the present disclosure. FIG. 2B is a curve diagram illustrating the spherical aberration, astigmatism and optical distortion of the optical image capturing system in the sequence from left to right according to the second embodiment of the present disclosure. FIG. 2C is a characteristic diagram of modulation transfer of visible light spectrum according to the second embodiment of the present disclosure. FIG. 2D is a diagram illustrating the through-focus MTF values for the visible light spectrum at the central field of view, 0.3 field of view and 0.7 field of view of the second embodiment of the present disclosure. FIG. 2E is a diagram illustrating the through-focus MTF values for the infrared light spectrum at the central field of view, 0.3 field of view and 0.7 field of view of the second embodiment of the present disclosure. As shown in FIG. 2A, in the order from an object side to an image side, the optical image capturing system 20 includes a first lens 210, an aperture 200, a second lens 220, a third lens 230, a fourth lens 240, an infrared filter 270, an image plane 280 and an image sensing device 290.

The first lens 210 has positive refractive power and is made of plastic material. The first lens 210 has a convex object-side surface 212 and a convex image-side surface 214, wherein both of them are aspheric. The object-side surface 212 has one inflection point.

The second lens 220 has positive refractive power and is made of plastic material. The second lens 220 has a concave object-side surface 222 and a convex image-side surface 224, wherein both of them are aspheric.

The third lens 230 has negative refractive power and is made of plastic material. The third lens 230 has a concave object-side surface 232 and a convex image-side surface 234, wherein both of them are aspheric. The object-side surface 232 and image-side surface 234 respectively have one inflection point.

The fourth lens 240 has positive refractive power and is made of plastic material. The fourth lens 240 has a convex object-side surface 242 and a concave image-side surface 244, wherein both of them are aspheric. The object-side surface 242 and image-side surface 244 respectively have one inflection point.

The infrared filter 270 is made of glass material and is configured between the fourth lens 240 and the image plane 280. The infrared filter 270 does not affect the focal length of the optical image capturing system.

Table 3 and Table 4 below should be incorporated into the reference of the present embodiment.

Second Embodiment (Primary reference wavelength = 555 nm)

| MTFQ0 | MTFQ3 | MTFQ7 | MTFH0 | MTFH3 | MTFH7 |
|---|---|---|---|---|---|
| 0.8 | 0.73 | 0.6 | 0.62 | 0.44 | 0.35 |
| ETP1 | ETP2 | ETP3 | ETP4 | ED12/ED23 | SED |
| 0.195 | 0.292 | 0.232 | 0.267 | 1.954 | 0.256 |
| ETP1/TP1 | ETP2/TP2 | ETP3/TP3 | ETP4/TP4 | ED23/ED34 | SETP |
| 0.856 | 0.842 | 1.244 | 0.985 | 0.239 | 0.987 |

TABLE 3

Lens Parameters of the Second Embodiment
f(focal length) = 1.05665 mm; f/HEP = 2.03; HAF(half angle of view) = 43.706 deg.

| Surface No. | | Curvature Radius | Thickness (mm) | Material | Refractive Index | Abbe No. | Focal Length |
|---|---|---|---|---|---|---|---|
| 0 | Object | 1E+18 | 600 | | | | |
| 1 | Lens 1 | 1.331813714 | 0.228 | Plastic | 1.535 | 56.270 | 2.163 |
| 2 | | −8.446919667 | 0.014 | | | | |
| 3 | Aperture | 1E+18 | 0.060 | | | | |
| 4 | Lens 2 | −14.45806528 | 0.347 | Plastic | 1.535 | 56.270 | 0.992 |
| 5 | | −0.517646901 | 0.092 | | | | |
| 6 | Lens 3 | −0.200271154 | 0.186 | Plastic | 1.642 | 22.455 | −3.012 |
| 7 | | −0.304751928 | 0.025 | | | | |
| 8 | Lens 4 | 0.655352231 | 0.271 | Plastic | 1.642 | 22.455 | 8.972 |
| 9 | | 0.618418086 | 0.141 | | | | |
| 10 | Infrared Filter | 1E+18 | 0.210 | BK7_SCHOTT | 1.517 | 64.13 | |
| 11 | | 1E+18 | 0.305 | | | | |
| 12 | Image Plane | 1E+18 | 0.000 | | | | |

Reference Wavelength = 555 nm; Shield Position: The $1^{st}$ surface with clear aperture of 0.350 mm; The $2^{nd}$ surface with clear aperture of 0.266 mm; The $5^{th}$ surface with clear aperture of 0.379 mm; and the $9^{th}$ surface with clear aperture of 0.846 mm

TABLE 4

The Aspheric Coefficients of the Second Embodiment
Table 4: Aspheric Coefficients

| Surface No. | 1 | 2 | 4 | 5 | 6 | 7 |
|---|---|---|---|---|---|---|
| k = | −4.308951E+00 | 6.180520E+02 | −1.204081E+01 | −2.131466E+01 | −1.900810E+00 | −6.294464E+00 |
| $A_4$ = | 4.096948E−01 | −4.442368E+00 | −4.740325E+00 | −1.953100E401 | −6.791635E+00 | −1.375890E+01 |
| $A_6$ = | −1.586217E+01 | 4.262068E+02 | 2.744045E+02 | 4.528299E+02 | 3.105206E+02 | 3.293478E+02 |
| $A_8$ = | −4.376258E+02 | −3.115787E+04 | −1.757580E+04 | −1.043515E+04 | −9.502810E+03 | −4.944519E+03 |
| $A_{10}$ = | 2.666734E+04 | 1.296275E+06 | 6.196136E+05 | 1.652989E+05 | 1.810940E+05 | 4.922497E+04 |
| $A_{12}$ = | −5.679208E+05 | −3.299585E+07 | −1.329600E+07 | −1.718422E+06 | −2.143959E+06 | −3.179791E+05 |
| $A_{14}$ = | 6.297850E+06 | 5.225210E+08 | 1.735960E+08 | 1.147029E+07 | 1.602318E+07 | 1.305551E+06 |
| $A_{16}$ = | −3.796686E+07 | −5.032166E+09 | −1.338851E+09 | −4.647002E+07 | −7.334189E+07 | −3.258203E+06 |
| $A_{18}$ = | 1.127544E+08 | 2.701862E+10 | 5.554209E+09 | 1.012471E+08 | 1.867505E+08 | 4.460982E+06 |
| $A_{20}$ = | −1.170157E+08 | −6.206941E+10 | −9.501532E+09 | −8.843804E+07 | −2.018276E+08 | −2.534585E+06 |

| Surface No. | 8 | 9 |
|---|---|---|
| k = | −6.268062E−01 | −1.866268E+01 |
| $A_4$ = | −5.444732E−01 | 2.511365E+00 |
| $A_6$ = | −1.069172E+01 | −1.678163E+01 |
| $A_8$ = | 7.776263E+01 | 5.702203E+01 |
| $A_{10}$ = | −3.728942E+02 | −1.268612E+02 |
| $A_{12}$ = | 1.134101E+03 | 1.844780E+02 |
| $A_{14}$ = | −2.096031E+03 | −1.709528E+02 |
| $A_{16}$ = | 2.161775E+03 | 9.427931E+01 |
| $A_{18}$ = | −1.135789E+03 | −2.779823E+01 |
| $A_{20}$ = | 2.377931E+02 | 3.357036E+00 |

In the second embodiment, the form of the aspheric surface equation therein is presented as that in the first embodiment. Besides, the definition of parameters in the following tables is equivalent to that in the first embodiment, so that the repetitive details are not stated here.

The following conditional values may be obtained according to the data in Table 3 and Table 4.

-continued

Second Embodiment (Primary reference wavelength = 555 nm)

| ETL | EBL | EIN | EIR | PIR | STP |
|---|---|---|---|---|---|
| 1.859 | 0.616 | 1.243 | 0.101 | 0.141 | 1.033 |
| EIN/ETL | SETP/EIN | EIR/PIR | EBL/BL | BL | SETP/STP |
| 0.669 | 0.794 | 0.717 | 0.9392 | 0.6559 | 0.955 |

-continued

Second Embodiment (Primary reference wavelength = 555 nm)

| ED12 | ED23 | ED34 | ED12/IN12 | ED23/IN23 | ED34/IN34 |
|---|---|---|---|---|---|
| 0.070 | 0.036 | 0.150 | 0.945 | 0.391 | 5.997 |
| InRS41 | InRS42 | HVT41 | HVT42 | ODT % | TDT % |
| 0.09499 | 0.09161 | 0.53957 | 0.63708 | 1.78308 | 1.16859 |
| \|f/f1\| | \|f/f2\| | \|f/f3\| | \|f/f4\| | \|f1/f2\| | \|f2/f3\| |
| 0.48860 | 1.06478 | 0.35083 | 0.11777 | 2.17927 | 0.32948 |
| | | Σ PPR/\|Σ | | | |
| Σ PPR | Σ NPR | NPR\| | Σ PP | Σ NP | f1/Σ PP |
| 1.18256 | 0.83943 | 1.40877 | 9.96421 | −0.84925 | 0.90041 |
| f4/Σ NP | IN12/f | IN23/f | IN34/f | TP3/f | TP4/f |
| −2.54651 | 0.07012 | 0.08660 | 0.02366 | 0.17622 | 0.25686 |
| InTL | HOS | HOS/HOI | InS/HOS | InTL/HOS | Σ TP/InTL |
| 1.22410 | 1.88000 | 1.82879 | 0.87104 | 0.65112 | 0.84428 |
| (TP1 + | | | | | IN23/(TP2 + |
| IN12)/TP2 | (TP4 + IN34)/TP3 | TP1/TP2 | TP3/TP4 | | IN23 + TP3) |
| 0.87079 | 1.59187 | 0.65752 | 0.68606 | | 0.14638 |
| \|InRS41\|/TP4 | | \|InRS42\|/TP4 | HVT42/HOI | HVT42/HOS | |
| 0.3500 | | 0.3375 | 0.6197 | 0.3389 | |
| VSFS0 | VSFS3 | VSFS7 | VTFS0 | VTFS3 | VTFS7 |
| 0.0000 | 0.0000 | −0.0050 | 0.0000 | 0.0025 | 0.0000 |
| VSMTF0 | VSMTF3 | VSMTF7 | VTMTF0 | VTMTF3 | VTMTF7 |
| 0.6450 | 0.6570 | 0.5120 | 0.6450 | 0.4950 | 0.3830 |
| ISFS0 | ISFS3 | ISFS7 | ITFS0 | ITFS3 | ITFS7 |
| 0.0125 | 0.0075 | −0.0075 | 0.0125 | 0.0050 | −0.0075 |
| ISMTF0 | ISMTF3 | ISMTF7 | ITMTF0 | ITMTF3 | ITMTF7 |
| 0.5490 | 0.5080 | 0.4010 | 0.5490 | 0.4740 | 0.2390 |
| FS | | AIFS | AVFS | | AFS |
| 0.0125 | | 0.0038 | −0.0004 | | 0.0042 |

The following conditional values may be obtained according to the data in Table 3 and Table 4.

Values Related to Inflection Point of Second Embodiment
(Primary Reference Wavelength = 555 nm)

| HIF111 | 0.2494 | HIF111/HOI | 0.2426 | SGI111 | 0.0215 | \|SGI111\|/(\|SGI111\| + TP1) | 0.0861 |
|---|---|---|---|---|---|---|---|
| HIF311 | 0.2677 | HIF311/HOI | 0.2604 | SGI311 | −0.1431 | \|SGI311\|/(\|SGI311\| + TP3) | 0.4345 |
| HIF321 | 0.2839 | HIF321/HOI | 0.2761 | SGI321 | −0.1003 | \|SGI321\|/(\|SGI321\| + TP3) | 0.3500 |
| HIF411 | 0.3211 | HIF411/HOI | 0.3123 | SGI411 | 0.0686 | \|SGI411\|/(\|SGI411\| + TP4) | 0.2017 |
| HIF421 | 0.3628 | HIF421/HOI | 0.3529 | SGI421 | 0.0763 | \|SGI421\|/(\|SGI421\| + TP4) | 0.2195 |

Third Embodiment

Figure 3A:
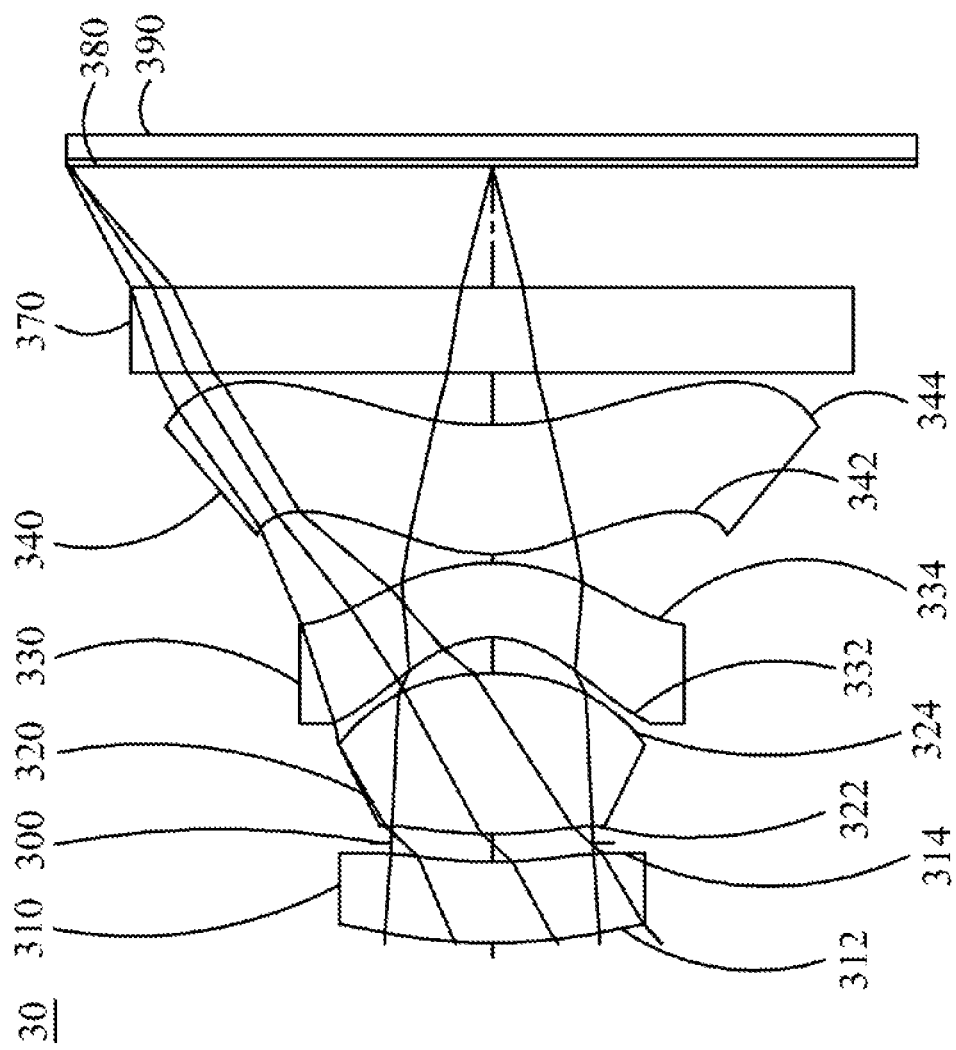
FIG. 3A is a schematic view of the optical image capturing system according to the third embodiment of the present disclosure.
Figure 3B:
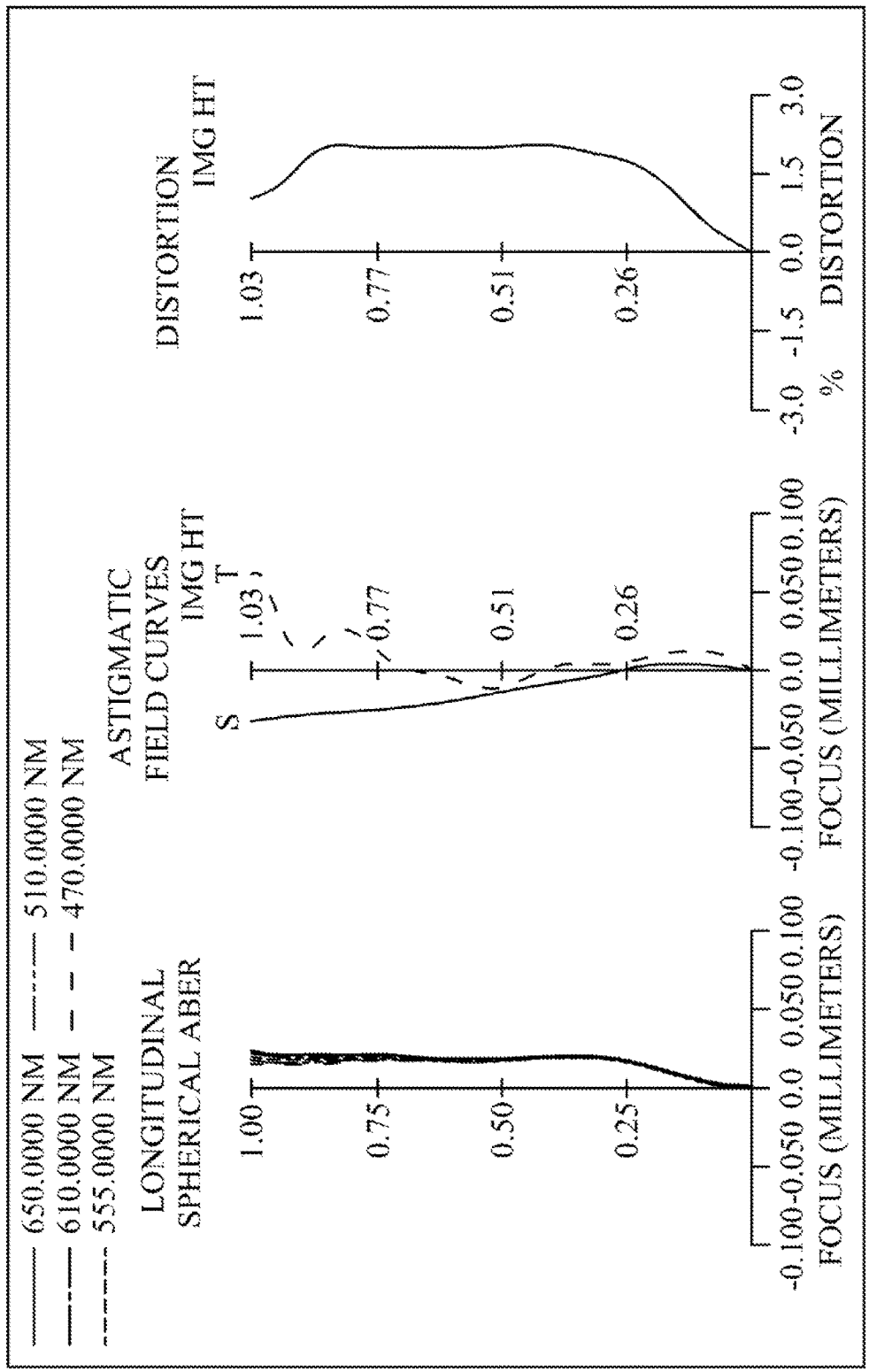
FIG. 3B a curve diagram illustrating the spherical aberration, astigmatism and optical distortion of the optical image capturing system in the sequence from left to right according to the third embodiment of the present disclosure.
Figure 3C:
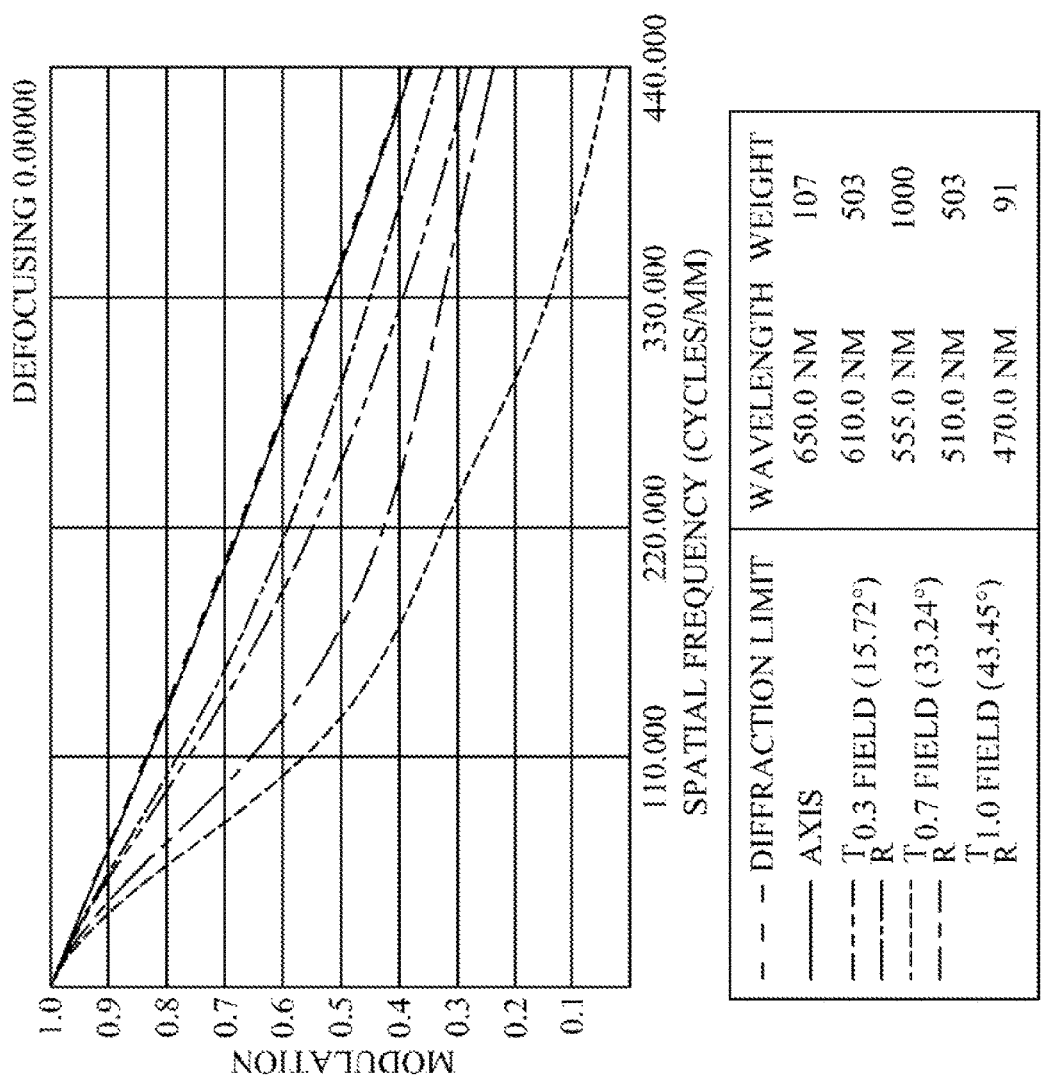
FIG. 3C a characteristic diagram of modulation transfer of visible light spectrum according to the third embodiment of the present disclosure.
Figure 3D:
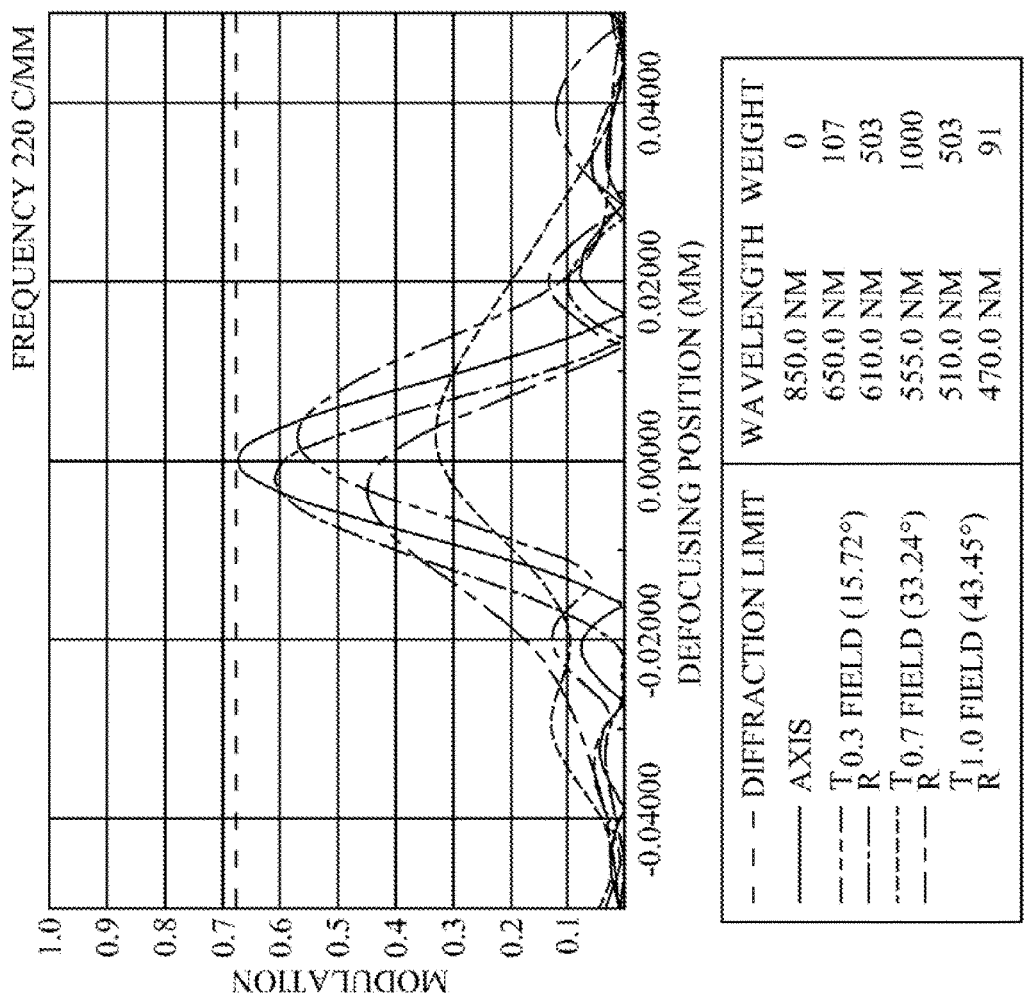
FIG. 3D is a diagram illustrating the through-focus MTF values for the visible light spectrum at the central field of view, 0.3 field of view and 0.7 field of view of the third embodiment of the present disclosure.
Figure 3E:
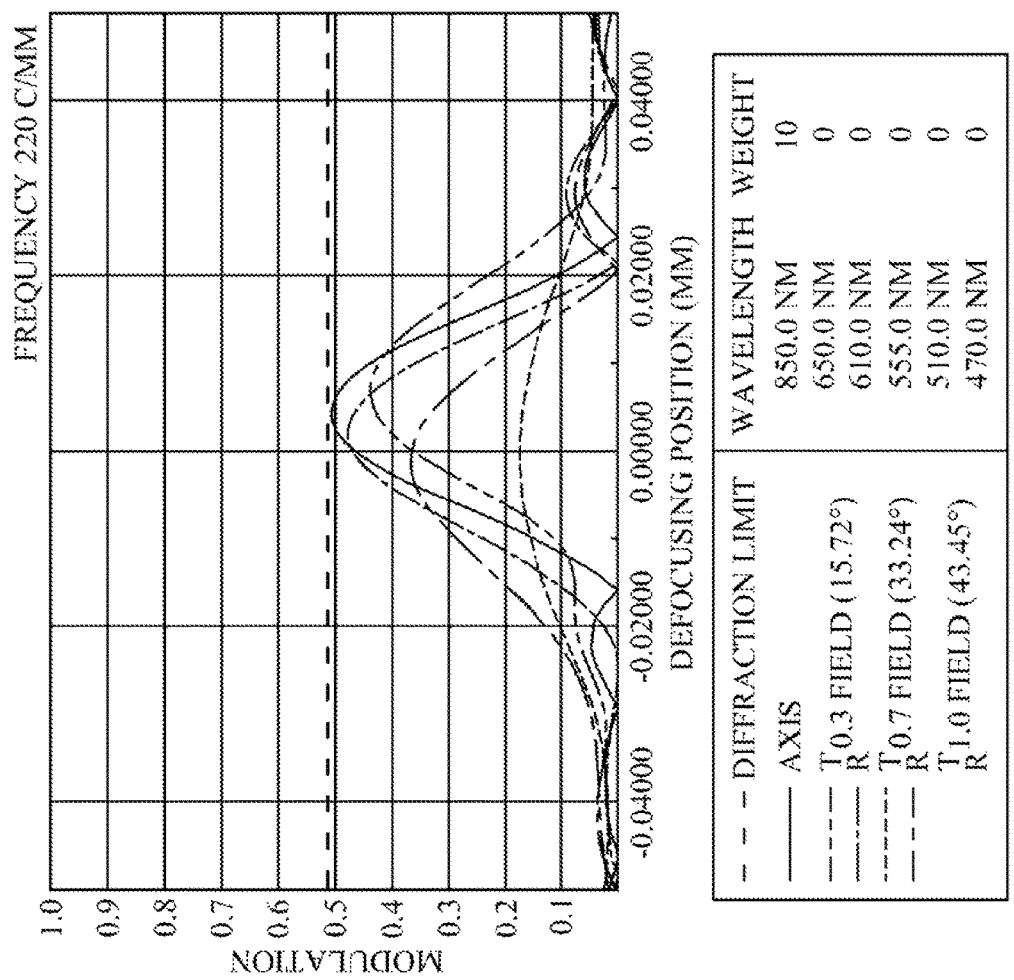
FIG. 3E is a diagram illustrating the through-focus MTF values for the infrared light spectrum at the central field of view, 0.3 field of view and 0.7 field of view of the third embodiment of the present disclosure.

Please refer to FIGS. 3A and 3B, wherein FIG. 3A is a schematic view of the optical image capturing system according to the third embodiment of the present disclosure. FIG. 3B is a curve diagram illustrating the spherical aberration, astigmatism and optical distortion of the optical image capturing system in the sequence from left to right according to the third embodiment of the present disclosure. FIG. 3C is a characteristic diagram of modulation transfer of visible light spectrum according to the third embodiment of the present disclosure. FIG. 3D is a diagram illustrating the through-focus MTF values for the visible light spectrum at the central field of view, 0.3 field of view and 0.7 field of view of the third embodiment of the present disclosure. FIG. 3E is a diagram illustrating the through-focus MTF values for the infrared light spectrum at the central field of view, 0.3 field of view and 0.7 field of view of the third embodiment of the present disclosure. As shown in FIG. 3A, in the order from an object side to an image side, the optical image capturing system 30 includes a first lens 310, an aperture 300, a second lens 320, a third lens 330, a fourth lens 340, an infrared filter 370, an image plane 380 and an image sensing device 390.

The first lens 310 has positive refractive power and is made of plastic material. The first lens 310 has a convex object-side surface 312 and a concave image-side surface 314, wherein both of them are aspheric. The object-side surface 312 and the image-side surface 314 respectively have one inflection point.

The second lens 320 has positive refractive power and is made of plastic material. The second lens 320 has a convex object-side surface 322 and a convex image-side surface 324, wherein both of them are aspheric. The object-side surface 322 has one inflection point.

The third lens 330 has negative refractive power and is made of plastic material. The third lens 330 has a concave object-side surface 332 and a convex image-side surface 334, wherein both of them are aspheric. The object-side surface 332 and image-side surface 334 respectively have one inflection point.

The fourth lens 340 has positive refractive power and is made of plastic material. The fourth lens 340 has a convex object-side surface 342 and a concave image-side surface 344, wherein both of them are aspheric. The object-side surface 342 and image-side surface 344 respectively have one inflection point.

The infrared filter 370 is made of glass material and is configured between the fourth lens 340 and the image plane 380. The infrared filter 370 does not affect the focal length of the optical image capturing system.

Table 5 and Table 6 below should be incorporated into the reference of the present embodiment.

TABLE 5

Lens Parameters for the Third Embodiment
f(focal length) = 1.06116 mm; f/HEP = 2.03; HAF(half angle of view) = 43.4333 deg.

| Surface No. | | Curvature Radius | Thickness (mm) | Material | Refractive Index | Abbe No. | Focal Length |
|---|---|---|---|---|---|---|---|
| 0 | Object | 1E+18 | 600 | | | | |
| 1 | Lens 1 | 1.305767779 | 0.201 | Plastic | 1.642 | 22.455 | 26.039 |
| 2 | | 1.329560284 | 0.045 | | | | |
| 3 | Aperture | 1E+18 | 0.023 | | | | |
| 4 | Lens 2 | 1.054812356 | 0.397 | Plastic | 1.535 | 56.270 | 0.780 |
| 5 | | −0.602811678 | 0.088 | | | | |
| 6 | Lens 3 | −0.224834837 | 0.184 | Plastic | 1.642 | 22.455 | −0.865 |
| 7 | | −0.496338672 | 0.023 | | | | |
| 8 | Lens 4 | 0.419632545 | 0.318 | Plastic | 1.545 | 55.961 | 1.167 |
| 9 | | 0.899069567 | 0.130 | | | | |
| 10 | Infrared Filter | 1E+18 | 0.210 | BK7_SCHOTT | 1.517 | 64.13 | |
| 11 | | 1E+18 | 0.300 | | | | |
| 12 | Image Plane | 1E+18 | 0.000 | | | | |

Reference Wavelength = 555 nm; Shield Position: The $1^{st}$ surface with clear aperture of 0.372 mm; The $2^{nd}$ surface with clear aperture of 0.268 mm; The $4^{th}$ surface with clear aperture of 0.273 mm; The $5^{th}$ surface with clear aperture of 0.373 mm; The $6^{th}$ surface with clear aperture of 0.385 mm; The $7^{th}$ surface with clear aperture of 0.468 mm; The $8^{th}$ surface with clear aperture of 0.573 mm; and the $9^{th}$ surface with clear aperture of 0.796 mm

TABLE 6

The Aspheric Coefficients of the Third Embodiment
Table 6: Aspheric Coefficients

| Surface No. | 1 | 2 | 4 | 5 | 6 | 7 |
|---|---|---|---|---|---|---|
| k = | 9.039600E+00 | 3.482298E+00 | −3.243470E+01 | −1.764073E+00 | −2.874068E+00 | −9.344585E−01 |
| $A_4$ = | −2.445908E−01 | 1.355770E+00 | 6.288692E−01 | −2.600216E+00 | −5.320507E+00 | 2.740511E+00 |
| $A_6$ = | −2.177422E+01 | −2.266517E+02 | 2.716222E+01 | −2.775878E+01 | −1.269582E+02 | −1.093943E+02 |
| $A_8$ = | 3.570553E+02 | 1.097644E+04 | −2.225966E+03 | −6.328229E+02 | 3.555450E+03 | 1.537909E+03 |
| $A_{10}$ = | −3.269838E+03 | −3.085488E+05 | 7.139662E+04 | 3.032845E+04 | −2.686599E+04 | −8.483050E+03 |
| $A_{12}$ = | 1.167679E+04 | 4.933507E+06 | −2.001435E+06 | −4.316405E+05 | 1.927868E+04 | 1.224857E+04 |
| $A_{14}$ = | 7.843112E+02 | −4.193341E+07 | 3.646801E+07 | 3.083394E+06 | 8.274801E+05 | 7.551053E+04 |
| $A_{16}$ = | −9.156297E+04 | 1.465722E+08 | −3.517309E+08 | −1.146620E+07 | −4.580403E+06 | −3.517635E+05 |
| $A_{18}$ = | 0.000000E+00 | 0.000000E+00 | 1.332454E+09 | 1.747793E+07 | 7.909345E+06 | 4.406928E+05 |
| $A_{20}$ = | 0.000000E+00 | 0.000000E+00 | 0.000000E+00 | 0.000000E+00 | 0.000000E+00 | 0.000000E+00 |

| Surface No. | 8 | 9 |
|---|---|---|
| k = | −6.238851E+00 | −1.143021E+00 |
| $A_4$ = | 3.242788E+00 | 2.781810E+00 |
| $A_6$ = | −8.860837E+01 | −5.416421E+01 |
| $A_8$ = | 1.015555E+03 | 4.267513E+02 |
| $A_{10}$ = | −7.215255E+03 | −2.104609E+03 |
| $A_{12}$ = | 3.228479E+04 | 6.773759E+03 |
| $A_{14}$ = | −8.719450E+04 | −1.415336E+04 |
| $A_{16}$ = | 1.218976E+05 | 1.843824E+04 |
| $A_{18}$ = | −4.029357E+04 | −1.357607E+04 |
| $A_{20}$ = | −6.026270E+04 | 4.305830E+03 |

In the third embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 5 and Table 6.

Third Embodiment (Primary reference wavelength = 555 nm)

| MTFQ0 | MTFQ3 | MTFQ7 | MTFH0 | MTFH3 | MTFH7 |
|---|---|---|---|---|---|
| 0.84 | 0.77 | 0.56 | 0.68 | 0.55 | 0.33 |
| ETP1 | ETP2 | ETP3 | ETP4 | ED12/ED23 | SED |
| 0.198 | 0.315 | 0.238 | 0.299 | 1.965 | 0.243 |
| ETP1/TP1 | ETP2/TP2 | ETP3/TP3 | ETP4/TP4 | ED23/ED34 | SETP |
| 0.983 | 0.794 | 1.296 | 0.939 | 0.250 | 1.050 |

Third Embodiment (Primary reference wavelength = 555 nm)

| ETL | EBL | EIN | EIR | PIR | STP |
|---|---|---|---|---|---|
| 1.596 | 0.304 | 1.292 | 0.094 | 0.130 | 1.100 |
| EIN/ETL | SETP/EIN | EIR/PIR | EBL/BL | BL | SETP/STP |
| 0.810 | 0.812 | 0.722 | 0.4749 | 0.6401 | 0.954 |
| ED12 | ED23 | ED34 | ED12/IN12 | ED23/IN23 | ED34/IN34 |
| 0.068 | 0.035 | 0.139 | 1.002 | 0.396 | 6.061 |
| InRS41 | InRS42 | HVT41 | HVT42 | ODT % | TDT % |
| 0.06238 | 0.03559 | 0.46273 | 0.58222 | 2.06060 | 1.00896 |
| |f/f1| | |f/f2| | |f/f3| | |f/f4| | |f1/f2| | |f2/f3| |
| 0.04075 | 1.35976 | 1.22731 | 0.90928 | 33.36567 | 0.90259 |
| | | Σ PPR/|Σ NPR| | | | |
| Σ PPR | Σ NPR | NPRI | Σ PP | Σ NP | f1/Σ PP |
| 2.58707 | 0.95004 | 2.72313 | −0.08422 | 27.20563 | −9.26622 |

-continued

Third Embodiment (Primary reference wavelength = 555 nm)

| f4/ΣNP | IN12/f | IN23/f | IN34/f | TP3/f | TP4/f |
|---|---|---|---|---|---|
| 0.95710 | 0.06434 | 0.08282 | 0.02167 | 0.17313 | 0.29970 |
| InTL | HOS | HOS/HOI | InS/HOS | InTL/HOS | ΣTP/InTL |
| 1.27893 | 1.91900 | 1.86673 | 0.87146 | 0.66646 | 0.85991 |
| (TP1 + IN12)/TP2 | (TP4 + IN34)/TP3 | TP1/TP2 | TP3/TP4 | IN23/(TP2 + IN23 + TP3) | |
| 0.67986 | 1.85629 | 0.50773 | 0.57767 | 0.13152 | |
| \|InRS41\|/TP4 | \|InRS42\|/TP4 | HVT42/HOI | HVT42/HOS | | |
| 0.1962 | 0.1119 | 0.5664 | 0.3034 | | |
| VSFS0 | VSFS3 | VSFS7 | VTFS0 | VTFS3 | VTFS7 |
| 0.0000 | −0.0025 | −0.0025 | 0.0000 | 0.0025 | 0.0050 |
| VSMTF0 | VSMTF3 | VSMTF7 | VTMTF0 | VTMTF3 | VTMTF7 |
| 0.7020 | 0.6450 | 0.4770 | 0.7020 | 0.6050 | 0.3660 |
| ISFS0 | ISFS3 | ISFS7 | ITFS0 | ITFS3 | ITFS7 |
| 0.0050 | 0.0025 | −0.0025 | 0.0050 | 0.0075 | 0.0025 |
| ISMTF0 | ISMTF3 | ISMTF7 | ITMTF0 | ITMTF3 | ITMTF7 |
| 0.5560 | 0.5230 | 0.4000 | 0.5560 | 0.4850 | 0.2270 |
| FS | | AIFS | | AVFS | AFS |
| 0.0050 | | 0.0033 | | 0.0004 | 0.0029 |

The following values for the conditional expressions may be obtained from the data in Table 5 and Table 6.

Values Related to Inflection Point of Third Embodiment
(Primary Reference Wavelength = 555 nm)

| HIF111 | 0.3165 | HIF111/HOI | 0.3079 | SGI111 | 0.0363 | \|SGI111\|/(\|SGI111\| + TP1) | 0.1529 |
|---|---|---|---|---|---|---|---|
| HIF121 | 0.2080 | HIF121/HOI | 0.2024 | SGI121 | 0.0149 | \|SGI121\|/(\|SGI121\| + TP1) | 0.0688 |
| HIF211 | 0.1740 | HIF211/HOI | 0.1693 | SGI211 | 0.0125 | \|SGI211\|/(\|SGI211\| + TP2) | 0.0306 |
| HIF311 | 0.2503 | HIF311/HOI | 0.2435 | SGI311 | −0.1187 | \|SGI311\|/(\|SGI311\| + TP3) | 0.3924 |
| HIF321 | 0.2901 | HIF321/HOI | 0.2822 | SGI321 | −0.0839 | \|SGI321\|/(\|SGI321\| + TP3) | 0.3136 |
| HIF411 | 0.2285 | HIF411/HOI | 0.2223 | SGI411 | 0.0494 | \|SGI411\|/(\|SGI411\| + TP4) | 0.1345 |
| HIF421 | 0.3033 | HIF421/HOI | 0.2951 | SGI421 | 0.0524 | \|SGI421\|/(\|SGI421\| + TP4) | 0.1416 |

Fourth Embodiment

Figure 4A:
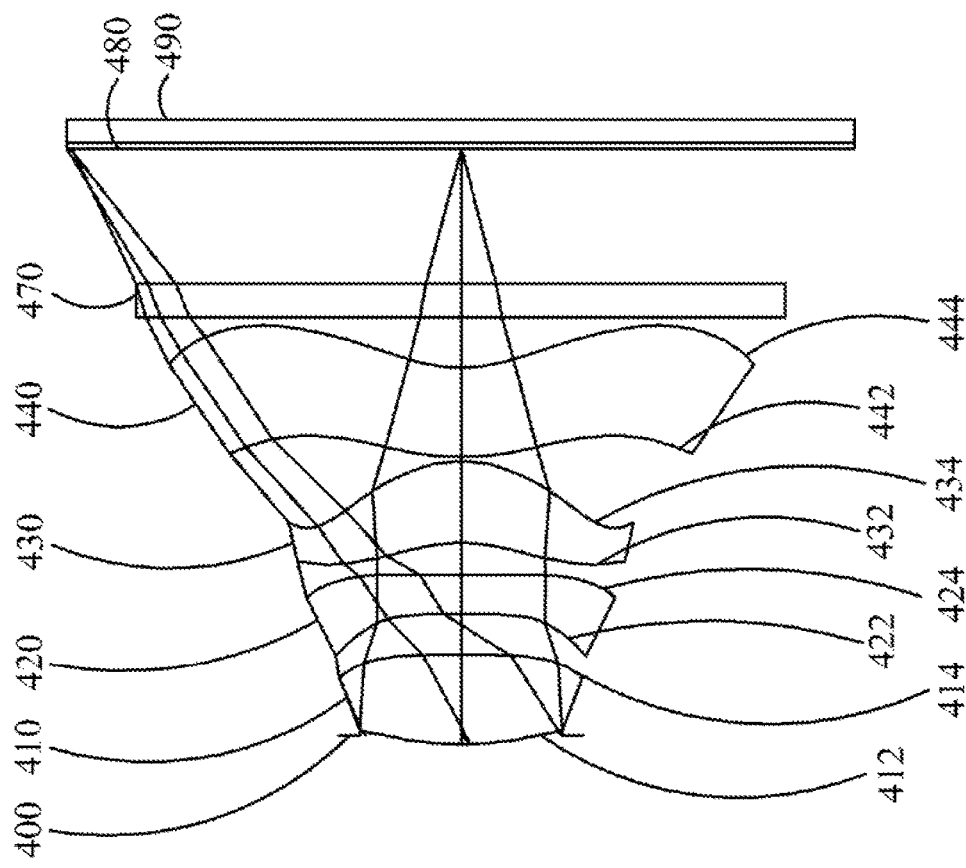
FIG. 4A is a schematic view of the optical image capturing system according to the fourth embodiment of the present disclosure.
Figure 4B:
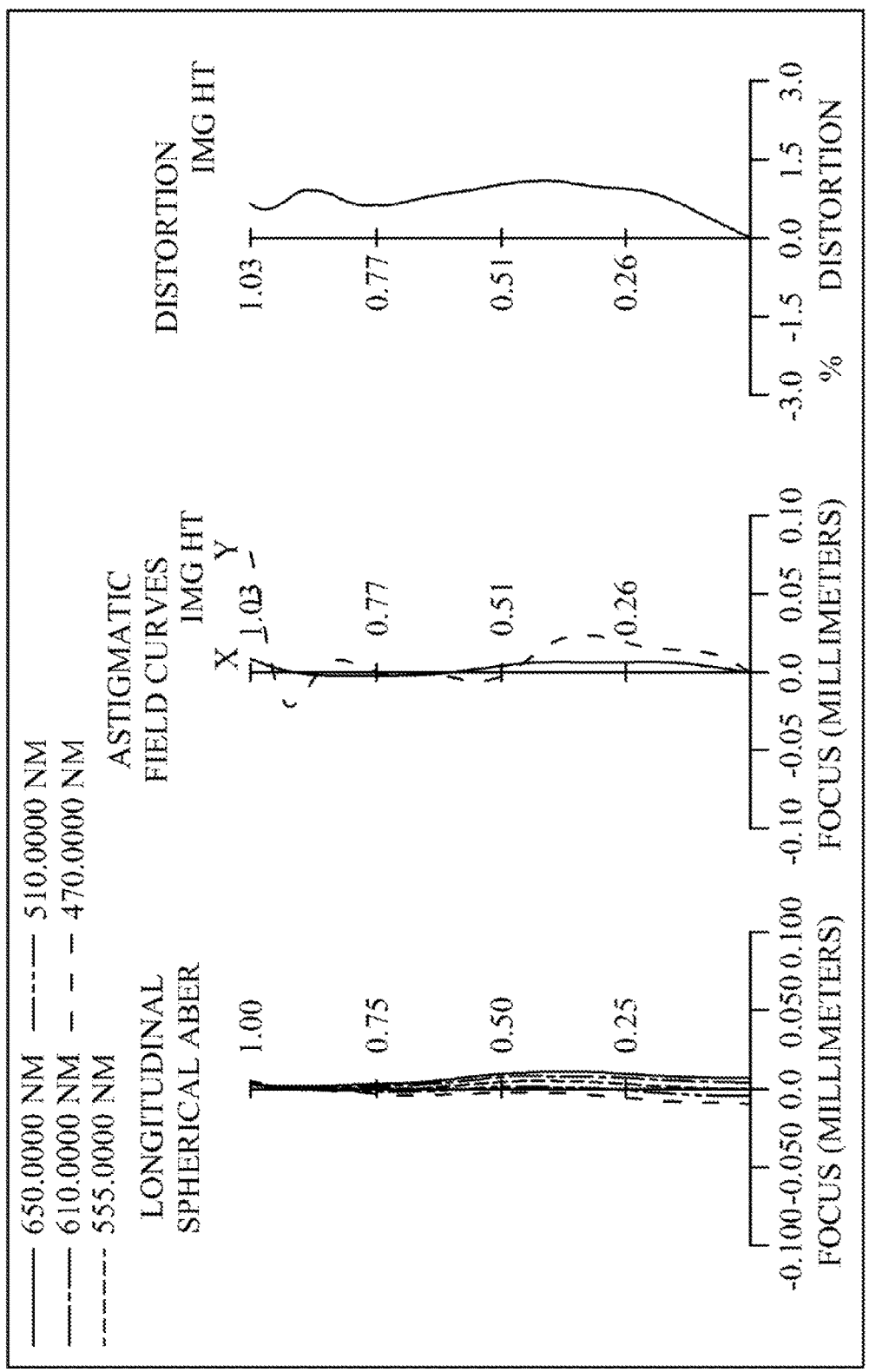
FIG. 4B a curve diagram illustrating the spherical aberration, astigmatism and optical distortion of the optical image capturing system in the sequence from left to right according to the fourth embodiment of the present disclosure.
Figure 4C:
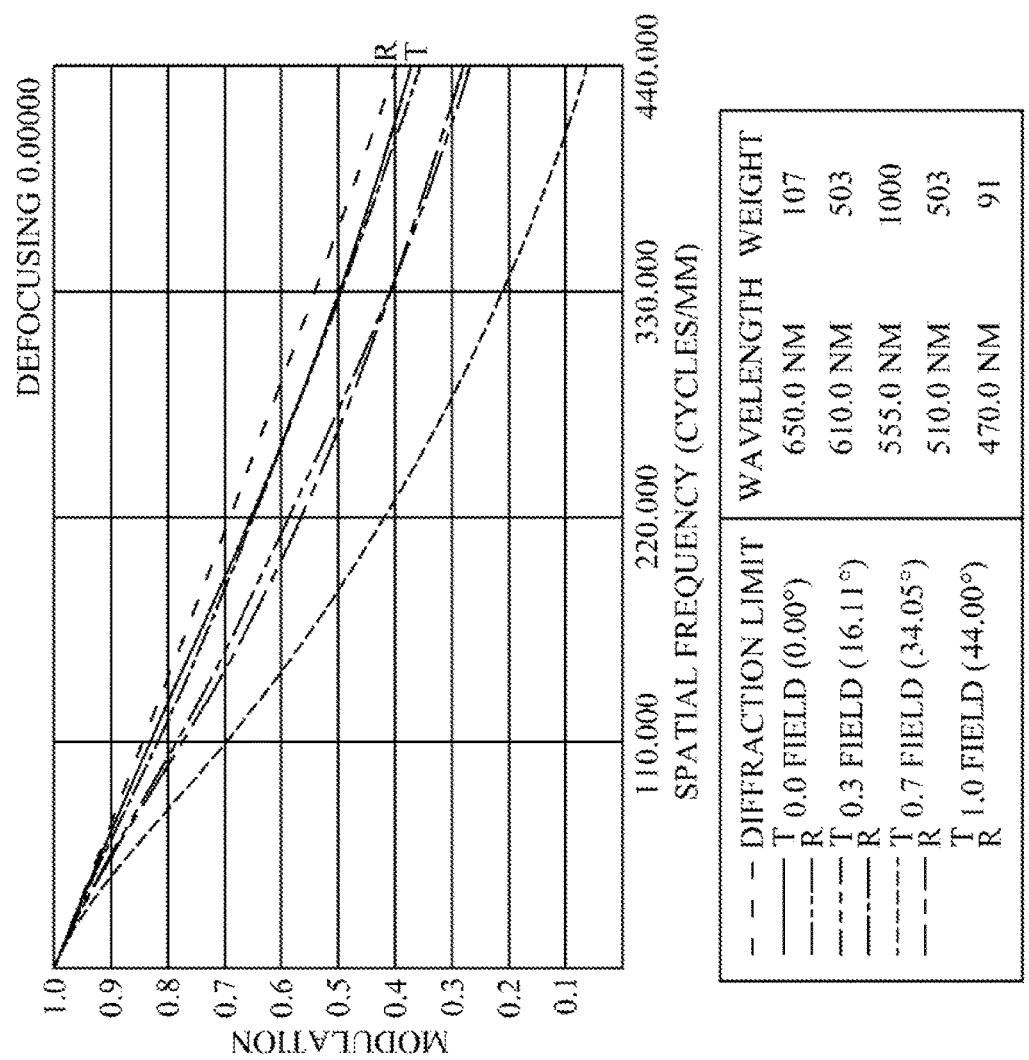
FIG. 4C a characteristic diagram of modulation transfer of visible light spectrum according to the fourth embodiment of the present disclosure.
Figure 4D:
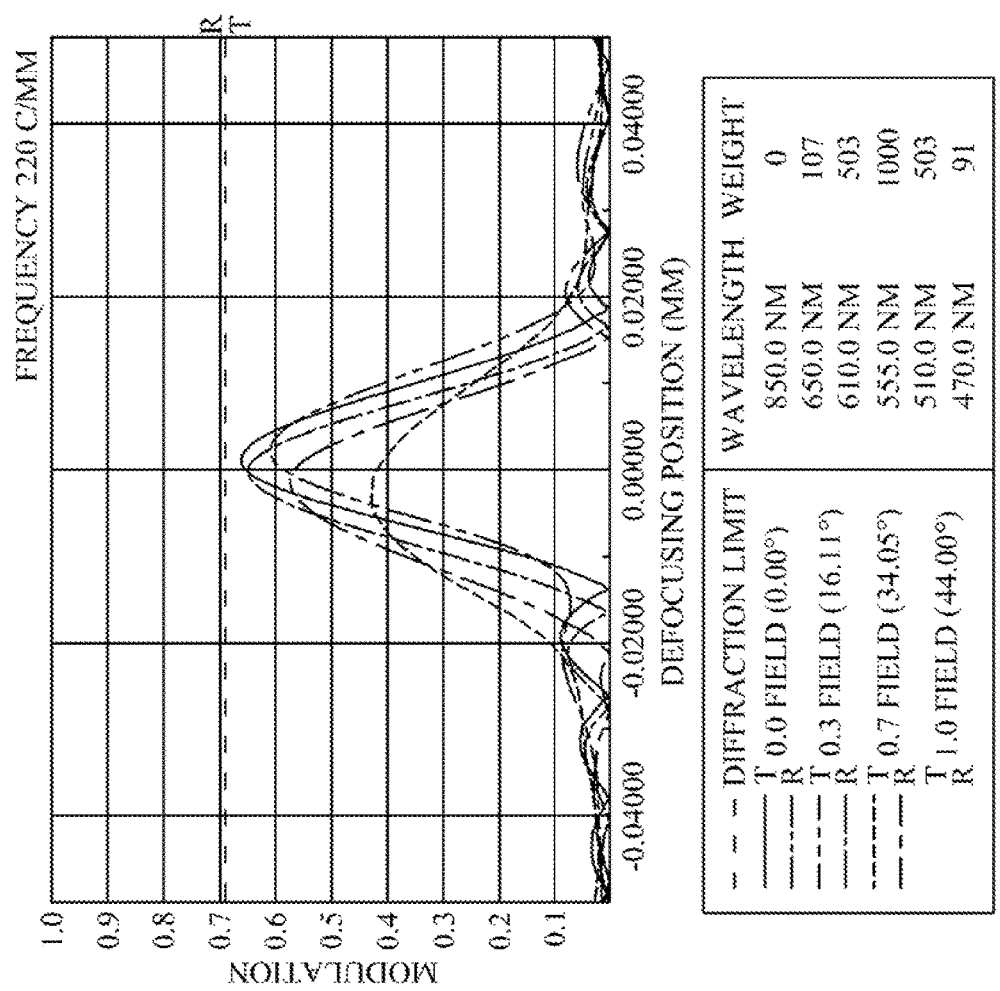
FIG. 4D is a diagram illustrating the through-focus MTF values for the visible light spectrum at the central field of view, 0.3 field of view and 0.7 field of view of the fourth embodiment of the present disclosure.
Figure 4E:
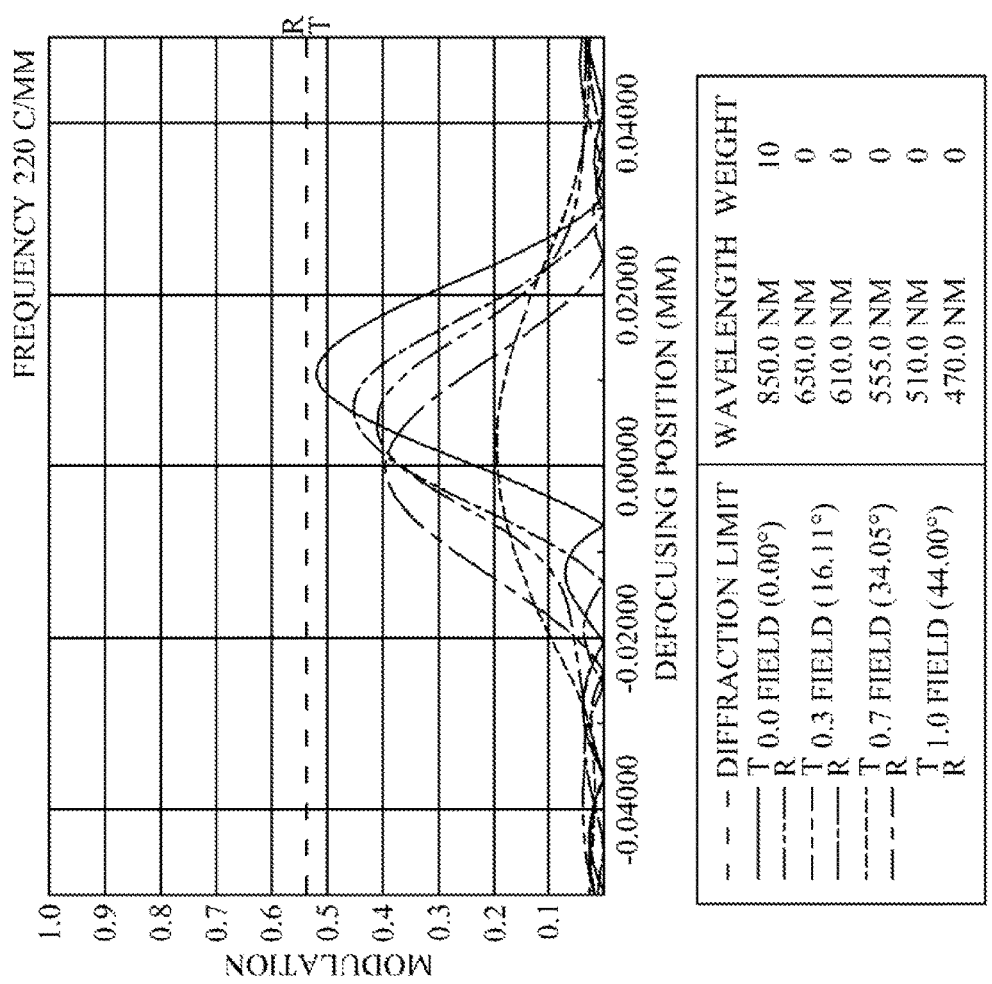
FIG. 4E is a diagram illustrating the through-focus MTF values for the infrared light spectrum at the central field of view, 0.3 field of view and 0.7 field of view of the fourth embodiment of the present disclosure.

Please refer to FIGS. 4A and 4B, wherein FIG. 4A is a schematic view of the optical image capturing system according to the fourth embodiment of the present disclosure. FIG. 4B is a curve diagram illustrating the spherical aberration, astigmatism and optical distortion of the optical image capturing system in the sequence from left to right according to the fourth embodiment of the present disclosure. FIG. 4C is a characteristic diagram of modulation transfer of visible light spectrum according to the fourth embodiment of the present disclosure. FIG. 4D is a diagram illustrating the through-focus MTF values for the visible light spectrum at the central field of view, 0.3 field of view and 0.7 field of view of the fourth embodiment of the present disclosure. FIG. 4E is a diagram illustrating the through-focus MTF values for the infrared light spectrum at the central field of view, 0.3 field of view and 0.7 field of view of the fourth embodiment of the present disclosure. As shown in FIG. 4A, in the order from an object side to an image side, the optical image capturing system 40 includes an aperture 400, a first lens 410, a second lens 420, a third lens 430, a fourth lens 440, an infrared filter 470, an image plane 480 and an image sensing device 490.

The first lens 410 has positive refractive power and is made of plastic material. The first lens 410 has a convex object-side surface 412 and a convex image-side surface 414, wherein both of them are aspheric. The object-side surface 412 has one inflection point.

The second lens 420 has negative refractive power and is made of plastic material. The second lens 420 has a concave object-side surface 422 and a concave image-side surface 424, wherein both of them are aspheric. The image-side surface 424 has one inflection point.

The third lens 430 has positive refractive power and is made of plastic material. The third lens 430 has a concave object-side surface 432 and a convex image-side surface 434, wherein both of them are aspheric. The object-side surface 432 and image-side surface 434 respectively have two inflection points.

The fourth lens 440 has negative refractive power and is made of plastic material. The fourth lens 440 has a convex object-side surface 442 and a concave image-side surface 444, wherein both of them are aspheric. The object-side surface 442 and image-side surface 444 respectively have one inflection point.

The infrared filter 470 is made of glass material and is configured between the fourth lens 440 and the image plane 480. The infrared filter 470 does not affect the focal length of the optical image capturing system.

Table 7 and Table 8 below should be incorporated into the reference of the present embodiment.

TABLE 7

Lens Parameters for the fourth Embodiment
f(focal length) = 1.0576 mm; f/HEP = 2.0; HAF (half angle of view) = 44.0006 deg.

| Surface No. | | Curvature Radius | Thickness (mm) | Material | Refractive Index | Abbe No. | Focal Length |
|---|---|---|---|---|---|---|---|
| 0 | Object | 1E+18 | 1E+18 | | | | |
| 1 | Aperture | 1E+18 | −0.023 | | | | |
| 2 | Lens 1 | 0.840765342 | 0.238 | Plastic | 1.544 | 56.09 | 1.396 |
| 3 | | −7.312105469 | 0.108 | | | | |
| 4 | Lens 2 | −8.745659121 | 0.103 | Plastic | 1.642 | 22.46 | −4.979 |
| 5 | | 5.132048387 | 0.086 | | | | |
| 6 | Lens 3 | −0.420830664 | 0.216 | Plastic | 1.544 | 56.09 | 1.298 |
| 7 | | −0.31192765 | 0.011 | | | | |
| 8 | Lens 4 | 0.613893843 | 0.238 | Plastic | 1.544 | 56.09 | −3.056 |
| 9 | | 0.387219625 | 0.133 | | | | |

TABLE 7-continued

Lens Parameters for the fourth Embodiment
f(focal length) = 1.0576 mm; f/HEP = 2.0; HAF (half angle of view) = 44.0006 deg.

| Surface No. | Curvature Radius | Thickness (mm) | Material | Refractive Index | Abbe No. | Focal Length |
|---|---|---|---|---|---|---|
| 10 | Infrared Filter | 1E+18 | 0.090 | BK7_SCHOTT | 1.517 | 64.13 |
| 11 |  | 1E+18 | 0.357 |  |  |  |
| 12 | Image Plane | 1E+18 | 0.000 |  |  |  |

Reference Wavelength = 555 nm; Shield Position: the $3^{rd}$ surface with clear aperture of 0.317 mm

TABLE 8

The Aspheric Coefficients of the Fourth Embodiment
Table 8: Aspheric Coefficients

| Surface No. | 2 | 3 | 4 | 5 | 6 | 7 |
|---|---|---|---|---|---|---|
| k = | −2.141502E+01 | −2.688973E−06 | −3.678229E−02 | −9.000000E+01 | −9.322651E−02 | −3.541675E+00 |
| $A_4$ = | 4.382662E+00 | −3.721394E+00 | −9.134681E+00 | −1.927431E+00 | 1.005624E+01 | −6.176924E+00 |
| $A_6$ = | −1.135749E+02 | −1.078201E+01 | 1.176467E+02 | 3.007060E+01 | −7.551706E+01 | 2.767743E+01 |
| $A_8$ = | 2.681053E+03 | −1.773198E+02 | −5.282429E+03 | −6.864788E+02 | 2.477008E+03 | 5.797746E+02 |
| $A_{10}$ = | −4.844540E+04 | 3.110586E+03 | 7.705473E+04 | 3.878909E+03 | −4.103152E+04 | −1.919075E+04 |
| $A_{12}$ = | 4.802204E+05 | −1.912642E+04 | −4.593269E+05 | −6.088404E+02 | 3.307119E+05 | 3.010528E+05 |
| $A_{14}$ = | −2.058779E+06 | −2.481075E+03 | 9.719542E+05 | −3.376491E+04 | −1.285007E+06 | −2.645229E+06 |
| $A_{16}$ = | 0.000000E+00 | 0.000000E+00 | 0.000000E+00 | 0.000000E+00 | 1.969606E+06 | 1.348202E+07 |
| $A_{18}$ = | 0.000000E+00 | 0.000000E+00 | 0.000000E+00 | 0.000000E+00 | 0.000000E+00 | −3.707071E+07 |
| $A_{20}$ = | 0.000000E+00 | 0.000000E+00 | 0.000000E+00 | 0.000000E+00 | 0.000000E+00 | 4.215308E+07 |

| Surface No. | 8 | 9 |
|---|---|---|
| k = | −1.296261E−01 | −3.747410E+00 |
| $A_4$ = | −2.954707E+00 | −2.765039E+00 |
| $A_6$ = | −3.078835E+01 | 1.542952E+01 |
| $A_8$ = | 4.575379E+02 | −9.712726E+01 |
| $A_{10}$ = | −3.303547E+03 | 5.172727E+02 |
| $A_{12}$ = | 1.386004E+04 | −2.022424E+03 |
| $A_{14}$ = | −3.340630E+04 | 5.253527E+03 |
| $A_{16}$ = | 3.968931E+04 | −8.407185E+03 |
| $A_{18}$ = | −8.536754E+03 | 7.434929E+03 |
| $A_{20}$ = | −1.688076E+04 | −2.770327E+03 |

In the fourth embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 7 and Table 8.

Fourth Embodiment (Primary reference wavelength = 555 nm)

| MTFQ0 | MTFQ3 | MTFQ7 | MTFH0 | MTFH3 | MTFH7 |
|---|---|---|---|---|---|
| 0.84 | 0.79 | 0.7 | 0.65 | 0.59 | 0.42 |
| ETP1 | ETP2 | ETP3 | ETP4 | ED12/ED23 | SED |
| 0.175 | 0.152 | 0.163 | 0.259 | 2.118 | 0.279 |
| ETP1/TP1 | ETP2/TP2 | ETP3/TP3 | ETP4/TP4 | ED23/ED34 | SETP |
| 0.734 | 1.472 | 0.752 | 1.087 | 0.257 | 0.748 |
| ETL | EBL | EIN | EIR | PIR | STP |
| 1.545 | 0.518 | 1.028 | 0.071 | 0.133 | 0.796 |
| EIN/ETL | SETP/EIN | EIR/PIR | EBL/BL | BL | SETP/STP |
| 0.665 | 0.728 | 0.533 | 0.8929 | 0.5801 | 0.940 |
| ED12 | ED23 | ED34 | ED12/IN12 | ED23/IN23 | ED34/IN34 |
| 0.084 | 0.040 | 0.155 | 0.781 | 0.464 | 13.879 |
| InRS41 | InRS42 | HVT41 | HVT42 | ODT % | TDT % |
| 0.00897 | 0.00822 | 0.39675 | 0.51351 | 1.08404 | 0.39472 |
| \|f/f1\| | \|f/f2\| | \|f/f3\| | \|f/f4\| | \|f1/f2\| | \|f2/f3\| |
| 0.75770 | 0.21240 | 0.81470 | 0.34611 | 0.28032 | 3.83572 |

-continued

Fourth Embodiment (Primary reference wavelength = 555 nm)

| Σ PPR | Σ NPR | \|NPR\| | Σ PP | Σ NP | f1/Σ PP |
|---|---|---|---|---|---|
| 1.02710 | 1.10382 | 0.93050 | −3.68119 | −1.65984 | 1.35264 |
| f4/Σ NP | IN12/f | IN23/f | IN34/f | TP3/f | TP4/f |
| −0.84092 | 0.10192 | 0.08115 | 0.01057 | 0.20442 | 0.22536 |
| InTL | HOS | HOS/HOI | InS/HOS | InTL/HOS | Σ TP/InTL |
| 1.00076 | 1.58082 | 1.53776 | 0.98520 | 0.63306 | 0.79537 |
| (TP1 + IN12)/TP2 | (TP4 + IN34)/TP3 | TP1/TP2 | TP3/TP4 | IN23/(TP2 + IN23 + TP3) | |
| 3.35824 | 1.15409 | 2.31253 | 0.90711 | 0.21186 | |
| \|InRS41\|/TP4 | \|InRS42\|/TP4 | HVT42/HOI | HVT42/HOS | | |
| 0.0376 | 0.0345 | 0.4995 | 0.3248 | | |
| VSFS0 | VSFS3 | VSFS7 | VTFS0 | VTFS3 | VTFS7 |
| 0.0025 | 0.0000 | −0.0025 | 0.0025 | 0.0025 | −0.0025 |
| VSMTF0 | VSMTF3 | VSMTF7 | VTMTF0 | VTMTF3 | VTMTF7 |
| 0.6560 | 0.6490 | 0.5740 | 0.6560 | 0.6130 | 0.4280 |
| ISFS0 | ISFS3 | ISFS7 | ITFS0 | ITFS3 | ITFS7 |
| 0.0100 | 0.0075 | 0.0000 | 0.0100 | 0.0050 | 0.0025 |
| ISMTF0 | ISMTF3 | ISMTF7 | ITMTF0 | ITMTF3 | ITMTF7 |
| 0.5210 | 0.4510 | 0.3970 | 0.5210 | 0.4050 | 0.1990 |
| FS | AIFS | | AVFS | | AFS |
| 0.0075 | 0.0058 | | 0.0004 | | 0.0054 |

Σ PPR/Σ

The following values for the conditional expressions may be obtained from the data in Table 7 and Table 8.

Values Related to Inflection Point of fourth Embodiment
(Primary Reference Wavelength = 555 nm)

| | | | | | | |
|---|---|---|---|---|---|---|
| HIF111 | 0.2200 | HIF111/HOI | 0.2140 | SGI111 | 0.0267 | \|SGI111\|/(\|SGI111\| + TP1) | 0.1008 |
| HIF221 | 0.1028 | HIF221/HOI | 0.1000 | SGI221 | 0.0008 | \|SGI221\|/(\|SGI221\| + TP2) | 0.0080 |
| HIF311 | 0.1664 | HIF311/HOI | 0.1618 | SGI311 | −0.0271 | \|SGI311\|/(\|SGI311\| + TP3) | 0.1115 |
| HIF312 | 0.4033 | HIF312/HOI | 0.3923 | SGI312 | −0.0523 | \|SGI312\|/(\|SGI312\| + TP3) | 0.1948 |
| HIF321 | 0.2884 | HIF321/HOI | 0.2806 | SGI321 | −0.1200 | \|SGI321\|/(\|SGI321\| + TP3) | 0.3570 |
| HIF322 | 0.4427 | HIF322/HOI | 0.4306 | SGI322 | −0.1657 | \|SGI322\|/(\|SGI322\| + TP3) | 0.4339 |
| HIF411 | 0.2021 | HIF411/HOI | 0.1966 | SGI411 | 0.0280 | \|SGI411\|/(\|SGI411\| + TP4) | 0.1052 |
| HIF421 | 0.2248 | HIF421/HOI | 0.2186 | SGI421 | 0.0491 | \|SGI421\|/(\|SGI421\| + TP4) | 0.1708 |

Fifth Embodiment

Figure 5A:
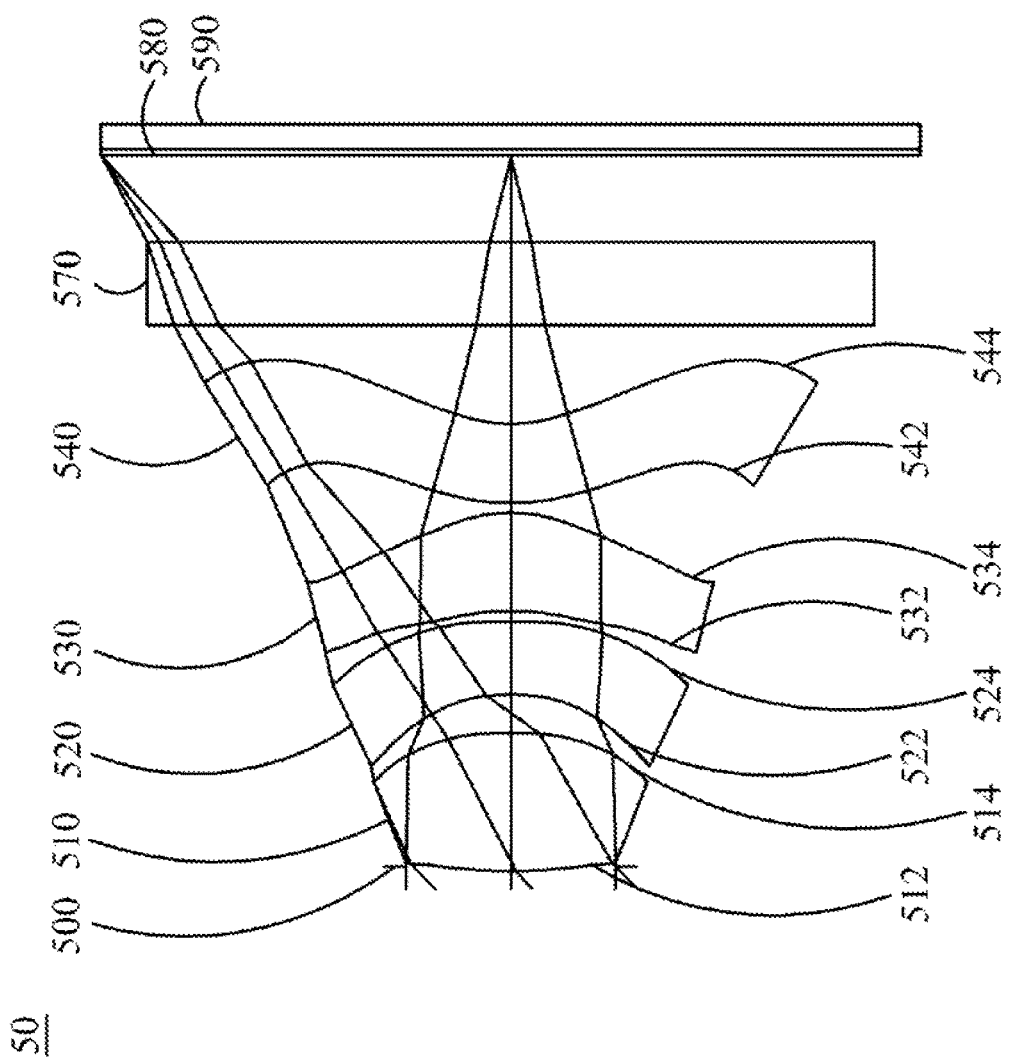
FIG. 5A is a schematic view of the optical image capturing system according to the fifth embodiment of the present disclosure.
Figure 5B:
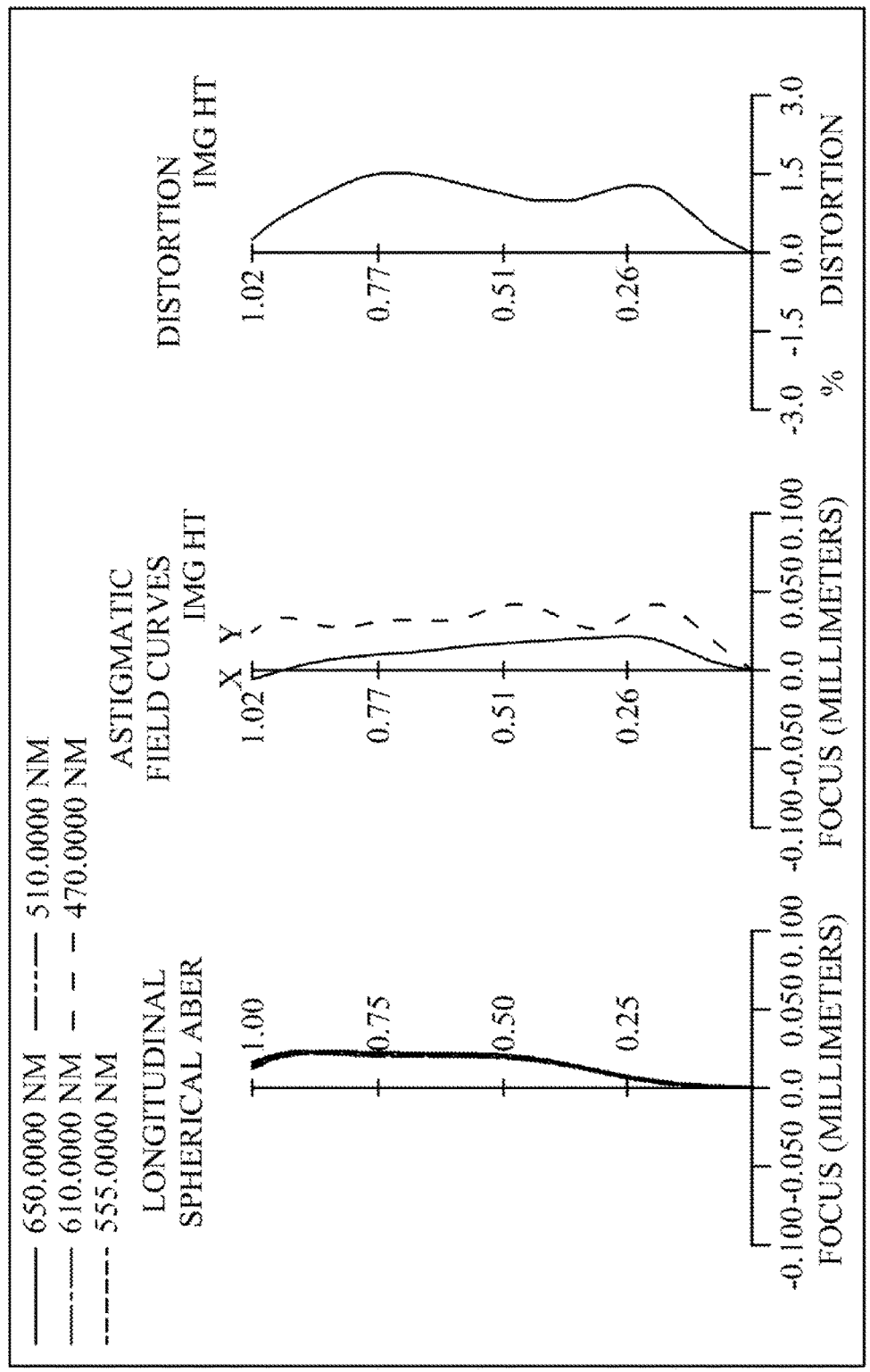
FIG. 5B a curve diagram illustrating the spherical aberration, astigmatism and optical distortion of the optical image capturing system in the sequence from left to right according to the fifth embodiment of the present disclosure.
Figure 5C:
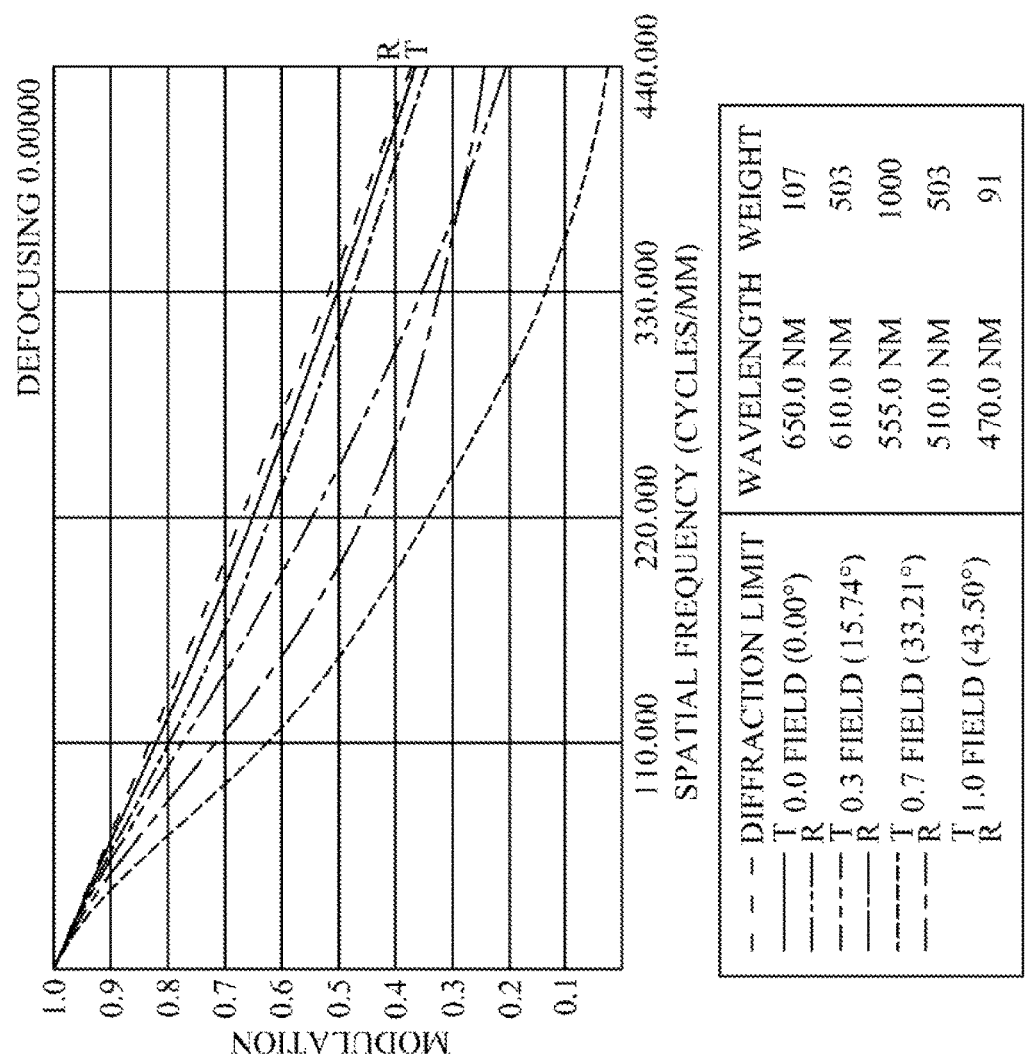
FIG. 5C a characteristic diagram of modulation transfer of visible light spectrum according to the fifth embodiment of the present disclosure.
Figure 5D:
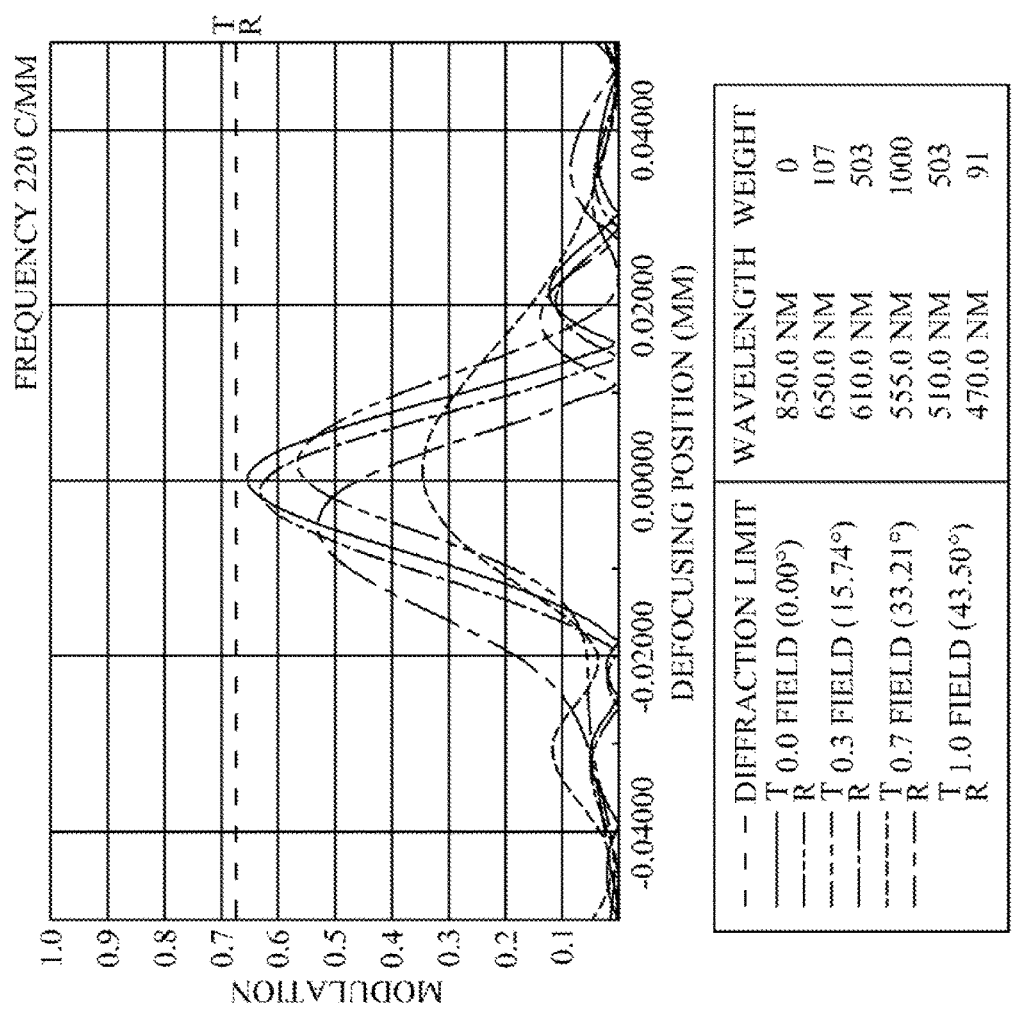
FIG. 5D is a diagram illustrating the through-focus MTF values for the visible light spectrum at the central field of view, 0.3 field of view and 0.7 field of view of the fifth embodiment of the present disclosure.
Figure 5E:
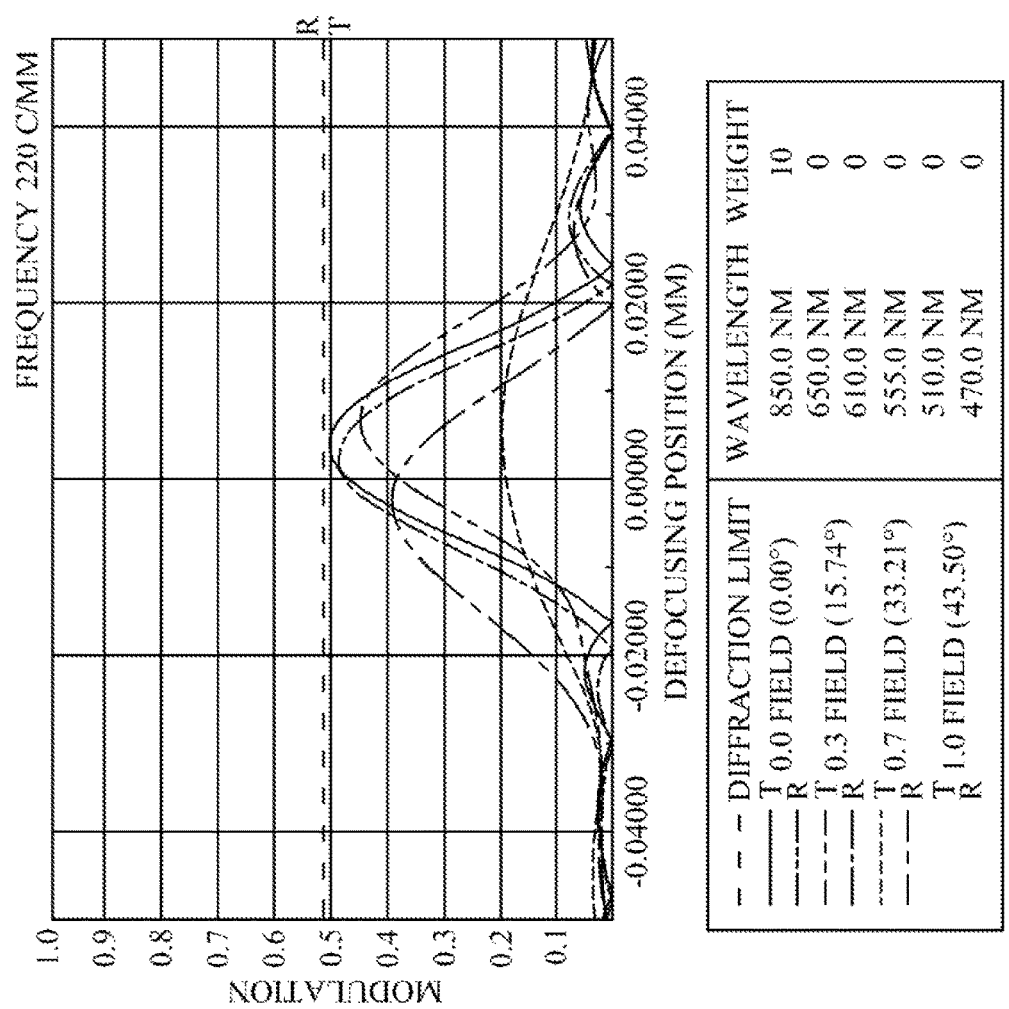
FIG. 5E is a diagram illustrating the through-focus MTF values for the infrared light spectrum at the central field of view, 0.3 field of view and 0.7 field of view of the fifth embodiment of the present disclosure.

Please refer to FIGS. 5A and 5B, wherein FIG. 5A is a schematic view of the optical image capturing system according to the fifth embodiment of the present disclosure. FIG. 5B is a curve diagram illustrating the spherical aberration, astigmatism and optical distortion of the optical image capturing system in the sequence from left to right according to the fifth embodiment of the present disclosure. FIG. 5C is a characteristic diagram of modulation transfer of visible light spectrum according to the fifth embodiment of the present disclosure. FIG. 5D is a diagram illustrating the through-focus MTF values for the visible light spectrum at the central field of view, 0.3 field of view and 0.7 field of view of the fifth embodiment of the present disclosure. FIG. 5E is a diagram illustrating the through-focus MTF values for the infrared light spectrum at the central field of view, 0.3 field of view and 0.7 field of view of the fifth embodiment of the present disclosure. As shown in FIG. 5A, in the order from an object side to an image side, the optical image capturing system 50 includes an aperture 500, a first lens 510, a second lens 520, a third lens 530, a fourth lens 540, an infrared filter 570, an image plane 580 and an image sensing device 590.

The first lens 510 has positive refractive power and is made of plastic material. The first lens 510 has a convex object-side surface 512 and a convex image-side surface 514, wherein both of them are aspheric. The object-side surface 512 has one inflection point.

The second lens 520 has negative refractive power and is made of plastic material. The second lens 520 has a concave object-side surface 522 and a convex image-side surface 524, wherein both of them are aspheric. The object-side surface 522 has one inflection point.

The third lens 530 has positive refractive power and is made of plastic material. The third lens 530 has a concave object-side surface 532 and a convex image-side surface 534, wherein both of them are aspheric. The object-side surface 532 has three inflection points and the image-side surface 534 has one inflection point.

The fourth lens 540 has negative refractive power and is made of plastic material. The fourth lens 540 has a convex object-side surface 542 and a concave image-side surface 544, wherein both of them are aspheric. The object-side surface 542 and image-side surface 544 respectively have one inflection point.

The infrared filter 570 is made of glass material and is configured between the fourth lens 540 and the image plane 580. The infrared filter 570 does not affect the focal length of the optical image capturing system.

Table 9 and Table 10 below should be incorporated into the reference of the present embodiment.

TABLE 9

Lens Parameters for the Fifth Embodiment
f(focal length) = 1.06514 mm; f/HEP = 2.03; HAF (half angle of view) = 43.4998 deg.

| Surface No. | | Curvature Radius | Thickness (mm) | Material | Refractive Index | Abbe No. | Focal Length |
|---|---|---|---|---|---|---|---|
| 0 | Object | 1E+18 | 600 | | | | |
| 1 | Aperture | 1E+18 | −0.012 | | | | |
| 2 | Lens 1 | 1.209337691 | 0.352 | Plastic | 1.545 | 55.96 | 0.963 |
| 3 | | −0.835612099 | −0.098 | | | | |
| 4 | | 1E+18 | 0.194 | | | | |
| 5 | Lens 2 | −0.552578628 | 0.185 | Plastic | 1.642 | 22.46 | −1.175 |
| 6 | | −2.284668264 | 0.025 | | | | |
| 7 | Lens 3 | −0.733142374 | 0.251 | Plastic | 1.545 | 55.96 | 0.954 |
| 8 | | −0.341525655 | 0.025 | | | | |
| 9 | Lens 4 | 0.55353551 | 0.200 | Plastic | 1.642 | 22.46 | −2.197 |
| 10 | | 0.341899552 | 0.251 | | | | |
| 11 | Infrared Filter | 1E+18 | 0.210 | BK_7 | 1.517 | 64.13 | |
| 12 | | 1E+18 | 0.220 | | | | |
| 13 | Image Plane | 1E+18 | 0.000 | | | | |

Reference Wavelength = 555 nm; Shield Position: the 5$^{th}$ surface with clear aperture of 0.349 mm

TABLE 10

The Aspheric Coefficients of the Fifth Embodiment
Table 10: Aspheric Coefficients

| Surface No. | 2 | 3 | 5 | 6 | 7 | 8 |
|---|---|---|---|---|---|---|
| k = | −1.571510E+02 | 1.117142E+00 | 4.478974E−01 | 1.441165E+01 | −3.845446E+01 | −1.167702E+00 |
| $A_4$ = | 1.063654E+01 | −3.553512E+00 | −1.198385E+01 | −1.506102E+01 | −1.501824E+01 | 7.725051E+00 |
| $A_6$ = | −5.927674E+02 | −1.477575E+01 | 1.756887E+02 | 2.826150E+02 | 4.771073E+02 | −7.238098E+01 |
| $A_8$ = | 2.915002E+04 | 6.350062E+02 | −3.167006E+03 | −2.682782E+03 | −7.479827E+03 | 7.791394E+02 |
| $A_{10}$ = | −1.097066E+06 | −9.902349E+03 | 4.943407E+04 | 4.630282E+02 | 6.969810E+04 | −6.161901E+03 |
| $A_{12}$ = | 2.857065E+07 | 9.376817E+04 | −2.879514E+05 | 2.396452E+05 | −4.312107E+05 | 2.712685E+04 |
| $A_{14}$ = | −4.940261E+08 | −5.999867E+05 | −2.284758E+06 | −2.392839E+06 | 1.847976E+06 | −5.917218E+04 |
| $A_{16}$ = | 5.385417E+09 | 1.766116E+06 | 4.279144E+07 | 1.115125E+07 | −5.340540E+06 | 5.062822E+04 |
| $A_{18}$ = | −3.342769E+10 | 0.000000E+00 | −2.314931E+08 | −2.639788E+07 | 9.321846E+06 | 0.000000E+00 |
| $A_{20}$ = | 8.990319E+10 | 0.000000E+00 | 4.534074E+08 | 2.573498E+07 | −7.332250E+06 | 0.000000E+00 |

| Surface No. | 9 | 10 |
|---|---|---|
| k = | −1.635223E+00 | −5.080663E+00 |
| $A_4$ = | −1.524485E+00 | −1.890913E−01 |
| $A_6$ = | −2.717537E+00 | 2.608551E+00 |
| $A_8$ = | 3.981685E+01 | −4.458892E+01 |
| $A_{10}$ = | −2.578105E+02 | 2.397539E+02 |
| $A_{12}$ = | 7.409146E+02 | −7.213233E+02 |
| $A_{14}$ = | −9.144354E+02 | 1.339162E+03 |
| $A_{16}$ = | 3.180964E+02 | −1.524256E+03 |
| $A_{18}$ = | 0.000000E+00 | 9.750035E+02 |
| $A_{20}$ = | 0.000000E+00 | −2.692069E+02 |

In the fifth embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 9 and Table 10.

Fifth Embodiment (Primary reference wavelength = 555 nm)

| MTFQ0 | MTFQ3 | MTFQ7 | MTFH0 | MTFH3 | MTFH7 |
|---|---|---|---|---|---|
| 0.82 | 0.78 | 0.63 | 0.65 | 0.55 | 0.35 |
| ETP1 | ETP2 | ETP3 | ETP4 | ED12/ED23 | SED |
| 0.270 | 0.239 | 0.214 | 0.217 | 2.091 | 0.242 |
| ETP1/TP1 | ETP2/TP2 | ETP3/TP3 | ETP4/TP4 | ED23/ED34 | SETP |
| 0.767 | 1.290 | 0.853 | 1.087 | 0.189 | 0.940 |
| ETL | EBL | EIN | EIR | PIR | STP |
| 1.793 | 0.611 | 1.182 | 0.181 | 0.251 | 0.952 |
| EIN/ETL | SETP/EIN | EIR/PIR | EBL/BL | BL | SETP/STP |
| 0.659 | 0.795 | 0.720 | 0.8969 | 0.6812 | 0.922 |
| ED12 | ED23 | ED34 | ED12/IN12 | ED23/IN23 | ED34/IN34 |
| 0.060 | 0.029 | 0.153 | 0.629 | 1.156 | 6.110 |
| InRS41 | InRS42 | HVT41 | HVT42 | ODT % | TDT % |
| 0.04356 | 0.10366 | 0.46632 | 0.58711 | 1.51796 | 1.26791 |
| \|f/f1\| | \|f/f2\| | \|f/f3\| | \|f/f4\| | \|f1/f2\| | \|f2/f3\| |
| 1.10593 | 0.90670 | 1.11622 | 0.48486 | 0.81985 | 1.23108 |
| Σ PPR/Σ | | | | | |

Fifth Embodiment (Primary reference wavelength = 555 nm)

| Σ PPR | Σ NPR | \|NPR\| | Σ PP | Σ NP | f1/Σ PP |
|---|---|---|---|---|---|
| 2.02291 | 1.59079 | 1.27164 | −0.22051 | −1.23368 | 5.32747 |
| f4/Σ NP | IN12/f | IN23/f | IN34/f | TP3/f | TP4/f |
| −0.78069 | 0.09015 | 0.02347 | 0.02347 | 0.23575 | 0.18777 |
| InTL | HOS | HOS/HOI | InS/HOS | InTL/HOS | Σ TP/InTL |
| 1.13383 | 1.81498 | 1.76554 | 0.99321 | 0.62471 | 0.87121 |
| (TP1 + IN12)/TP2 | (TP4 + IN34)/TP3 | TP1/TP2 | TP3/TP4 | IN23/(TP2 + IN23 + TP3) | |
| 2.42008 | 0.89602 | 1.90102 | 1.25556 | 0.05422 | |
| \|InRS41\|/TP4 | \|InRS42\|/TP4 | HVT42/HOI | HVT42/HOS | | |
| 0.2178 | 0.5183 | 0.5711 | 0.3235 | | |
| VSFS0 | VSFS3 | VSFS7 | VTFS0 | VTFS3 | VTFS7 |
| 0.0000 | −0.0025 | −0.0050 | 0.0000 | 0.0025 | 0.0025 |
| VSMTF0 | VSMTF3 | VSMTF7 | VTMTF0 | VTMTF3 | VTMTF7 |
| 0.6510 | 0.6280 | 0.5340 | 0.6510 | 0.5640 | 0.3440 |
| ISFS0 | ISFS3 | ISFS7 | ITFS0 | ITFS3 | ITFS7 |
| 0.0050 | 0.0025 | −0.0025 | 0.0050 | 0.0075 | 0.0050 |
| ISMTF0 | ISMTF3 | ISMTF7 | ITMTF0 | ITMTF3 | ITMTF7 |
| 0.5020 | 0.4890 | 0.3940 | 0.5020 | 0.4490 | 0.1990 |
| FS | AIFS | AVFS | AFS | | |
| 0.0050 | 0.0038 | −0.0004 | 0.0042 | | |

The following values for the conditional expressions may be obtained from the data in Table 9 and Table 10.

Values Related to Inflection Point of fifth Embodiment
(Primary Reference Wavelength = 555 nm)

| HIF111 | 0.2009 | HIF111/HOI | 0.1954 | SGI111 | 0.0151 | \|SGI111\|/(\|SGI111\| + TP1) | 0.0411 |
|---|---|---|---|---|---|---|---|
| HIF211 | 0.3382 | HIF211/HOI | 0.3289 | SGI211 | −0.1699 | \|SGI211\|/(\|SGI211\| + TP2) | 0.4787 |
| HIF311 | 0.1854 | HIF311/HOI | 0.1803 | SGI311 | −0.0226 | \|SGI311\|/(\|SGI311\| + TP3) | 0.0825 |
| HIF312 | 0.2279 | HIF312/HOI | 0.2217 | SGI312 | −0.0311 | \|SGI312\|/(\|SGI312\| + TP3) | 0.1101 |
| HIF313 | 0.3975 | HIF313/HOI | 0.3867 | SGI313 | −0.0792 | \|SGI313\|/(\|SGI313\| + TP3) | 0.2398 |
| HIF321 | 0.4050 | HIF321/HOI | 0.3940 | SGI321 | −0.1408 | \|SGI321\|/(\|SGI321\| + TP3) | 0.3593 |
| HIF411 | 0.2766 | HIF411/HOI | 0.2690 | SGI411 | 0.0572 | \|SGI411\|/(\|SGI411\| + TP4) | 0.2225 |
| HIF421 | 0.2909 | HIF421/HOI | 0.2829 | SGI421 | 0.0816 | \|SGI421\|/(\|SGI421\| + TP4) | 0.2897 |

Sixth Embodiment

Figure 6A:
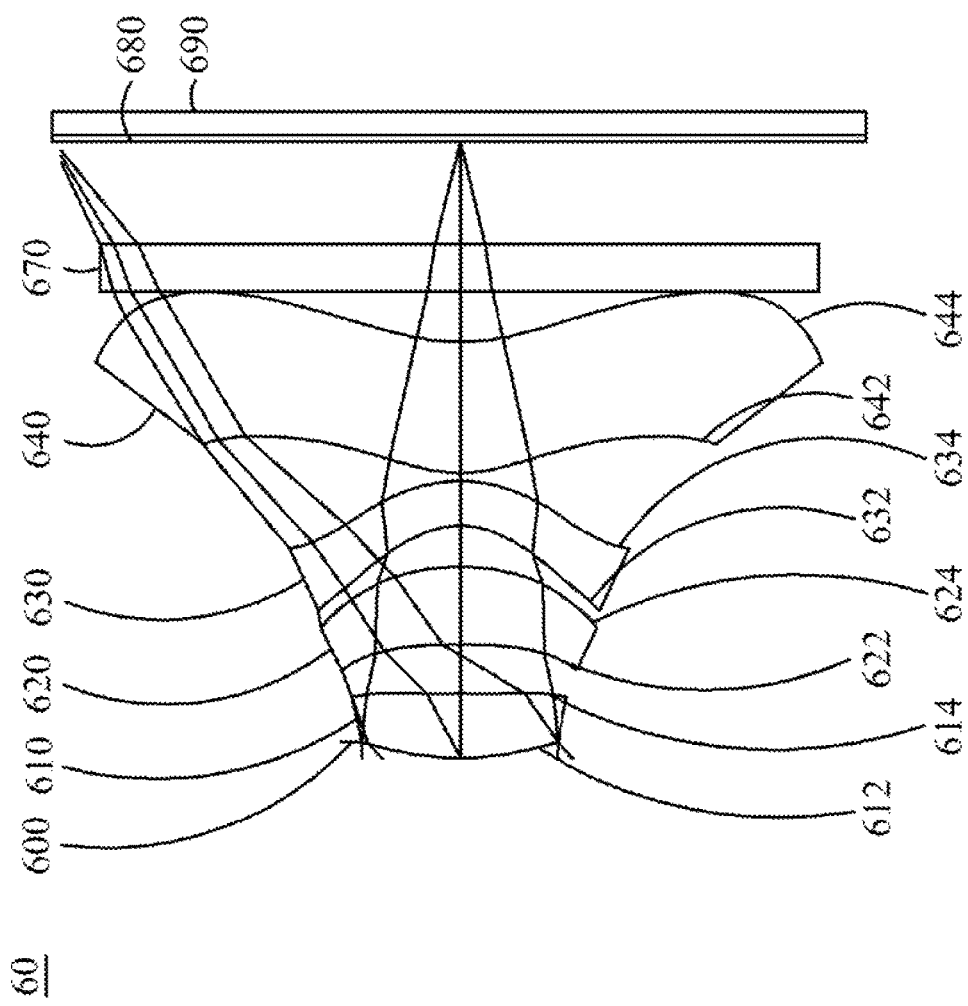
FIG. 6A is a schematic view of the optical image capturing system according to the sixth embodiment of the present disclosure.
Figure 6B:
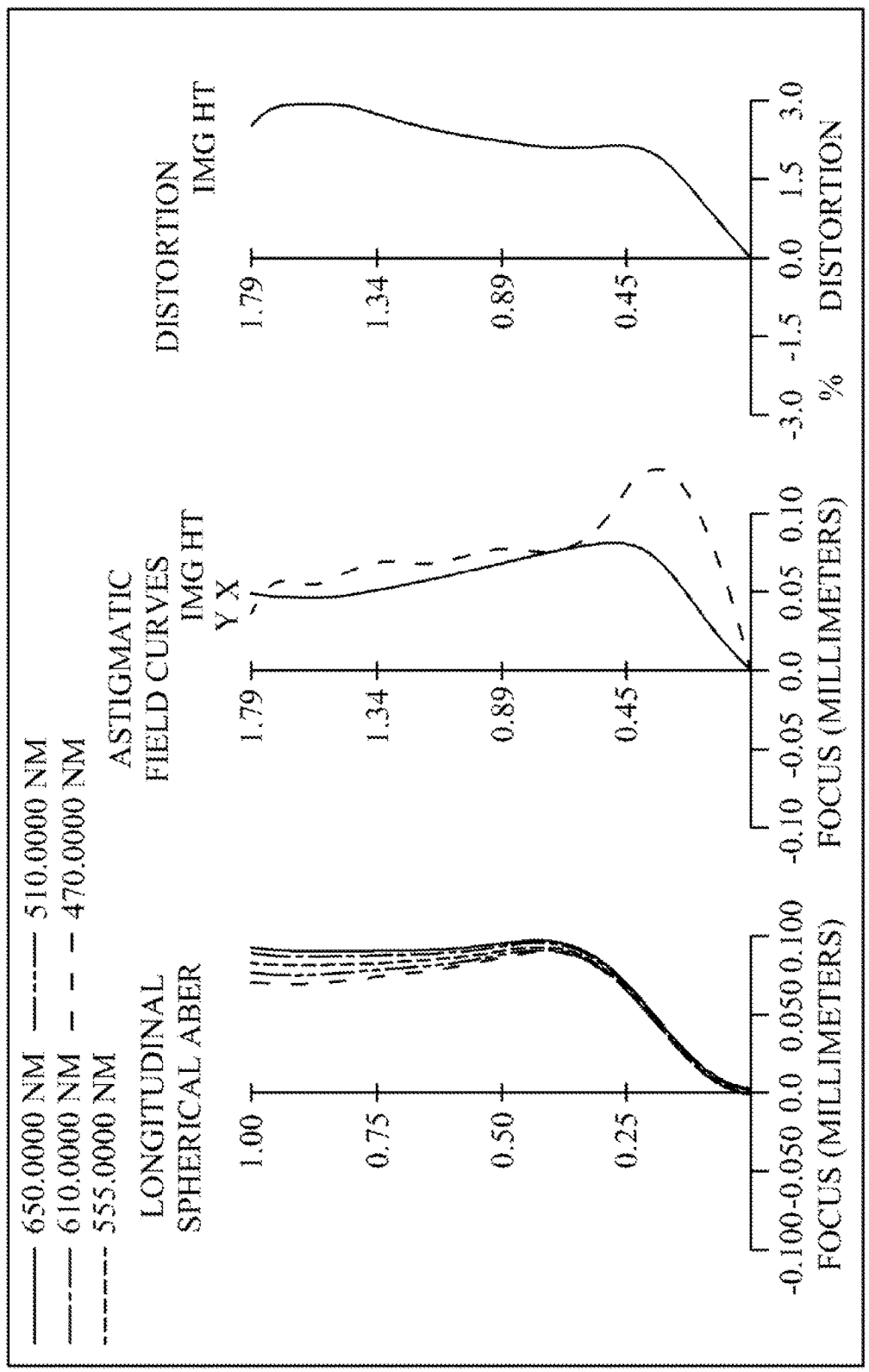
FIG. 6B a curve diagram illustrating the spherical aberration, astigmatism and optical distortion of the optical image capturing system in the sequence from left to right according to the sixth embodiment of the present disclosure.
Figure 6C:
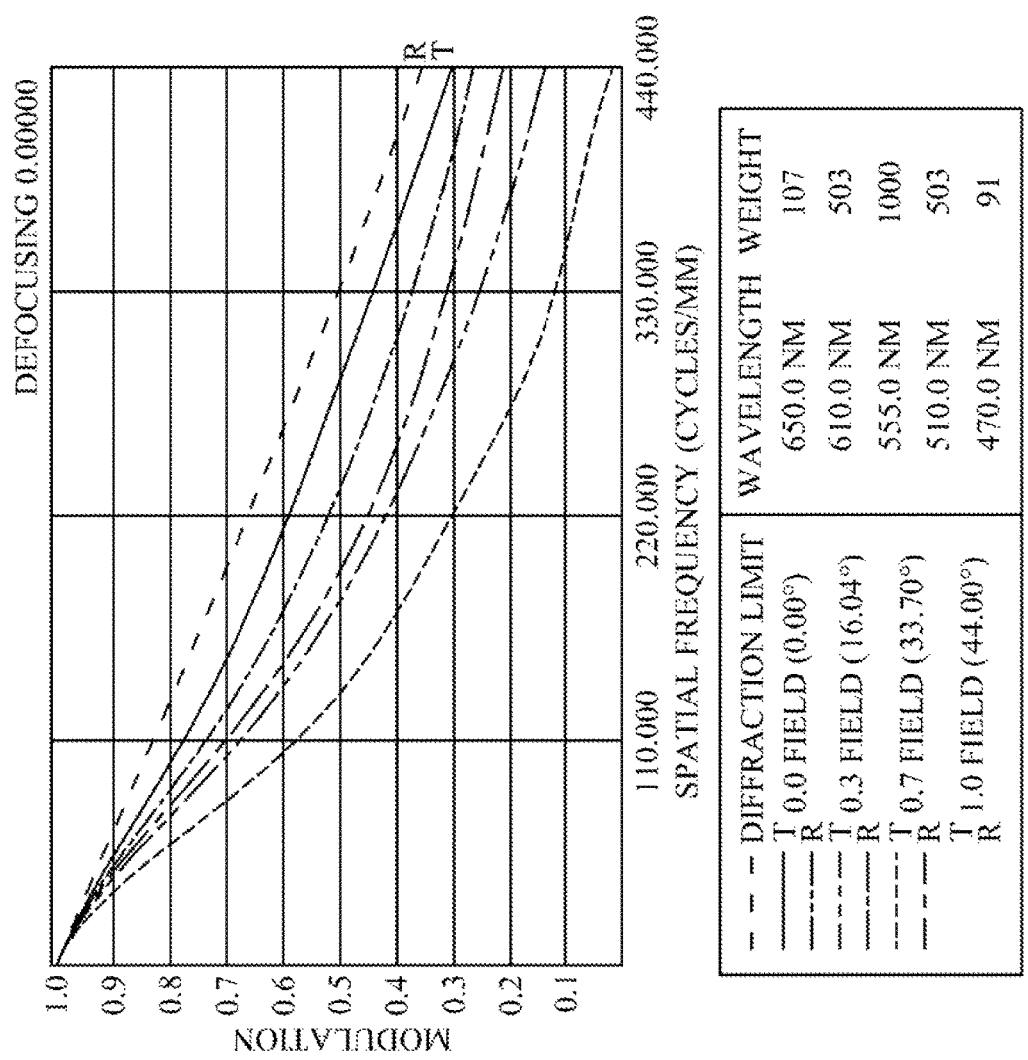
FIG. 6C a characteristic diagram of modulation transfer of visible light spectrum according to the sixth embodiment of the present disclosure.
Figure 6D:
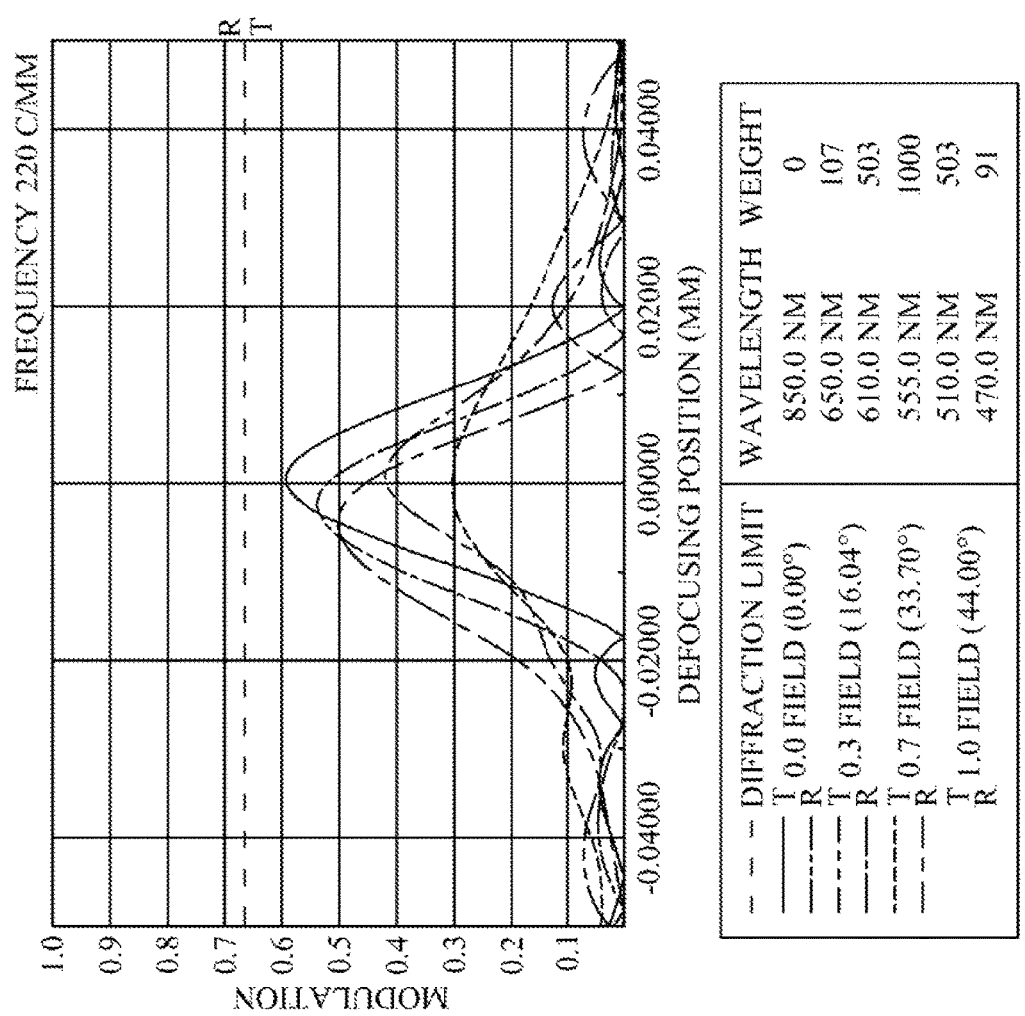
FIG. 6D is a diagram illustrating the through-focus MTF values for the visible light spectrum at the central field of view, 0.3 field of view and 0.7 field of view of the sixth embodiment of the present disclosure.
Figure 6E:
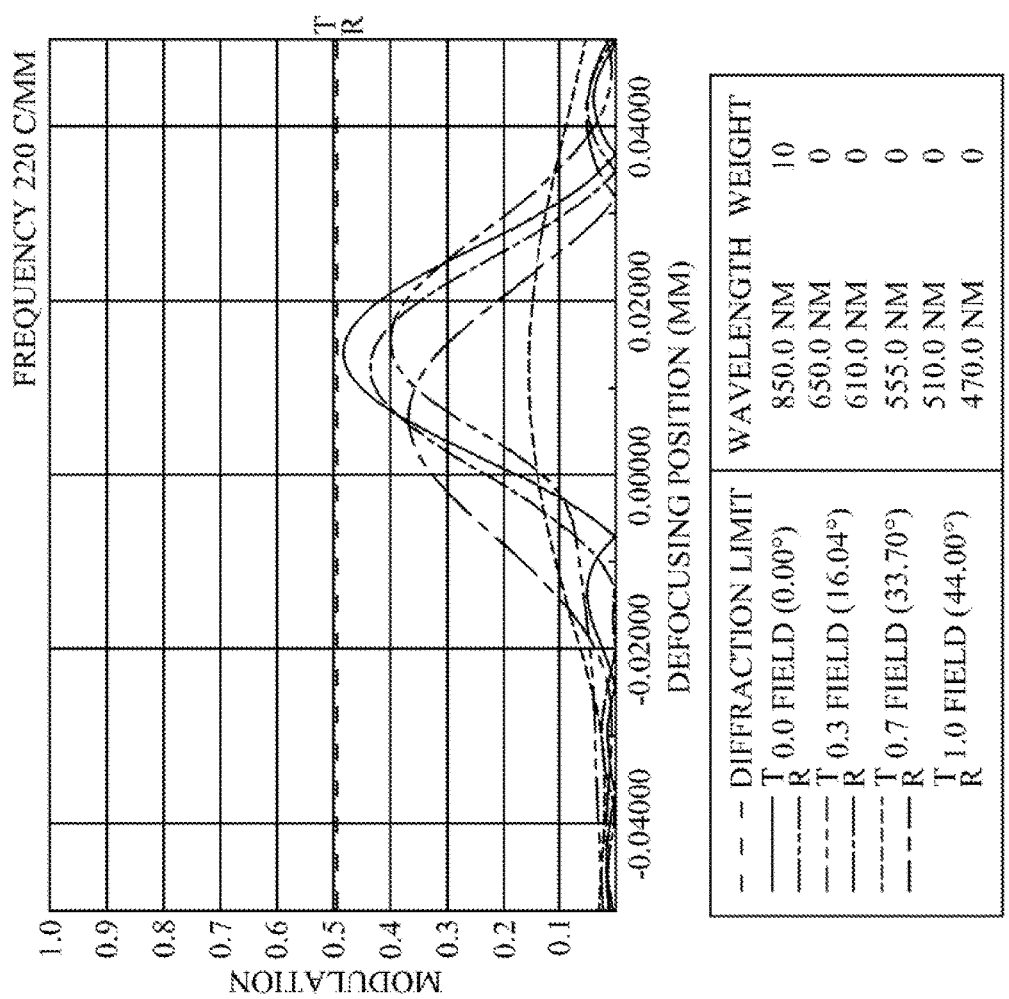
FIG. 6E is a diagram illustrating the through-focus MTF values for the infrared light spectrum at the central field of view, 0.3 field of view and 0.7 field of view of the sixth embodiment of the present disclosure.

Please refer to FIGS. 6A and 6B, wherein FIG. 6A is a schematic view of the optical image capturing system according to the sixth embodiment of the present disclosure. FIG. 6B is a curve diagram illustrating the spherical aberration, astigmatism and optical distortion of the optical image capturing system in the sequence from left to right according to the sixth embodiment of the present disclosure. FIG. 6C is a characteristic diagram of modulation transfer of visible light spectrum according to the sixth embodiment of the present disclosure. FIG. 6D is a diagram illustrating the through-focus MTF values for the visible light spectrum at the central field of view, 0.3 field of view and 0.7 field of view of the sixth embodiment of the present disclosure. FIG. 6E is a diagram illustrating the through-focus MTF values for the infrared light spectrum at the central field of view, 0.3 field of view and 0.7 field of view of the sixth embodiment of the present disclosure. As shown in FIG. 6A, in the order from an object side to an image side, the optical image capturing system 60 includes an aperture 600, a first lens 610, a second lens 620, a third lens 630, a fourth lens 640, an infrared filter 670, an image plane 680 and an image sensing device 690.

The first lens 610 has positive refractive power and is made of plastic material. The first lens 610 has a convex object-side surface 612 and a concave image-side surface 614, wherein both of them are aspheric. The object-side surface 612 has one inflection point.

The second lens 620 has positive refractive power and is made of plastic material. The second lens 620 has a convex object-side surface 622 and a convex image-side surface 624, wherein both of them are aspheric. The object-side surface 622 has one inflection point.

The third lens 630 has negative refractive power and is made of plastic material. The third lens 630 has a concave object-side surface 632 and a convex image-side surface 634, wherein both of them are aspheric. The object-side surface 632 has one inflection point.

The fourth lens 640 has positive refractive power and is made of plastic material. The fourth lens 640 has a convex object-side surface 642 and a concave image-side surface 644, wherein both of them are aspheric. The object-side surface 642 and image-side surface 644 respectively have one inflection point.

The infrared filter 670 is made of glass material and is configured between the fourth lens 640 and the image plane 680. The infrared filter 670 does not affect the focal length of the optical image capturing system.

Table 11 and Table 12 below should be incorporated into the reference of the present embodiment.

TABLE 11

Lens Parameters for the Sixth Embodiment
f(focal length) = 1.75576 mm; f/HEP = 2.037; HAF (half angle of view) = 44.0016 deg.

| Surface No. |  | Curvature Radius | Thickness (mm) | Material | Refractive Index | Abbe No. | Focal Length |
|---|---|---|---|---|---|---|---|
| 0 | Object | 1E+18 | 600 |  |  |  |  |
| 1 | Aperture/Lens 1 | 1.213383203 | 0.287 | Plastic | 1.535 | 56.27 | 2.546 |
| 2 |  | 10 | 0.217 |  |  |  |  |
| 3 | Lens 2 | −2.85559673 | 0.346 | Plastic | 1.535 | 56.27 | 2.687 |
| 4 |  | −0.998172253 | 0.186 |  |  |  |  |
| 5 | Lens 3 | −0.334118793 | 0.200 | Plastic | 1.642 | 22.46 | −1.374 |
| 6 |  | −0.661019123 | 0.037 |  |  |  |  |
| 7 | Lens 4 | 0.546198112 | 0.585 | Plastic | 1.535 | 56.27 | 1.623 |
| 8 |  | 0.917385213 | 0.224 |  |  |  |  |
| 9 | Infrared Filter | 1E+18 | 0.210 | BK_7 | 1.517 | 64.13 |  |
| 10 |  | 1E+18 | 0.460 |  |  |  |  |
| 11 | Image Plane | 1E+18 | 0.000 |  |  |  |  |

Reference Wavelength = 555 nm; Shield Position: the $2^{nd}$ surface with clear aperture of 0.475 mm; and the $8^{th}$ surface with clear aperture of 1.604 mm

TABLE 12

The Aspheric Coefficients of the Sixth Embodiment
Table 12: Aspheric Coefficients

| Surface No. | 1 | 2 | 3 | 4 | 5 | 6 |
|---|---|---|---|---|---|---|
| k = | −4.471116E+00 | 1.116093E+02 | −1.204415E+01 | −2.609059E+01 | −1.581881E+00 | −2.863839E+00 |
| $A_4$ = | −4.193161E−02 | −2.818620E−01 | −1.264453E+00 | −1.819177E+00 | 5.287547E+00 | −9.649972E−01 |
| $A_6$ = | 1.009019E+01 | −1.003995E+00 | 2.412395E+01 | −9.079360E+00 | −9.069676E+01 | −6.699782E−01 |
| $A_8$ = | −2.201461E+02 | 3.283690E+00 | −5.436590E+02 | 2.134034E+02 | 8.401261E+02 | 1.222315E+01 |
| $A_{10}$ = | 2.580737E+03 | −5.107254E+01 | 6.905988E+03 | −2.140849E+03 | −5.376898E+03 | −1.696104E+01 |
| $A_{12}$ = | −1.846305E+04 | 3.305739E+02 | −5.484910E+04 | 1.248888E+04 | 2.494689E+04 | 5.932509E+01 |
| $A_{14}$ = | 8.178483E+04 | −1.216520E+03 | 2.742621E+05 | −4.394552E+04 | −7.947889E+04 | −3.736859E+02 |
| $A_{16}$ = | −2.193929E+05 | 2.628335E+03 | −8.374703E+05 | 9.248099E+04 | 1.611755E+05 | 9.333696E+02 |
| $A_{18}$ = | 3.256033E+05 | −3.074451E+03 | 1.429002E+06 | −1.078529E+05 | −1.860124E+05 | −1.025428E+03 |
| $A_{20}$ = | −2.049493E+05 | 1.476865E+03 | −1.045824E+06 | 5.370607E+04 | 9.272207E+04 | 4.278497E+02 |

TABLE 12-continued

The Aspheric Coefficients of the Sixth Embodiment
Table 12: Aspheric Coefficients

| Surface No. | 7 | 8 |
|---|---|---|
| k = | −7.415164E+00 | −1.609733E+00 |
| $A_4$ = | −4.093109E−01 | −6.820773E−01 |
| $A_6$ = | 5.927374E−01 | 1.061110E+00 |
| $A_8$ = | −2.679793E−01 | −1.308502E+00 |
| $A_{10}$ = | −1.109103E+00 | 1.159339E+00 |
| $A_{12}$ = | 2.514609E+00 | −7.139962E−01 |
| $A_{14}$ = | −2.445115E+00 | 2.934940E−01 |
| $A_{16}$ = | 1.263917E+00 | −7.587539E−02 |
| $A_{18}$ = | −3.386950E−01 | 1.095890E−02 |
| $A_{20}$ = | 3.732735E−02 | −6.636031E−04 |

In the sixth embodiment, the form of the aspheric surface equation therein is presented as that in the first embodiment. Besides, the definition of parameters in the following tables is equivalent to that in the first embodiment, so that the repetitive details are not stated here.

The following values for the conditional expressions may be obtained from the data in Table 11 and Table 12.

Sixth Embodiment (Primary reference wavelength = 555 nm)

| MTFQ0 | MTFQ3 | MTFQ7 | MTFH0 | MTFH3 | MTFH7 |
|---|---|---|---|---|---|
| 0.77 | 0.68 | 0.57 | 0.59 | 0.43 | 0.3 |
| ETP1 | ETP2 | ETP3 | ETP4 | ED12/ED23 | SED |
| 0.209 | 0.295 | 0.271 | 0.571 | 1.978 | 0.521 |
| ETP1/TP1 | ETP2/TP2 | ETP3/TP3 | ETP4/TP4 | ED23/ED34 | SETP |
| 0.726 | 0.854 | 1.354 | 0.976 | 0.293 | 1.346 |
| ETL | EBL | EIN | EIR | PIR | STP |
| 2.681 | 0.814 | 1.867 | 0.144 | 0.224 | 1.418 |
| EIN/ETL | SETP/EIN | EIR/PIR | EBL/BL | BL | SETP/STP |
| 0.716 | 0.732 | 0.530 | 0.9105 | 0.8940 | 0.946 |
| ED12 | ED23 | ED34 | ED12/IN12 | ED23/IN23 | ED34/IN34 |
| 0.161 | 0.082 | 0.278 | 0.743 | 0.438 | 7.579 |
| InRS41 | InRS42 | HVT41 | HVT42 | ODT % | TDT % |
| 0.12997 | 0.10662 | 0.88124 | 1.11908 | 2.94634 | 0.57729 |

Sixth Embodiment (Primary reference wavelength = 555 nm)

| |f/f1| | |f/f2| | |f/f3| | |f/f4| | |f1/f2| | |f2/f3| |
|---|---|---|---|---|---|
| 0.68969 | 0.65351 | 1.27830 | 1.08167 | 0.94753 | 1.95607 |
| ΣPPR | ΣNPR | ΣPPR/|ΣNPR| | ΣPP | ΣNP | f1/ΣPP |
| 1.73518 | 1.96799 | 0.88170 | 4.30987 | 1.17221 | 0.37662 |
| f4/ΣNP | IN12/f | IN23/f | IN34/f | TP3/f | TP4/f |
| 2.17173 | 0.12384 | 0.10611 | 0.02092 | 0.11391 | 0.33345 |
| InTL | HOS | HOS/HOI | InS/HOS | InTL/HOS | ΣTP/InTL |
| 1.85894 | 2.75290 | 1.53622 | 0.97380 | 0.67527 | 0.76305 |
| (TP1 + IN12)/TP2 | (TP4 + IN34)/TP3 | TP1/TP2 | TP3/TP4 | IN23/(TP2 + IN23 + TP3) | |
| 1.46003 | 3.11089 | 0.83108 | 0.34162 | 0.25451 | |
| |InRS41|/TP4 | |InRS42|/TP4 | HVT42/HOI | HVT42/HOS | | |
| 0.2220 | 0.1821 | 0.6245 | 0.4065 | | |
| VSFS0 | VSFS3 | VSFS7 | VTFS0 | VTFS3 | VTFS7 |
| 0.0000 | −0.0025 | −0.0025 | 0.0000 | 0.0000 | 0.0000 |
| VSMTF0 | VSMTF3 | VSMTF7 | VTMTF0 | VTMTF3 | VTMTF7 |
| 0.5920 | 0.5190 | 0.5770 | 0.5920 | 0.4260 | 0.4030 |
| ISFS0 | ISFS3 | ISFS7 | ITFS0 | ITFS3 | ITFS7 |
| 0.0150 | 0.0125 | 0.0125 | 0.0150 | 0.0150 | 0.0125 |
| ISMTF0 | ISMTF3 | ISMTF7 | ITMTF0 | ITMTF3 | ITMTF7 |
| 0.4880 | 0.4220 | 0.4490 | 0.4880 | 0.4100 | 0.3790 |
| FS | AIFS | AVFS | AFS | | |
| 0.0150 | 0.0138 | −0.0008 | 0.0146 | | |

The following values for the conditional expressions may be obtained from the data in Table 11 and Table 12.

Values Related to Inflection Point of sixth Embodiment
(Primary Reference Wavelength = 555 nm)

| HIF111 | 0.4151 | HIF111/HOI | 0.2317 | SGI111 | 0.0673 | |SGI111|/(|SGI111| + TP1) | 0.1897 |
|---|---|---|---|---|---|---|---|
| HIF121 | 0.1598 | HIF121/HOI | 0.0892 | SGI121 | 0.0011 | |SGI121|/(|SGI121| + TP1) | 0.0038 |
| HIF311 | 0.4303 | HIF311/HOI | 0.2401 | SGI311 | −0.2162 | |SGI311|/(|SGI311| + TP3) | 0.5194 |
| HIF312 | 0.5393 | HIF312/HOI | 0.3009 | SGI312 | −0.3070 | |SGI312|/(|SGI312| + TP3) | 0.6055 |
| HIF321 | 0.4681 | HIF321/HOI | 0.2612 | SGI321 | −0.1710 | |SGI321|/(|SGI321| + TP3) | 0.4609 |
| HIF411 | 0.3139 | HIF411/HOI | 0.1752 | SGI411 | 0.0618 | |SGI411|/(|SGI411| + TP4) | 0.0954 |
| HIF421 | 0.4866 | HIF421/HOI | 0.2715 | SGI421 | 0.0964 | |SGI421|/(|SGI421| + TP4) | 0.1414 |

Although the present disclosure is disclosed via the aforementioned embodiments, those embodiments do not serve to limit the scope of the present disclosure. A person skilled in the art may perform various alterations and modifications to the present disclosure without departing from the spirit and the scope of the present disclosure. Hence, the scope of the present disclosure should be defined by the following appended claims.

Despite the fact that the present disclosure is specifically presented and illustrated with reference to the exemplary embodiments thereof, it should be obvious to a person skilled in the art that, various modifications to the forms and details of the present disclosure may be performed without departing from the scope and spirit of the present disclosure defined by the following claims and equivalents thereof.

What is claimed is:

1. An optical image capturing system, from an object side to an image side, comprising:
    a first lens with negative or positive refractive power;
    a second lens with positive refractive power;
    a third lens with negative refractive power;
    a fourth lens with positive refractive power;
    a first image plane, which is an image plane specifically for visible light and perpendicular to an optical axis, and a central field of view of the first image plane has a maximum value of through-focus modulation transfer rate (MTF) at a first spatial frequency; and
    a second image plane, which is an image plane specifically for infrared light and perpendicular to the optical axis, and a central field of view of the second image plane has a maximum value of through-focus modulation transfer rate (MTF) at the first spatial frequency;
    wherein focal lengths of the four lenses are denoted as f1, f2, f3 and f4 respectively, a focal length of the optical image capturing system is denoted as f, an entrance pupil diameter of the optical image capturing system is denoted as HEP, a distance on the optical axis from an object-side surface of the first lens to the first image plane is denoted as HOS, a distance on the optical axis from the object-side surface of the first lens to an image-side surface of the fourth lens is denoted as InTL, half of a maximum angle of view of the optical image capturing system is denoted as HAF, the optical image capturing system has a maximum image height HOI perpendicular to the optical axis on the first image plane, a distance on the optical axis between the first image plane and the second image plane is denoted as FS, thicknesses of the first to fourth lenses at height of ½ HEP and in parallel with the optical axis are denoted as ETP1, ETP2, ETP3 and ETP4 respectively, a sum of the ETP1 to ETP4 described above is denoted as SETP, central thicknesses of the first to fourth lenses on the optical axis are denoted as TP1, TP2, TP3 and TP4 respectively, a sum of the TP1 to TP4 described above is denoted as STP, and conditions as follows are satisfied: $1 \le f/HEP \le 10$, $0 \deg < HAF \le 150 \deg$, $0.5 \le SETP/STP < 1$, and $|FS| \le 15 \mu m$.

2. The optical image capturing system of claim 1, wherein a wavelength of the infrared light ranges from 700 nm to 1300 nm, the first spatial frequency is denoted as SP1, and a condition as follows is satisfied: $SP1 \le 440$ cycles/mm.

3. The optical image capturing system of claim 1, wherein a horizontal distance in parallel with the optical axis from a coordinate point on the object-side surface of the first lens at height of ½ HEP to the image plane is denoted as ETL, a horizontal distance in parallel with the optical axis from the coordinate point on the object-side surface of the first lens at height of ½ HEP to a coordinate point on the image-side surface of the fourth lens at height of ½ HEP is denoted as EIN, and a condition as follows is satisfied: $0.2 \le EIN/ETL < 1$.

4. The optical image capturing system of claim 1, wherein at least one surface respectively of at least two lenses of the first lens to the fourth lens has at least one inflection point.

5. The optical image capturing system of claim 1, wherein half of a vertical maximum angle of view of the optical image capturing system is VHAF, and a condition as follows is satisfied: $VHAF \ge 10 \deg$.

6. The optical image capturing system of claim 1, wherein the optical image capturing system satisfies a condition as follows: $HOS/HOI \ge 1.2$.

7. The optical image capturing system of claim 1, wherein a thickness of the first lens at height of ½ HEP and in parallel with the optical axis is denoted as ETP1, a thickness of the second lens at height of ½ HEP and in parallel with the optical axis is denoted as ETP2, a thickness of the third lens at height of ½ HEP and in parallel with the optical axis is denoted as ETP3, a thickness of the fourth lens at height of ½ HEP and in parallel with the optical axis is denoted as ETP4, a sum of ETP1 to ETP4 described above is denoted as SETP, and a condition as follows is satisfied: $0.3 \le SETP/EIN \le 1$.

8. The optical image capturing system of claim 1, wherein a horizontal distance in parallel with the optical axis from a coordinate point on an image-side surface of the third lens at height of ½ HEP to the image plane is denoted as EBL, a horizontal distance in parallel with the optical axis from an intersection point of the optical axis and the image-side surface of the fourth lens to the image plane is denoted as BL, and a condition as follows is satisfied: $0.1 \le EBL/BL \le 1.5$.

9. The optical image capturing system of claim 1, further comprising an aperture, wherein a distance from the aperture to the first image plane on the optical axis is InS, and a condition as follows is satisfied: $0.2 \le InS/HOS \le 1.1$.

10. An optical image capturing system, from an object side to an image side, comprising:
    a first lens with negative or positive refractive power;
    a second lens with positive refractive power;
    a third lens with negative refractive power;
    a fourth lens with positive refractive power;
    a first image plane, which is an image plane specifically for visible light and perpendicular to an optical axis, and a central field of view of the first image plane has a maximum value of through-focus modulation transfer rate (MTF) at a first spatial frequency of 220 cycles/mm; and
    a second image plane, which is an image plane specifically for infrared light and perpendicular to the optical axis, and a central field of view of the second image plane has a maximum value of the through-focus modulation transfer rate (MTF) at the first spatial frequency of 220 cycles/mm;
    wherein focal lengths of the four lenses are denoted as f1, f2, f3 and f4 respectively, a focal length of the optical image capturing system is denoted as f, an entrance pupil diameter of the optical image capturing system is denoted as HEP, a distance from an object-side surface of the first lens to the first image plane on the optical axis is denoted as HOS, a distance from the object-side surface of the first lens to an image-side surface of the fourth lens on the optical axis is denoted as InTL, half of a maximum angle of view of the optical image capturing system is denoted as HAF, the optical image capturing system has a maximum image height HOI on the first image plane perpendicular to the optical axis, a horizontal distance in parallel with the optical axis from a coordinate point on the object-side surface of the first lens at height of ½ HEP to the image plane is denoted as ETL, a horizontal distance in parallel with the optical axis from the coordinate point on the object-side surface of the first lens at height of ½ HEP to a coordinate point on the image-side surface of the fourth lens at height of ½ HEP is denoted as EIN, and conditions as follows are satisfied: 1≤f/HEPC≤10, 0 deg<HAF≤150 deg, 0.2≤EIN/ETL<1, and |FS|≤15 μm.

11. The optical image capturing system of claim 10, wherein modulation transfer rates for visible light at spatial frequency of 110 cycles/mm at positions of the optical axis, 0.3 HOI and 0.7 HOI on the first image plane are denoted as MTFQ0, MTFQ3 and MTFQ7 respectively, and conditions as follows are satisfied: MTFQ0≥0.2, MTFQ3≤0.01, and MTFQ7≥0.01.

12. The optical image capturing system of claim 10, wherein half of a vertical maximum angle of view of the optical image capturing system is denoted as VHAF, and a condition as follows is satisfied: VHAF≥20 deg.

13. The optical image capturing system of claim 10, wherein the optical image capturing system satisfies a condition as follows: HOS/HOI≥1.4.

14. The optical image capturing system of claim 10, wherein a horizontal distance in parallel with the optical axis from a coordinate point on an image-side surface of the third lens at height of ½ HEP to a coordinate point on an object-side surface of the fourth lens at height of ½ HEP is denoted as ED34, a distance between the third lens and the fourth lens on the optical axis is denoted as IN34, and a condition as follows is satisfied: 0<ED34/IN34≤50.

15. The optical image capturing system of claim 10, wherein a horizontal distance in parallel with the optical axis from a coordinate point on an image-side surface of the first lens at height of ½ HEP to a coordinate point on an object-side surface of the second lens at height of ½ HEP is denoted as ED12, a distance between the first lens and the second lens on the optical axis is denoted as IN12, and a condition as follows is satisfied: 0<ED12/IN12≤35.

16. The optical image capturing system of claim 10, wherein central thicknesses of the first lens and the third lens on the optical axis are denoted as TP1 and TP3 respectively, and a condition as follows is satisfied: 1.3≤TP1/TP3≤1.5.

17. The optical image capturing system of claim 10, wherein central thicknesses of the second lens and the third lens on the optical axis are denoted as TP2 and TP3 respectively, and a condition as follows is satisfied: 0.6≤TP2/TP3≤0.9.

18. The optical image capturing system of claim 10, wherein central thicknesses of the fourth lens and the third lens on the optical axis are denoted as TP4 and TP3 respectively, and a condition as follows is satisfied: 0.65≤TP4/TP3≤0.9.

19. The optical image capturing system of claim 10, wherein at least one lens among the first lens, the second lens, the third lens and the fourth lens is a filter element of light with a wavelength smaller than 500 nm.

20. An optical image capturing system, from an object side to an image side, comprising:
a first lens with negative or positive refractive power;
a second lens with positive refractive power;
a third lens with negative refractive power;
a fourth lens with positive refractive power;
a first average image plane, which is an image plane specifically for visible light and perpendicular to an optical axis, and configured at an average position of through-focus positions where all of central field of view, 0.3 field of view and 0.7 field of view of the optical image capturing system have their respective maximums of through-focus modulation transfer rates (values of MTF) of the visible light at a first spatial frequency of 220 cycles/mm; and
a second average image plane, which is an image plane specifically for infrared light and perpendicular to the optical axis, and configured at the average position of the through-focus positions where all of central field of view, 0.3 field of view and 0.7 field of view of the optical image capturing system have their respective maximums of through-focus modulation transfer rates (values of MTF) of the infrared light at the first spatial frequency of 220 cycles/mm;
wherein focal lengths of the first lens to the fourth lens are denoted as f1, f2, f3 and f4 respectively, a focal length of the optical image capturing system is denoted as f, an entrance pupil diameter of the optical image capturing system is denoted as HEP, a distance from an object-side surface of the first lens to the first average image plane on the optical axis is denoted as HOS, a distance from the object-side surface of the first lens to an image-side surface of the fourth lens on the optical axis is denoted as InTL, half of a maximum angle of view of the optical image capturing system is denoted as HAF, the optical image capturing system has a maximum image height HOI on the first average image plane perpendicular to the optical axis, a horizontal distance in parallel with the optical axis from a coordinate point on the object-side surface of the first lens at height of ½ HEP to the first average image plane is denoted as ETL, a horizontal distance in parallel with the optical axis from the coordinate point on the object-side surface of the first lens at height of ½ HEP to a coordinate point on the image-side surface of the fourth lens at height of ½ HEP is denoted as EIN, a distance between the first average image plane and the second average image plane on the optical axis is denoted as AFS, half of a vertical maximum angle of view of the optical image capturing system is denoted as VHAF, and conditions as follows are satisfied: 1≤f/HEP≤10, 0 deg<HAF≤150 deg, |AFS|≤15 μm, VHAF≥20 deg, and 0.2≤EIN/ETL<1.

21. The optical image capturing system of claim 20, wherein thicknesses of the first lens to the fourth lens at height of ½ HEP and in parallel with the optical axis are denoted as ETP1, ETP2, ETP3 and ETP4 respectively, a sum of the ETP1 to ETP4 described above is denoted as SETP, and a condition as follows is satisfied: 0.3≤SETP/EIN<1.

22. The optical image capturing system of claim 20, wherein the optical image capturing system satisfies a condition as follows: HOS/HOI≥1.5.

23. The optical image capturing system of claim 20, wherein a linear magnification of the second average image plane in the optical image capturing system is denoted as LM, and a condition as follows is satisfied: LM≥0.0003.

24. The optical image capturing system of claim 20, wherein central thicknesses of the first lens, the second lens and the third lens on the optical axis are denoted as TP1, TP2 and TP3 respectively, and conditions as follows are satisfied: 0.4≤TP1/TP3≤1.5, and 0.4≤TP2/TP3≤0.9.

25. The optical image capturing system of claim 20, further comprising an aperture and an image sensing device, wherein the image sensing device is configured behind the first average image plane and includes at least 100 thousands pixels, a distance from the aperture to the first average image plane on the optical axis is denoted as InS, and a condition as follows is satisfied: $0.2 \leq InS/HOS \leq 1.1$.

* * * * *